(12) United States Patent
Bourgin et al.

(10) Patent No.: US 12,266,076 B2
(45) Date of Patent: Apr. 1, 2025

(54) UTILIZING MACHINE LEARNING TO SELECT RESIZING MODELS IN GENERATING RESIZED DIGITAL DESIGN DOCUMENTS

(71) Applicant: Adobe Inc., San Jose, CA (US)

(72) Inventors: David Bourgin, New York, NY (US); Peter O'Donovan, Seattle, WA (US); Oliver Brdiczka, San Jose, CA (US); Gregory St. Pierre, Hampden, ME (US); Abhishek Gulati, Seattle, WA (US)

(73) Assignee: Adobe Inc., San Jose, CA (US)

( * ) Notice: Subject to any disclaimer, the term of this patent is extended or adjusted under 35 U.S.C. 154(b) by 26 days.

(21) Appl. No.: 18/328,272

(22) Filed: Jun. 2, 2023

(65) Prior Publication Data
US 2024/0404000 A1    Dec. 5, 2024

(51) Int. Cl.
*G06F 3/048*    (2013.01)
*G06T 3/40*    (2006.01)
*G06T 11/60*    (2006.01)

(52) U.S. Cl.
CPC ............... *G06T 3/40* (2013.01); *G06T 11/60* (2013.01)

(58) Field of Classification Search
CPC .................................. G06T 3/40; G06T 11/60
See application file for complete search history.

(56) References Cited

U.S. PATENT DOCUMENTS

| | | | |
|---|---|---|---|
| 6,738,079 B1 * | 5/2004 | Kellerman | G06F 8/38 |
| | | | 715/779 |
| 10,515,137 B1 * | 12/2019 | Sirota | G06F 40/14 |
| 2003/0206316 A1 * | 11/2003 | Anderson | G06T 11/60 |
| | | | 358/1.18 |
| 2005/0237321 A1 * | 10/2005 | Young | G06T 11/60 |
| | | | 715/764 |

(Continued)

FOREIGN PATENT DOCUMENTS

| | | | | |
|---|---|---|---|---|
| AU | 2007237250 A1 * | 6/2009 | ............ | G06F 17/211 |
| CN | 116975581 A * | 10/2023 | ............ | G06F 18/21 |

(Continued)

*Primary Examiner* — Rashawn N Tillery
(74) *Attorney, Agent, or Firm* — Keller Preece PLLC

(57) ABSTRACT

The present disclosure relates to systems, methods, and non-transitory computer-readable media that generates a design representation to further construct a digital design multigraph and generate a structural representation for a digital design document from the digital design multigraph. For instance, the disclosed systems generate a design representation of a digital design document that includes design properties with multiple digital design elements. In particular, the disclosed systems construct a digital design (multi-)graph from the design representation by generating nodes to represent digital design elements and edges based on relationships between these elements. In addition, the disclosed systems generate a structural representation based on the digital design multigraph for downstream applications. For instance, downstream applications include utilizing the structural representation to select a resizing model from a plurality of resizing models and resizing a digital design document using the structural representation.

20 Claims, 33 Drawing Sheets

(56) References Cited

U.S. PATENT DOCUMENTS

| | | | |
|---|---|---|---|
| 2011/0096075 A1* | 4/2011 | Borders | G06T 11/60 |
| | | | 345/441 |
| 2013/0332869 A1* | 12/2013 | Ferry | G06F 3/04847 |
| | | | 715/765 |
| 2015/0054853 A1* | 2/2015 | Georgiev | H04N 1/00196 |
| | | | 345/660 |
| 2018/0039820 A1* | 2/2018 | Begeja | G06V 20/52 |
| 2018/0330202 A1* | 11/2018 | Blanchflower | G06F 40/20 |
| 2019/0139282 A1* | 5/2019 | Rathore | G06F 18/22 |
| 2019/0318212 A1* | 10/2019 | Govrin | G06T 3/40 |
| 2020/0202533 A1* | 6/2020 | Cohen | G06T 7/194 |
| 2020/0401835 A1* | 12/2020 | Zhao | G06V 10/426 |
| 2021/0109789 A1* | 4/2021 | McWeeney | G06F 9/5022 |
| 2021/0141867 A1* | 5/2021 | Wason | G06V 10/82 |
| 2021/0264244 A1* | 8/2021 | Xian | G06F 16/221 |
| 2021/0272253 A1* | 9/2021 | Lin | G06V 10/761 |
| 2021/0327127 A1* | 10/2021 | Hinterstoisser | G06T 3/60 |
| 2021/0342972 A1* | 11/2021 | Mironica | G06T 3/4038 |
| 2021/0350382 A1* | 11/2021 | Lopes | G06N 3/045 |
| 2021/0397986 A1* | 12/2021 | Aggarwal | G06N 3/045 |
| 2022/0050967 A1* | 2/2022 | Veyseh | G06F 40/289 |
| 2022/0383032 A1* | 12/2022 | Garg | G06T 7/11 |
| 2023/0080407 A1* | 3/2023 | Kumar | G06F 40/166 |
| | | | 715/717 |
| 2023/0177250 A1* | 6/2023 | Lundin | G06F 40/284 |
| | | | 715/254 |
| 2023/0344653 A1* | 10/2023 | Vestemean | G06T 3/40 |
| 2024/0144356 A1* | 5/2024 | Garvey | G06Q 30/0203 |
| 2024/0202908 A1* | 6/2024 | Rundo | G06V 20/70 |

FOREIGN PATENT DOCUMENTS

| | | | | |
|---|---|---|---|---|
| CN | 118298443 A | * | 7/2024 | |
| RU | 173239 U1 | * | 8/2017 | |
| WO | WO-2021150929 A1 | * | 7/2021 | G01V 1/46 |

* cited by examiner

| Label | Accuracy | Precision | Recall | Weight |
|---|---|---|---|---|
| Proportional | 90.91% | 0.05 | 0.22 | 0.07 |
| Spring | 88.84% | 0.25 | 0.48 | 0.10 |
| Fit | 85.33% | 0.96 | 0.88 | 0.78 |
| Pin | 94.21% | 0.00 | 0.00 | 0.05 |

Generating A Design Representation Comprising Design Properties Of A Digital Design Document 2202

↓

Constructing A Digital Design Graph From The Design Representation 2204

↓

Generating A Structural Representation Based On The Digital Design Graph 2206

UTILIZING MACHINE LEARNING TO SELECT RESIZING MODELS IN GENERATING RESIZED DIGITAL DESIGN DOCUMENTS

BACKGROUND

Recent years have seen significant advancement in hardware and software platforms for creating and modifying graphic designs to produce high-quality and aesthetically pleasing documents. For example, many platforms offer software applications that provide templates to create graphic designs, tools to modify elements within the graphic designs, and various other textual or image options to improve the quality of graphic designs. Some of these software application platforms further implement systems for adjusting the size of the graphic design to conform with specific dimension requirements. Accordingly, client devices via software applications can create and modify graphic designs in various ways. However, despite these advancements, graphic design systems continue to suffer from a variety of problems, including functional inaccuracy, operational inflexibility, and computational inefficiency.

SUMMARY

One or more embodiments described herein provide benefits and/or solve one or more of problems in the art with systems, methods, and non-transitory computer-readable media that construct digital design graphs from design representations of digital design documents for generating structural representations of digital design documents. For instance, in one or more embodiments, the disclosed systems generate a digital design document representation for transferring a design from a client representation to a cloud-based design multigraph service. The disclosed systems can utilize a document representation tailored for machine learning services that can include anonymization as well as machine learning service chaining to iteratively add information such as design element semantics or return layout suggestions. Moreover, in one or more embodiments the disclosed systems utilize a digital design multigraph to generate a structural representation for improved document understanding and downstream applications (machine learning and/or mapping models). To illustrate, the disclosed systems utilize computer-implemented algorithms for automatically grouping elements in a design as well as inferring visual structure. Moreover, in some embodiments the disclosed systems utilize the structural representations for generating recommended versions of the digital design document, generating a modified digital design document from the digital design document, or identifying an additional digital design document corresponding to the digital design document.

In addition, in one or more implementations, the disclosed system implements digital design multigraphs by generating a feature representation to resize a digital design document utilizing a resizing model. In particular, in one or more embodiments the disclosed systems implement an overall resize strategy orchestrator that coordinates applying resize strategies as well as evaluating the results. For example, the disclosed system utilizes a machine learning model to select a resizing model from a plurality of resizing models based on a feature representation to generate a resized digital design document with new dimensions. In one or more embodiments, the disclosed systems utilize a variety of resize strategies, including a springs-and-struts strategy (that uses inferred document structure to build a spring system that is solved to produce a new design layout) and a pin strategy (which pins design elements to maintain design elements current size while matching initial pin constraints). The disclosed systems also utilize a design critic to evaluate a resize, determine if the resize satisfies a design critic threshold, and iteratively analyze alternative strategies.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 20A-20B illustrates example results of the digital design system selecting one or more resizing models in accordance with one or more embodiments;

DETAILED DESCRIPTION

Figure 1:
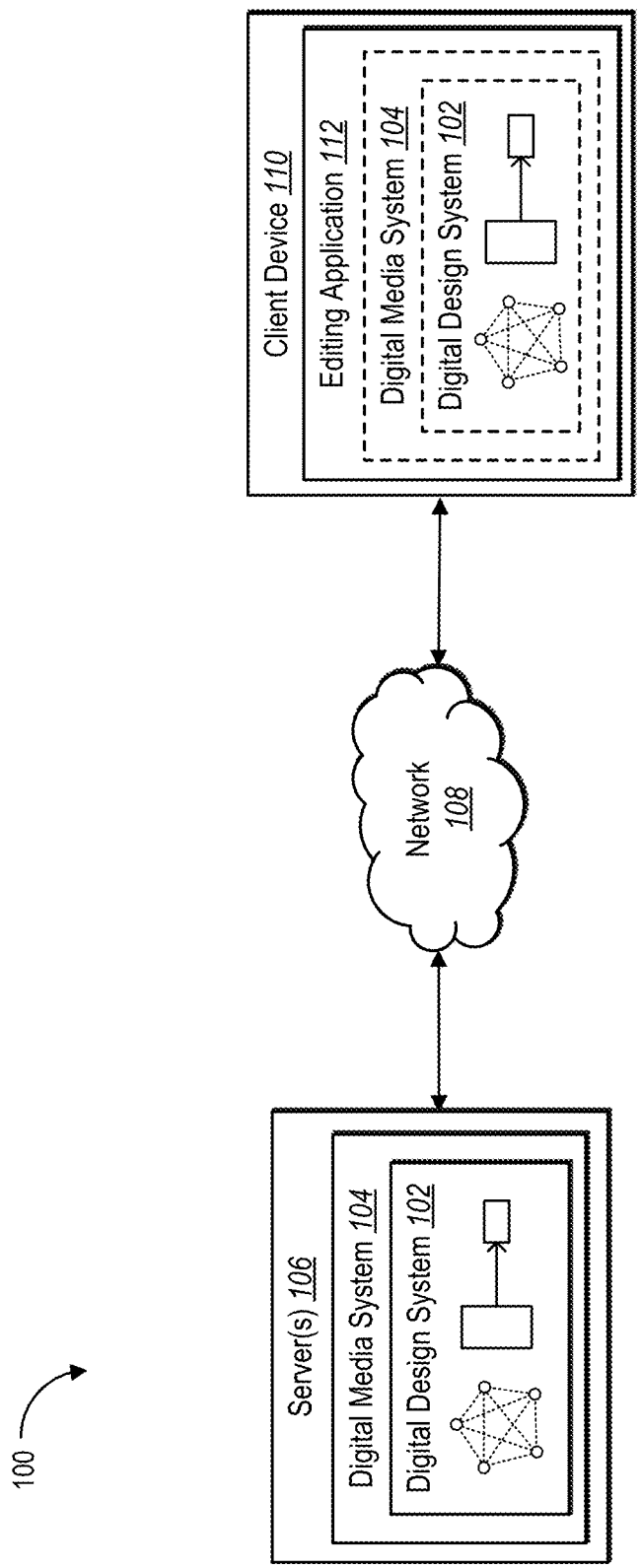
FIG. 1 illustrates an example environment in which a digital design system operates in accordance with one or more embodiments.

One or more embodiments described herein include a digital design system that constructs digital design graphs for generating structural representations of digital design documents. For example, in one or more implementations, the digital design system utilizes an anonymized document representation crafted for analysis by a variety of machine learning service. Moreover, in one or more embodiments, the digital design system builds a digital design graph from the document representation and then utilizes the digital design graph to generate structural representations and modify digital design documents. To illustrate, the disclosed systems can utilize computer-implemented algorithms for automatically grouping elements in a design as well as inferring visual structure.

In addition, in one or more implementations, the digital design system utilizes feature representations to resize digital design documents. For example, the disclosed system utilizes a machine learning model to select a resizing model from a plurality of resizing models to generate a resized digital design document. The disclosed systems can utilize a variety of resizing models, including a springs-and-struts model, a pin model, a scale model, and a fit model. The disclosed systems also utilize a design critic to evaluate and, if necessary, select alternative resizing models.

Conventional graphic design systems suffer from several technological shortcomings. For example, conventional systems often generate modified digital design documents that are not visually appealing or useful. In particular, conventional systems often utilize resizing approaches that generate modified digital design documents with overlapping or conflicting visual design elements. Moreover, many conventional systems generate digital design documents based on localized or specific heuristics that fail to consider interactions between overall features of the digital design as a whole.

Furthermore, conventional systems or also functionally inflexible. Indeed, conventional graphic typically employ a default or rigid method for performing digital design document modifications. For example, in performing resizing, conventional systems often utilize a single default resizing approach. Accordingly, conventional systems often cannot flexibly adjust to the unique design elements and design interactions particular to the unique context of each digital design document. In addition, conventional systems often lack flexibility in generating and identifying data for building machine learning models for digital design documents.

Conventional systems are also operationally inefficient. Indeed, conventional systems often require significant time, user interfaces, and user interactions to generate modified digital design documents. For example, conventional systems often require client device interactions to move, resize, or otherwise modify digital design elements in generating a modified digital design. Indeed, this can include client device interactions to search through user interfaces to identify similar digital images to include in a digital design, iterative interactions to identify and select fonts to include in a digital design, and/or repeated interactions to group digital design elements. Accordingly, conventional systems utilize significant computing resources in generating modified digital design documents.

The digital design system can provide a variety of technical improvements relative to conventional systems. For example, in one or more embodiments, the digital design system improves upon accuracy of conventional systems. To illustrate, the digital design system generates a design representation of a digital design document, constructs a digital design multigraph from the digital design representation and further generates a structural representation based on the digital design multigraph for modifying the digital design document. In particular, the digital design system improves accuracy by generating structural representations based on a digital design multigraph that represents a digital design document and design element interactions. For instance, in some embodiments, the structural representations allow for generating a recommended revision to the digital design document, generating a modified digital design document from the digital design document, or identifying an additional digital design document corresponding to the digital design document that considers various design elements and interactions between the design elements across the digital design document as a whole.

In one or more embodiments, the digital design system improves upon accuracy by generating a feature representation of the digital design document and selecting a resizing model from a plurality of resizing models based on the feature representation to generate a resized digital design document with a different dimension. In contrast to conventional systems, the digital design system intelligently selects between different resizing models based on a feature representation of the digital design document. Thus, in one or more embodiments, the digital design system improves upon accuracy by generating resized digital design documents based on a tailored resizing model selected based on the unique characteristics of the design document itself.

As mentioned above, the digital design system can also improve accuracy by utilizing a critic model to generate a resized digital document. In particular, in one or more embodiments, the digital design system utilizes a critic model to analyze a resized digital design document to determine whether the resized digital design document satisfies a critic threshold. Upon determining that the digital design document fails to satisfy the critic threshold, the digital design system can select an alternative resizing model to improve the resulting design.

In addition to the accuracy improvements, in one or more embodiments, the digital design system also improves upon operational inflexibility. For example, the digital design system generates a flexible design representation that can be utilized and revised by a variety of different platforms (e.g., machine learning model pipelines). Moreover, in one or more embodiments, the digital design system constructs a digital design multigraph and generates a flexible structural representation for further downstream applications. Indeed, the structural representations generated from the digital design multigraph can indicate structural features of the digital design document that can be analyzed and utilized in a variety of downstream applications based on document understanding, such as recommending design variations, identifying similar digital design documents, and/or recommending text styles. Moreover, by utilizing design representations and/or digital design multigraphs, the digital design system can generate data for building, training, and implementing machine learning models for digital design documents.

Moreover, in some implementations, the digital design system also improves flexibility by intelligently selecting between different models. For example, the digital design system dynamically selects between different resizing models utilizing a machine learning model from a feature representation of the digital design document. In contrast to conventional systems that utilize a one-size-fits-all approach, the digital design system can select the resizing model most appropriate to the particular context and layout of a given digital design document.

The digital design system can also improve privacy relative to conventional systems. Indeed, in one or more embodiments, the digital design system generates a design representation of a digital design document that includes a plurality of digital design elements. Moreover, the digital design system anonymizes the design representation (e.g., anonymous particular text and/or user-identifiable information) by encoding text strings or other identifiable elements. Thus, in one or more embodiments the digital design system generates accurate and flexible representations while maintaining privacy of design content within digital design documents.

In one or more implementations, the digital design system also improves efficiency of implementing computing devices. Indeed, the digital design system can generate or recommend a variety of digital design document modifications that significantly reduce the time, user interfaces, and user interactions required to create and/or revise digital design documents. For instance, the digital design system utilizes a digital design multigraph to generate modified digital design documents. In particular, in one or more implementations, the digital design system moves, resizes, or otherwise modifies design elements within a digital design document. Moreover, in some implementations the digital design system recommends design variations, recommends text styles, identifies similar digital designs, and performs other modifications, significantly reducing the time, interactions, and computer resources needed for creating digital design documents.

Additional detail regarding the digital design system will now be provided with reference to the figures. For example, FIG. 1 illustrates a schematic diagram of an exemplary system environment 100 in which the digital design system 102 operates. As illustrated in FIG. 1, the system environment 100 includes a server(s) 106, digital media system 104, a network 108, an editing application 112, and client device 110.

Although the system environment 100 of FIG. 1 is depicted as having a particular number of components, the system environment 100 is capable of having any number of additional or alternative components (e.g., any number of servers, client devices, or other components in communication with the digital design system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 24). Moreover, the server(s) 106 and the client device 110 include one or more of a variety of computing devices (including one or more computing devices as discussed in greater detail with relation to FIG. 24).

As mentioned above, the system environment 100 includes the server(s) 106. In one or more embodiments, the server(s) 106 receive digital design documents and process requests to generate digital design multigraphs or resize digital design documents. In one or more embodiments, the server(s) 106 comprises a data server. In some implementations, the server(s) 106 comprises a communication server or a web-hosting server.

In one or more embodiments, the client device 110 includes computing devices that can edit, modify, convert, and/or provide, for display, digital design documents. For example, the client device 110 includes smartphones, tablets, desktop computers, laptop computers, head-mounted-display devices, or other electronic devices. The client device 110 includes one or more applications that can access, edit, modify, convert, and/or provide, for display, the digital design document. Additionally, or alternatively, the editing application 112 of the client device 110 includes a software application hosted on the server(s) 106 which may be accessed by the client device 110 through another application, such as a web browser.

To provide an example implementation, in some cases, the digital media system 104 on the server(s) 106 constructs digital design multigraphs from digital design documents and generates a structural representation based on the digital design multigraph. Moreover, the digital design system 102 utilizes the digital design multigraph to perform downstream tasks such as resizing or otherwise modifying digital design documents. Further the digital design system 102 on the server(s) 106 provides modified digital design documents for display via the client device 110.

In some implementations, the client device 110 obtains (e.g., downloads) the digital design system 102 from the server(s) 106. Once downloaded, the digital design system 102 on the client device 110 constructs digital design multigraphs from digital design documents and generates a structural representation based on the digital design multigraph. Furthermore, the digital design system 102 on the client device 110 can further utilize the digital design multigraph to perform specific tasks such as selecting a resizing model from a plurality of resizing models to resize a digital design document.

In some implementations, the digital design system 102 includes a web hosting application that allows the client device 110 to interact with content and services hosted on the server(s) 106. To illustrate, in one or more implementations, the client device 110 accesses a software application supported by the server(s) 106. In response, the digital design system 102 on the server(s) 106, generates digital design multigraph to perform specific tasks such as selecting a resizing model from a plurality of resizing models to resize a digital design document. The server(s) 106 then provides the resized digital design document or information corresponding to a generated digital design multigraph/structural representation to the client device 110 for display.

In some cases, the digital design system 102 on the client device 110 collects data from digital design documents supported by the server(s) 106. The client device 110 transmits the collection to the server(s) 106. In response, the digital design system 102 on the server(s) 106 further trains models (e.g., artificial intelligence models) to generate a recommended revision to the digital design document, generate a modified digital design document from the digital design document, or identify an additional digital design document corresponding to the digital design document.

The digital design system 102 is able to be implemented in whole, or in part, by the individual elements of the system environment 100. For instance, although FIG. 1 illustrates the digital design system 102 implemented with regard to the server(s) 106, different components of the digital design system 102 are able to be implemented by a variety of devices within the system environment 100. For example, one or more (or all) components of the digital design system 102 are implemented by a different computing device (e.g., the client device 110) or a separate server from the server(s) 106. Indeed, as shown in FIG. 1, the client device 110 includes the digital design system 102. Example components of the digital design system 102 will be described below with regard to FIG. 21.

As mentioned above, in one or more embodiments, the digital design system generates digital design multigraphs and structural representations for downstream tasks such as resizing of a digital design document. For example, the digital design system implements a privacy-preserving cloud-based document representation for processing and understanding digital design documents. In particular, the digital design system enables advanced downstream applications by defining a design representation from a digital design document, constructing a digital design multigraph to process the design representation, and performing higher-level document understanding tasks on the digital design multigraph.

Figure 2:
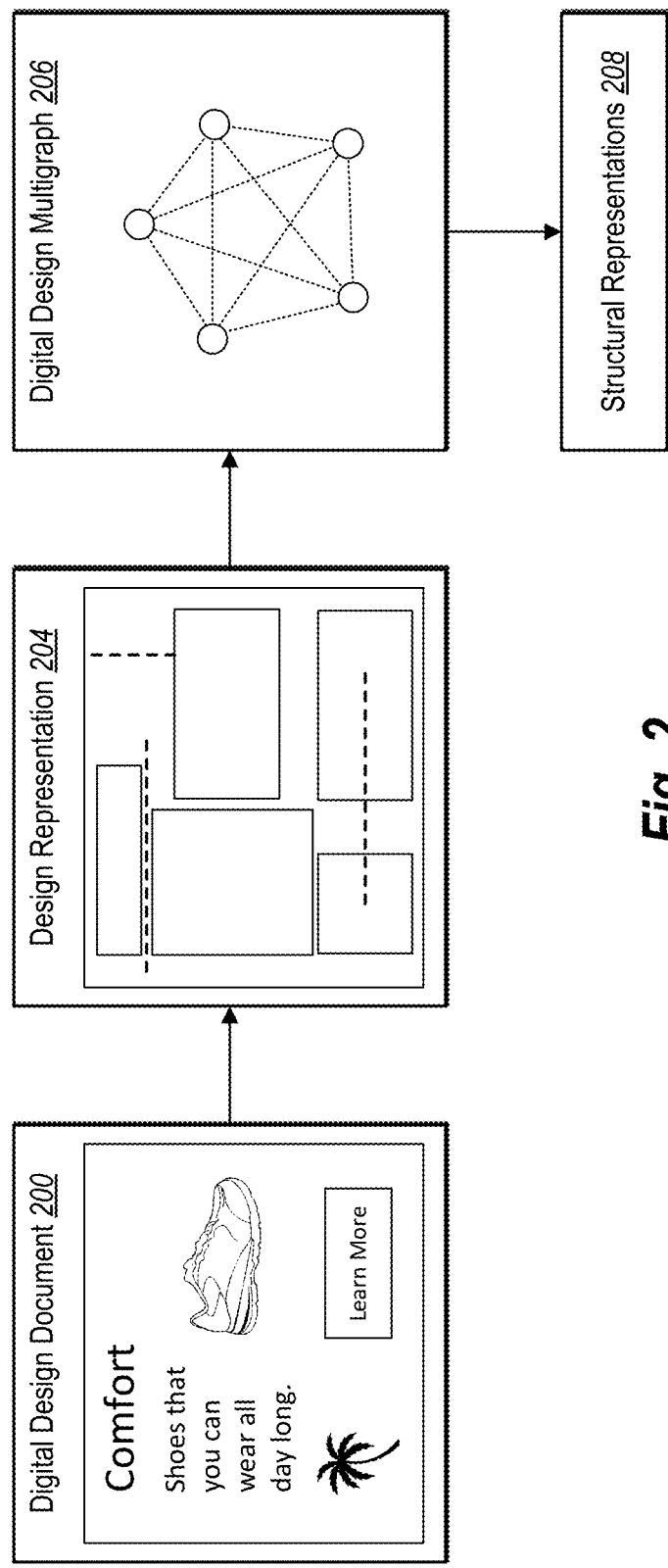
FIG. 2 illustrates an overview diagram of the digital design system generating structural representations in accordance with one or more embodiments.

For example, FIG. 2 illustrates a general overview of the digital design system 102 generating a digital design multigraph for downstream applications in accordance with one or more embodiments. In particular, FIG. 2 shows the digital design system 102 processing a digital design document 200. For example, the digital design document 200 includes a digital file comprising a visual representation of one or more design elements. In particular, the digital design document 200 includes digital design elements that fit within a dimension defining the bounds of the document. For instance, the digital design document 200 can include digital invitations, digital cards, digital fliers, digital posters, and various other digital files that include design elements such as text, images, and other artistic elements.

FIG. 2 shows the digital design system 102 generating a design representation 204 from the digital design document 200. Further, FIG. 2 shows the design representation 204 with various design properties, representative of the digital design document 200. For example, the digital design system 102 utilizes the design representation 204 as a high-level interchangeable format representative of the digital design document and interchangeable between various services. In particular, the digital design system 102 utilizes the design representation 204 for downstream tasks such as mapping structural information, artificial intelligence, or machine learning services. Moreover, the digital design system 102 utilizes the design representation 204 for downstream chaining of machine learning services to add further information such as design element semantics or to return layout suggestions. Furthermore, as mentioned above, the digital design system 102 anonymizes the design representation 204 by encoding user identifiable information. The digital design system 102 utilizes the design representation 204 to capture at least one of element properties, geometric properties, style properties, or inferred tags. More specific details relating to the design representation 204 is given below in the description of FIGS. 3A and 3B.

As shown in FIG. 2, the digital design system 102 utilizes the design representation 204 to generate/construct a digital design multigraph 206. For example, a digital design graph includes a representation of component relationships with one or more edges between a pair of nodes. Further, the digital design graph includes the digital design multigraph 206 which includes multiple edges between pairs of nodes. In particular, due to the ease of the digital design multigraph 206 being processed by machine-learning models, the digital design system 102 further utilizes the digital design multigraph 206 for machine-learning applications. For instance, the digital design multigraph 206 contains nodes and edges that represent relationships between various digital design elements. In particular, the digital design multigraph 206 captures various properties of the digital design document. Specifically, the nodes indicate and define digital design elements within the digital design document and the edges indicate relationships between nodes. As shown in FIG. 2, the digital design multigraph 206 contains five nodes and edges connecting the nodes to represent different relationships between the nodes. Additional details relating to the digital design multigraph 206 is given below (e.g., in relation to FIG. 4).

Furthermore, as mentioned, the digital design system 102 performs higher-level document understanding tasks by further generating structural representations from the digital design multigraph. For instance, FIG. 2 illustrates the digital design system 102 generating structural representations 208 from the digital design multigraph 206. For example, the structural representations 208 include a computer representation of the structure of a digital design document. In particular, the structural representations 208 can include numerical representations of interactions between digital design elements as reflected in a digital design multigraph. To illustrate, the structural representations can include feature representations, embedding vectors, and/or adjacency matrices. In particular, the digital design system 102 generates the structural representations 208 for the digital design document 200 based on the digital design multigraph 206. In additional, determining the structural representations 208 includes the digital design system 102 determining groups within the digital design document 200, generating a visual structural inference, or generating a feature representation.

As mentioned above, the structural representations 208 include feature representations. In one or more embodiments, the digital design system 102 generates the feature representation from the digital design multigraph 206. For example, the feature representation includes transforming the digital design document 200 into a set of features that represents the digital design elements within the digital design document 200. In particular, the digital design system 102 generates the feature representation by constructing the digital design multigraph 206 of the digital design elements within the digital design document 200. For instance, the digital design system 102 extracts the feature representation from the digital design multigraph 206. Moreover, the digital design system 102 utilizes the feature representation to perform downstream tasks such as determining which resizing model to select.

As also mentioned above, the structural representations include embedding vectors. In one or more embodiments, the digital design system 102 generates, utilizing a machine learning model, embedding vectors representing the digital design elements from the digital design multigraph 206. In particular, the embedding vectors represent digital design elements from the digital design multigraph 206. Embedding vectors represent the digital design multigraph 206 as a vector or a set of vectors in a feature space (e.g., a lower-dimensional space) and preserves the structure and relationships of the digital design multigraph 206 while making the digital design multigraph 206 easier to analyze and process. For instance, the digital design system 102 utilizes a digital design multigraph convolutional network with a series of convolutional layers to propagate information across the graph to learn representations that capture the underlying structure of the digital design multigraph 206. Moreover, once the digital design system 102 has generated the embedding vectors, the digital design system 102 further utilizes the embedding vectors for additional downstream machine learning tasks.

Further as also mentioned, the structural representation includes adjacency matrices, in other words a collection of two-dimensional connectivity matrices (e.g., a tensor). In particular, the digital design system 102 generates adjacency matrices that represent pairwise relations between digital design elements from the digital design multigraph 206. For instance, an adjacency matrix includes a symmetric matrix that represents the digital design multigraph 206 by indicating which pairs of nodes are adjacent (e.g., which pairs of nodes are connected by an edge). For instance, each row and column in the adjacency matrix corresponds to a node in the digital design multigraph 206 and the entries within the matrix indicate whether an edge connects the corresponding pair of nodes. As an example, if there is an entry of '1' within a row x and a column y in the adjacency matrix, this indicates an edge connecting node x and node y. For weighted edges within the digital design multigraph 206, the entry within a row and column corresponds to the weight of the corresponding edge between nodes.

As mentioned above, the digital design system 102 utilizes the digital design multigraph to perform higher-level document understanding tasks such as predicting element grouping as well as inferring the visual structure tree of a digital design document. Moreover, in one or more embodiments, the digital design system 102 utilizes the digital design multigraph and subsequent structural representations for specific downstream tasks such as resizing. For example, for resizing, the digital design system implements a pipeline of resizing strategy models to perform an effective machine learning driven orchestration for selecting a resizing model. Further, for resizing, the digital design system also implements various methods of ranking/scoring resizing models for utilization, utilizing fallback mechanisms, and evaluating the quality of the resized digital document. Additional details relating to the digital design system 102 utilizing the structural representations 208 for downstream tasks are given below (e.g., in relation to FIG. 5B). Additional detail regarding resizing digital design documents is also proved below (e.g., in relation to FIGS. 12-16).

As mentioned above, in one or more embodiments, the digital design system 102 generates a design representation from a digital design document. For example, FIG. 3A illustrates the digital design system 102 processing a digital design document 300 to generate a design representation, in accordance with one or more embodiments.

Figure 3A:
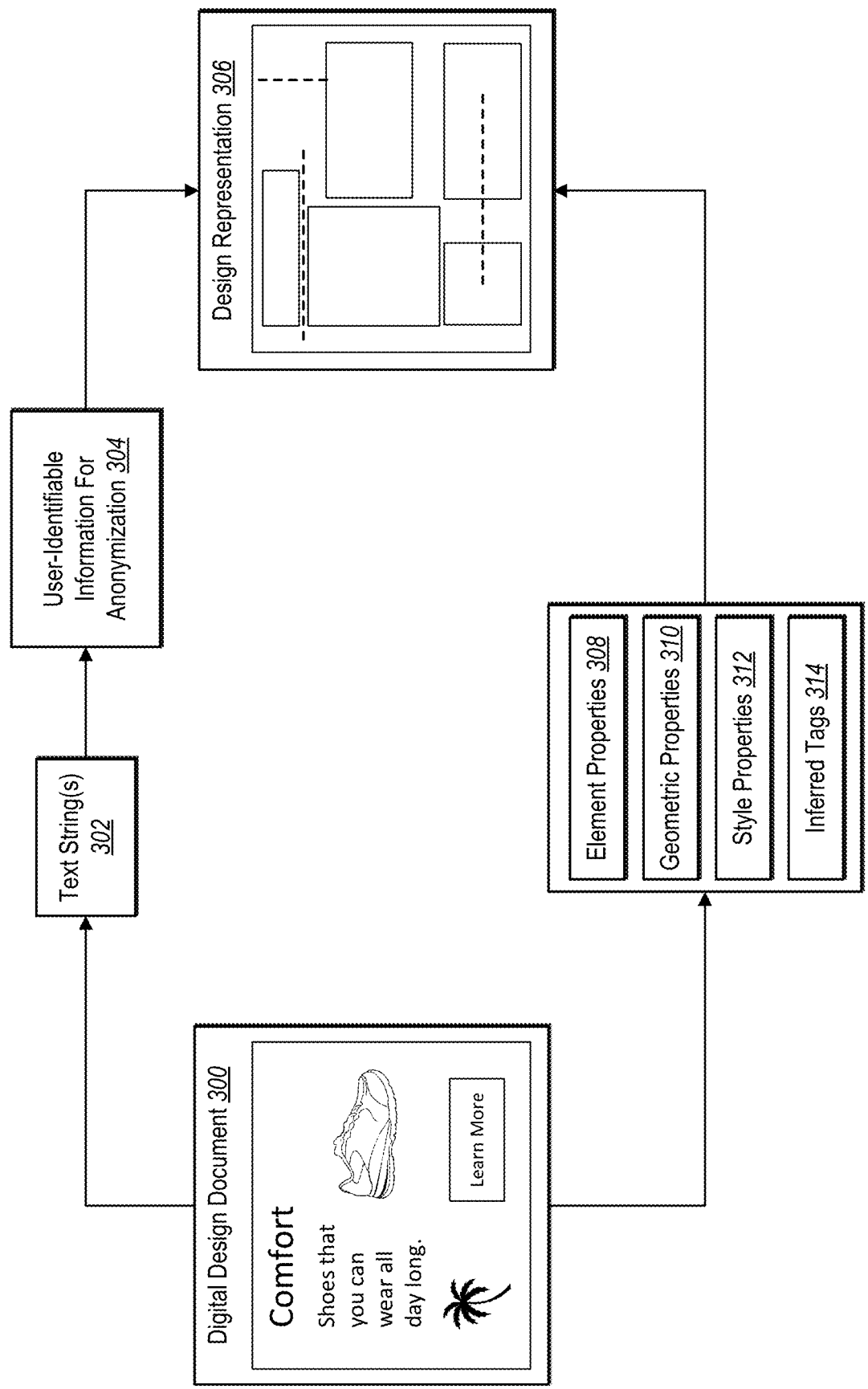
FIG. 3A illustrates a diagram for the digital design system generating a design representation in accordance with one or more embodiments.

For example, FIG. 3A shows the digital design system 102 processing a digital design document 300 for anonymization. In particular, as mentioned previously, the digital design system 102 overcomes privacy issues dealing with user identifiable information by anonymizing information from digital design documents (e.g., anonymizing user identifiable information such as text strings). For example, FIG. 3A shows the digital design system 102 extracting text string(s) 302. In particular, the digital design system 102 processes the digital design document 300 to identify all textual elements. Furthermore, the digital design system 102 utilizes a machine learning or heuristic model to identify portions of textual elements that include user identifiable information. In some instances, the digital design system 102 anonymizes all textual elements.

As shown, the digital design system 102 performs anonymization of the digital design document 300 by encoding digital design elements. Specifically, FIG. 3A shows the digital design system 102 encoding user-identifiable information 304 for anonymization. In effect, the digital design system 102 strips away the user-identifiable information 304. In one or more embodiments, the digital design system 102 extracts the text string(s) 302 and encodes the text strings by replacing the content of the text string(s) with a predetermined character. In particular, the digital design system 102 anonymizes the text string(s) 302 and replaces all text characters with a lower case 'a'. To illustrate, the digital design system 102 would extract the text string "Hello America!!" and encode "Hello America!!" to read "aaaaa aaaaaaaaa." To further illustrate, as shown in FIG. 3A, the digital design document 300 has text strings that read "Comfort," "shoes that you can wear all day long," and "learn more." The digital design system 102 extracts the text string(s) 302 and replaces the text characters with a predetermined character such as 'a.'

Furthermore, in one or more embodiments, the digital design system 102 processes the digital design document 300 to identify various categories of digital design elements within the digital design document 300. In particular, the digital design system 102 identifies various categories of digital design elements to ensure proper anonymization of user content within the digital design document 300. For instance, the digital design system 102 identifies URLs to content within the digital design document 300 and further identifies personal user uploads. In identifying URLs to content within the digital design document 300, the digital design system 102 can preserve content added via a search engine or online website such as digital images or graphical elements. Specifically, in some implementations, the digital design system 102 does not anonymize content associated with a URL since the content was added via a public website. Additionally, in some implementations, for personal uploads of images (e.g., user uploaded content), the digital design system 102 encodes personal uploads for anonymization. For instance, the digital design system 102 generates a hash indicative of the personal upload to preserve the structural information but anonymizes the actual content.

In addition to anonymization, FIG. 3A further shows the digital design system 102 determining various properties from the digital design document 300 to generate a design representation 306. For example, generating the design representation 306 includes extracting element properties 308 and geometric properties 310 from the digital design document 300. In particular element properties 308 refers to characteristics or properties of digital design elements within a digital design document. For instance, the element properties 308 can include unique identifiers, types of elements, source URLs, and relationships between digital design elements. To illustrates, types of elements refers to categories or classes of digital design elements, including text element types, image element types, and shape element types. Furthermore, the element properties 308 can indicate element groups (e.g., automatically identified/generated groups and/or user identified groups). Element properties can also include relationship information across digital design elements, such as similarity, proximity, continuity, alignment (e.g., vertical or horizontal alignment), overlap, symmetry, spacing, and semantic relationship.

Moreover, as mentioned the digital design system 102 utilizes the design representation 306 to capture the geometric properties 310. In particular, the geometric properties 310 include geometric characteristics corresponding to digital design elements. For instance, the geometric properties 310 can include element sizes and location/position of elements.

FIG. 3A further shows the digital design system 102 generating the design representation 306 by extracting/ determining from the digital design document 300, at least one of style properties 312 or inferred tags 314. For example, style properties 312 refer to particular style characteristics of digital design elements in a digital design document. For instance, the style properties 312 can include color, opacity, background, colors, and blend modes.

Further, the inferred tags 314 refers to tags or meta data determined for digital design elements and/or digital design documents (e.g., determined by a machine learning model). To illustrate, the inferred tags 314 can include element groupings (e.g., determined by a machine learning model), a label or purpose for a digital design element (e.g., determining that at text string is a title or header), a topic or type of a digital design document (e.g., determining that a document is a birthday party announcement). Thus, inferred tags 314 includes information the digital design system 102 infers from content or the digital design document 300 itself. For instance, the digital design system 102 adds inferred tags 314 to a text string to tag the text string as a title. In other instances, the digital design system 102 tags the text string as relating to "birthdays."

In one or more embodiments, the digital design system 102 passes the digital design document 300 to a tagging model. In particular, the digital design system 102 passes the digital design document 300 to a tagging model to generate the inferred tags 314 for further generating the design representation 306. For instance, the digital design system 102 utilizes a pre-trained tagging model trained to tag various elements within the digital design document 300.

FIG. 3A further shows the digital design system 102 generating the design representation 306 based on the element properties 308, the geometric properties 310, the style properties 312, the inferred tags 314 (e.g., upon anonymization). For example, the design representation 306 includes a lightweight, human readable file such that the design representation 306 can be easily stored and used as a common format between various services (e.g., using a common design representation to allow devices to communicate and collaborate via a service application programming interface (API)). Moreover, the design representation 306 further contains inferred structural information about the digital design document 300 such as which digital design elements should be grouped together, and which digital design element should be aligned.

For example, the digital design system 102 utilizes the design representation 306 for downstream mapping, modeling, or machine learning tasks and services. For instance, the digital design system 102 utilizes the design representation 306 for its chainable nature, meaning that the digital design system 102 passes the design representation 306 from one application, service, or platform to another while accumulating information for a particular task. Furthermore, the chainable nature of the design representation 306 improves collaboration between various applications.

Figure 3B:
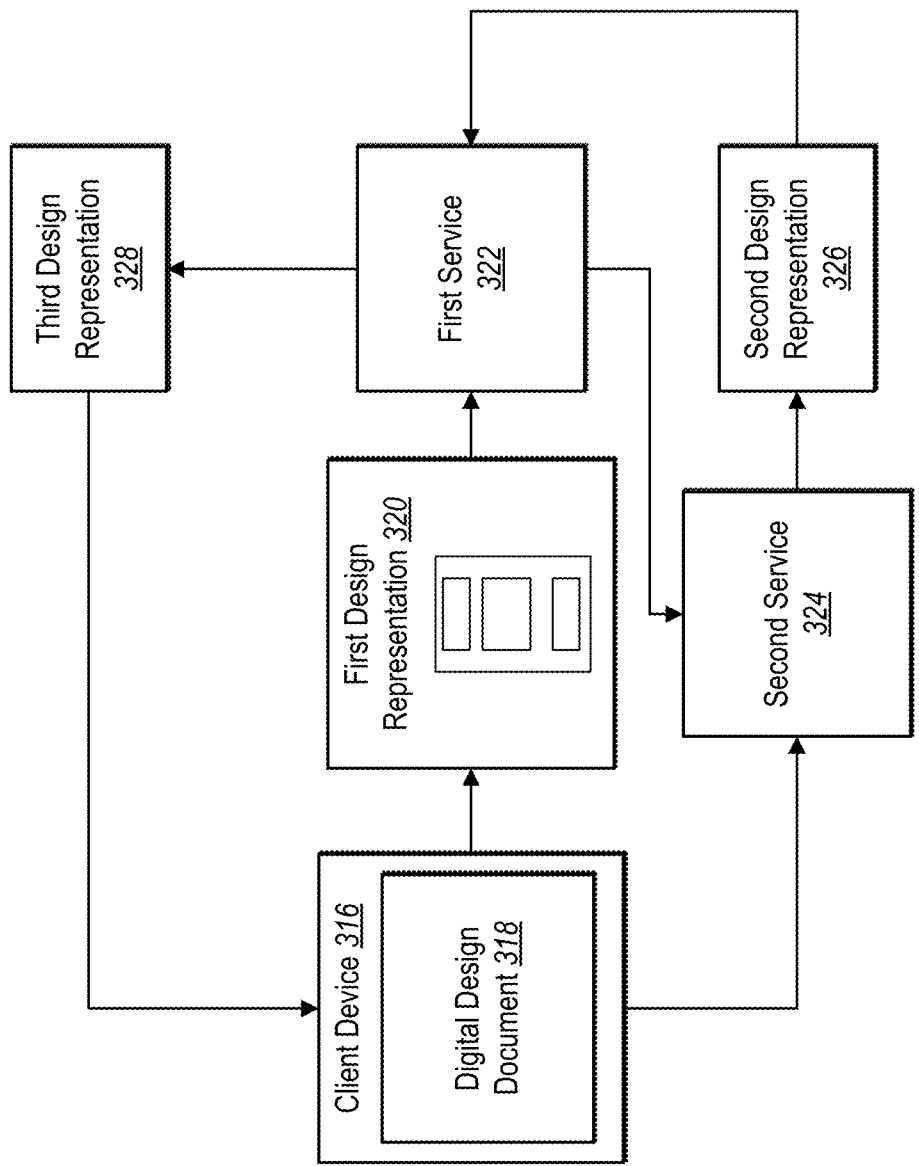
FIG. 3B illustrates a diagram for the digital design system utilizing various services to generate design representations in accordance with one or more embodiments.

FIG. 3B illustrates an example collaboration between various applications utilizing a design representation, in accordance with one or more embodiments. For example, FIG. 3B shows a client device 316 with a digital design document 318. In particular, FIG. 3B illustrates the digital design system 102 employing the chainable nature of design representations. For instance, FIG. 3B shows the digital design system 102 generating a first design representation 320 from the digital design document 318 and passing the first design representation 320 to a first service 322. In one or more embodiments, a service includes one or more computing devices that performs a specific task or function. In particular, the service includes applications that perform tasks such as determining tags, resizing, generating recommendations, generating design variations, or performing similarity searches.

Furthermore, FIG. 3B illustrates additional services collaborating with the first service 322. For example, FIG. 3B shows the first service 322 communicating with or invoking a second service 324. In particular, the second service 324 also receives information regarding the digital design document 318. For instance, the second service 324 analyzes the first design representation 320. Further, the second service 324 generates a second design representation 326. Moreover, the digital design system 102 utilizes the first service 322 to analyze the second design representation 326. Thus, the chainable nature of the design representations allows for the digital design system 102 to accumulate information from both the first design representation 320 and the second design representation 326. Additionally, as shown, the first service 322 generates a third design representation 328 from the second design representation 326. The digital design system 102 then provides the third design representation 328 to the client device 316.

As mentioned above, the digital design system 102 utilizes chainable design representations to accumulate information. To illustrate, in one or more embodiments, the digital design system 102 utilizes design representations for resizing a digital design document. In particular, the digital design system 102 receives an indication from a user of the client device 316 to resize the digital design document 318. The digital design system 102 generates the first design representation 320 of the digital design document 318 and passes the first design representation 320 to a first service 322, where the first service 322 acts as a resizing service.

Due to the first design representation 320 lacking sufficient structural information (e.g., information such as which digital design elements should be grouped together), the digital design system 102 communicates with the second service 324. For instance, the second service 324 generates the missing structural information for the digital design document (e.g., utilizing the first design representation 320). The digital design system 102 then causes the second service 324 to return the second design representation 326 to the first service 322. Further, the first service 322 creates a new layout for the desired resize based on the second design representation 326. Moreover, the first service 322 passes the new layout (e.g., the third design representation 328 representing the new layout) back to the client device 316. Accordingly, the client device 316 ingests the third design representation 328 with the new layout information, updates the digital design document 318, and renders the new layout.

Although FIG. 3B illustrates a particular sequence and number of services/design representations, the digital design system 102 can utilize a variety of different sequences, utilizing a variety of different services. Thus, for example, the digital design system 102 can utilize three or four services to iteratively update and modify a design representation for a digital design document. Thus, the system can efficiently and flexibly utilize the design representation for a digital design document to invoke and utilize multiple different services and platforms (e.g., machine learning models) to generate a modified digital design document.

Figure 4:
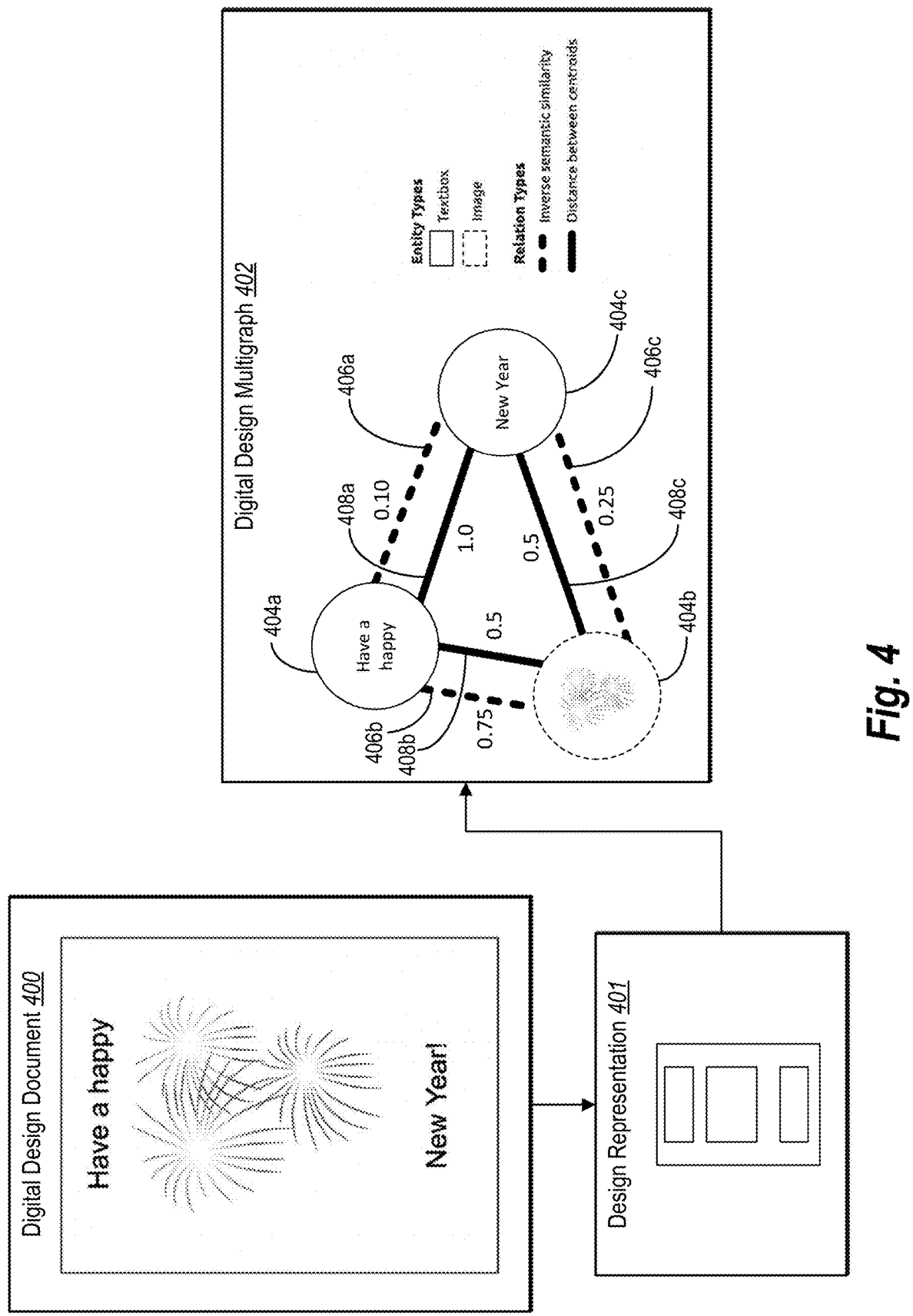
FIG. 4 illustrates a diagram of the digital design system generating a digital design multigraph with nodes and edges in accordance with one or more embodiments.

As mentioned above, in one or more embodiments, the digital design system 102 utilizes a design representation to generate a digital design multigraph. For example, FIG. 4 shows the digital design system 102 generating a digital design multigraph in accordance with one or more embodiments. For example, FIG. 4 shows the digital design system 102 processing a digital design document 400 to generate a design representation 401 (as just discussed with regard to FIGS. 3A-3B). Further, FIG. 4 shows the digital design system 102 generating a digital design multigraph 402 from the design representation 401.

As mentioned above, the digital design multigraph 402 includes nodes and edges to represent various digital design elements and the different relationships between them. For example, digital design elements include visual components that make up the digital design document 400. For instance, digital design elements include, text, images, shapes, lines, curves, vectors, or other visual elements utilized to generate a digital design document. Digital design documents can also include white space between or around elements. For instance, white space refers to the use of white or negative space to create balance between various elements and/or to separate digital design elements and highlight important information within the digital design document 400.

As just mentioned, the digital design multigraph 402 contains nodes. For example, the digital design system 102 generates nodes for the digital design multigraph 402 based on digital design elements. In particular, the digital design system 102 generates nodes that include information regarding a corresponding digital design element. Further, the digital design multigraph 402 typically includes multiple nodes (e.g., a set of nodes) where each node corresponds to a visual element (or group of visual elements) within the digital design document 400. Moreover, the digital design system 102 associates various features with nodes of the digital design multigraph 402, such as the digital design element's type (e.g., image, text, or shape), the area of the bounding box for the digital design element, and the absolute position of the digital design element, or node embeddings generated by other machine learning models.

As also just mentioned, the digital design system 102 generates edges. For example, the digital design system 102 generates edges between the nodes based on design properties of the digital design multigraph 402. In particular, edges indicate relationships between digital design elements of the digital design multigraph. There can exist multiple edges between any pair of nodes. Moreover, each individual edge includes a weight reflecting the strength of the relationships between the nodes it connects. For instance, in one or more embodiments edges include edge weights that represent similarity, physical layout, proximity (e.g., distance between centroids or distance to outer edges between elements), continuity, closure, area, alignment (e.g., vertical or horizontal alignment), overlap, symmetry, spacing, and semantic relationships. Thus, the digital design multigraph 402 can contain multiple types of edges between any pair of nodes.

For example, the digital design system 102 can determine a semantic similarity between digital design elements by utilizing a trained embedding model to embed digital design elements into a semantic feature space. The digital design system 102 can then compare distances between digital design elements within the semantic feature space to determine a measure of semantic similarity. The digital design system 102 can utilize the measure of semantic similarity as an edge weight for a semantic similarity edge type between nodes. As mentioned, the digital design system 102 can determine a variety of relationships between digital design elements and generate edge weights based on a measure of similarity.

As shown in FIG. 4, the digital design multigraph 402 contains weights associated with each edge that connects two nodes. For example, in context of digital design multigraphs, weights relate to a numerical value assigned to each edge that connects two nodes. In particular, the digital design system 102 utilizes weights to represent the intensity, strength, or magnitude of a relationship or connection between two nodes in the digital design multigraph 402. Furthermore, weights for edges assist the digital design system 102 in downstream tasks by considering the strength of connections between nodes and also highlights important relationships within the digital design multigraph 402.

Moreover, as shown, the digital design system 102 generates the digital design multigraph 402 representative of the digital design document 400. For example, the digital design multigraph 402 shows a node 404a representing the text "Have a happy," a node 404b representing the fireworks image, and a node 404c representing "New Year!" In particular, the digital design multigraph 402 also shows various edges connecting the nodes 404a-404c. For instance, edges 406a-406c represent an inverse semantic similarity (e.g., the higher the score the less similar the digital design elements). Accordingly, the edge 406a shows an inverse semantic similarity of 0.10 between "Have a happy" and "New Year!" indicating a high level of similarity. The edge 406b shows an inverse similarity between the fireworks and "Have a happy" as 0.75 and the edge 406c shows an inverse similarity between the fireworks and "New Year!" of 0.25. Moreover, the edges 408a-408c represent a physical distance between the centroids of each digital design element shown in the digital design document 400. Specifically, the edge 408a represents a distance of 1.0 between "Have a happy" and "New Year!" a distance of 0.5 between "New Year!" and the fireworks for the edge 408c, and a distance of 0.5 between the fireworks and "Have a happy" for the edge 408b.

Accordingly, as shown in FIG. 4, the digital design multigraph 402 acts as a network-based representation of visual elements present in the digital design document 400. In particular, the digital design multigraph 402 provides a succinct, flexible, and easily interpretable design summarization for downstream applications. For instance, the digital design system 102 utilizes the digital design multigraph 402 for ingestion by downstream artificial intelligence models or algorithms.

The digital design system 102 can utilize a variety of structural representations from the digital design multigraph. For example, in some implementations the digital design system 102 generates a connectivity matrix for each relationship type between digital design elements (e.g., an adjacency matrix from different edge types of the digital design multigraph). Moreover, in some implementations, the digital design system 102 utilizes a machine learning model to generate embedding vectors from the digital design multigraph. In particular, the digital design system 102 can generate entity embeddings for each of the different nodes that are present in a digital design multigraph. To illustrate, the digital design system 102 can utilize a text embedding model and/or an image embedding model. The digital design system 102 can combine embeddings from different models to generate a representation from a digital design multigraph.

Figure 5A:
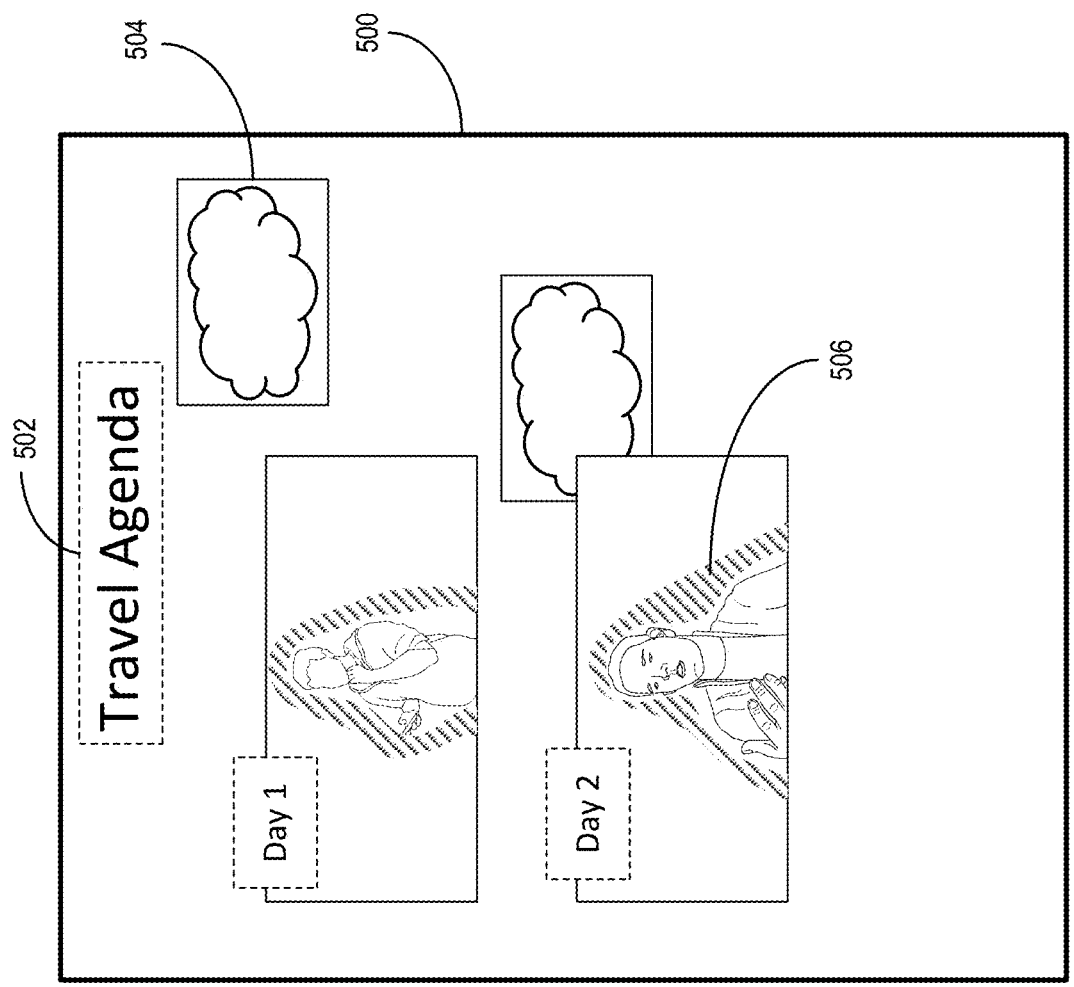
FIGS. 5A-5B illustrates an example of the digital design system determining various components of a digital design multigraph and generating adjacency matrices and embedding vectors in accordance with one or more embodiments.
Figure 5B:
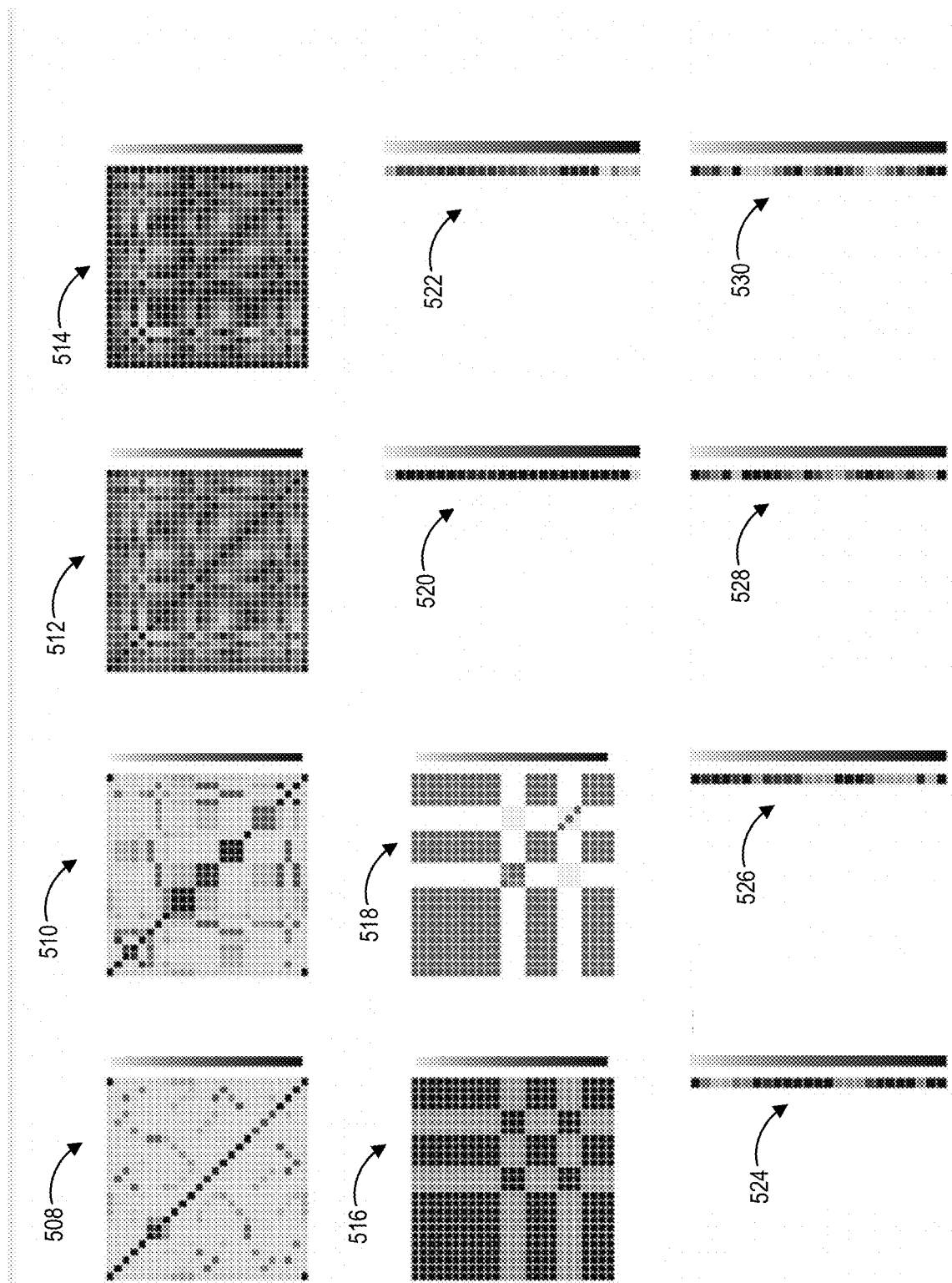

FIGS. 5A-5B illustrates the digital design system 102 determining a set of relations between digital design elements in a digital design document and visualizing the relationships with various heat maps, in accordance with one or more embodiments. FIG. 5A illustrates the digital design system 102 processing a digital design document 500 and identifying various digital design elements. In particular, FIG. 5A shows the digital design system 102 utilizing an algorithm model to outline and annotate various bounding box aspects and areas, as a precursor step for generating a structural representation. For instance, FIG. 5A shows the digital design system 102 utilizing a dotted line 502 around a digital design element to represent textual elements, a solid line 504 around a digital design element to represent shapes, and a hashed line 506 to represent images.

FIG. 5B illustrates heat maps of adjacency matrices of digital design multigraphs generated from the digital design document 500, and heat maps of embedding vectors for a subset of different digital design element metrics. For example, FIG. 5B shows matrices with symmetric rows and columns. In particular, FIG. 5B shows heatmaps 508-518 where the darker area on the heatmaps 508-518 indicates the closeness to zero of the pairwise edge between any two entities. For instance, FIG. 5B shows heatmaps 508-518 wide a wide variety of representations for relationships between digital design element entities within the digital design document 500. To illustrate, the heatmap 508 represents a horizontal overlap, heatmap 510 represents a vertical overlap, heatmap 512 represents a centroid distance, heatmap 514 represents a minimum distance, heatmap 516 represents a vertical alignment, and heatmap 518 represents a horizontal alignment. The digital design system 102 generates the heatmaps 508-518 by generating adjacency matrices from a digital design multigraph along edges reflecting the particular parameters mentioned above (e.g., overlap, distance, etc.). These adjacency matrices provide significant structural information regarding the overall digital design document and interactions between digital design elements for utilization in downstream applications.

As further shown, FIG. 5B also illustrates the heatmaps 520-530 which represent embedding vectors. For instance, the heatmaps 520-530 include embedding vectors determined for specific digital design element features. In some embodiments, the embedding vectors for the heatmaps 520-530 represent a computation of the area of the overall or normalized area of a bounding box corresponding to a digital design element or some other feature within the digital design document. To illustrate, FIG. 5B shows the heatmap 520 representing frame area, heatmap 522 representing frame aspect ratio, heatmap 524 representing distance to the left canvas edge, heatmap 526 representing distance to right canvas edge, heatmap 528 representing distance to top canvas edge, and heatmap 530 representing distance to bottom canvas edge. As mentioned previously, the digital design system 102 can utilize these structural representations in further downstream tasks to provide additional understanding regarding interactions within the digital design document.

Indeed, the digital design system 102 further utilizes the aforementioned matrices and embedding vectors in downstream machine learning applications to perform document understanding tasks such as resizing, generating recommendations, or generating variations of a digital design document. In particular, the digital design system 102 utilizes the structural representations (e.g., the adjacency matrices, embedding vectors, or feature representations) to generate a recommended revision to the digital design document, generate a modified digital design document from the digital design document, or identify an additional digital design document corresponding to the digital design document. Additional details relating to generating structural representations are given below (e.g., in relation to FIGS. 6-9).

Although not shown in FIGS. 5A-5B, in one or more embodiments, the digital design system 102 further utilizes the generated matrices discussed above in relation to FIG. 5B for non-machine learning applications. For example, the digital design system 102 utilizes the matrices in a matrix decomposition for segmentation, alignment detection, or other types of non-machine learning tasks.

Figure 6:
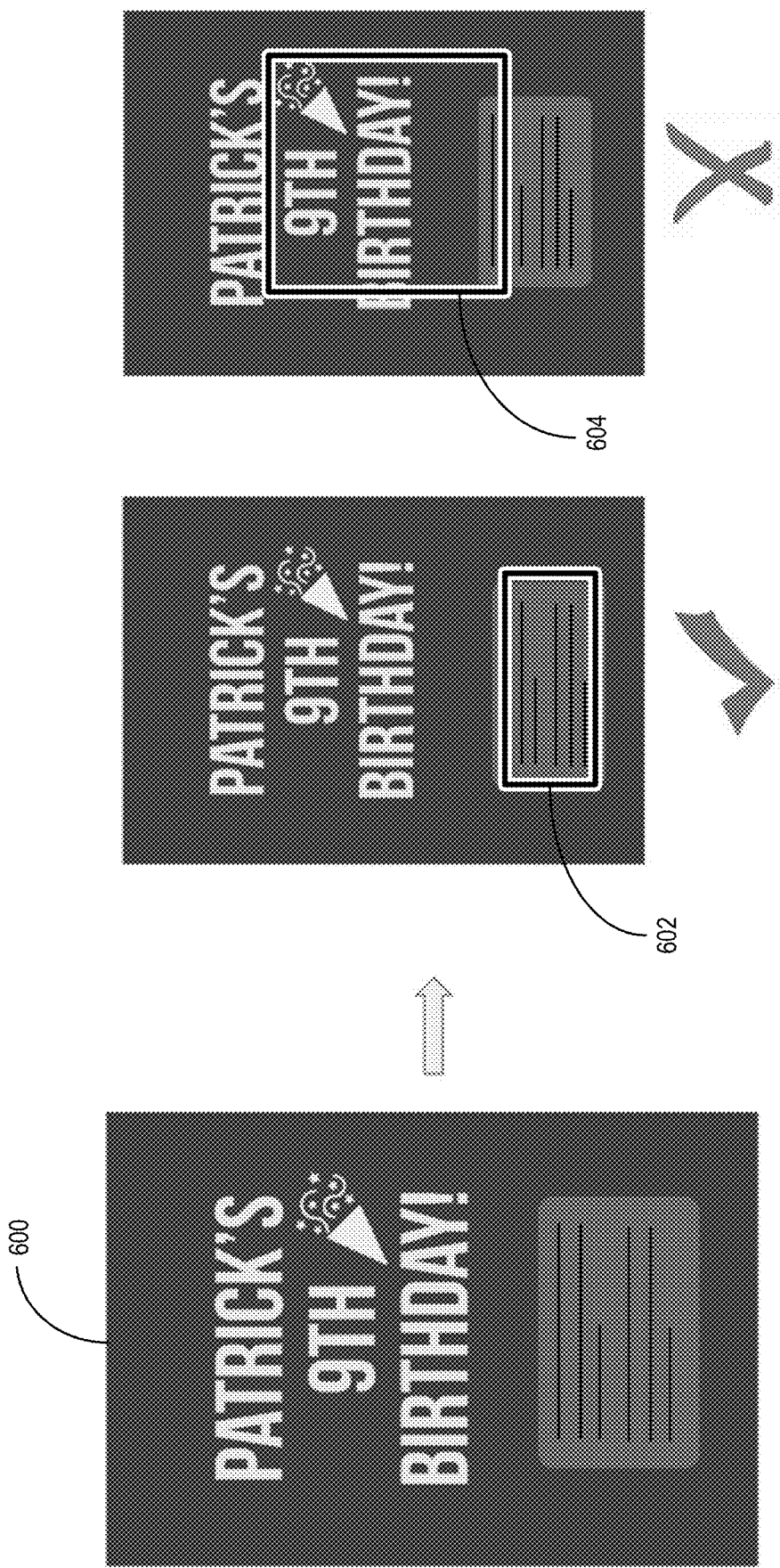
FIG. 6 illustrates the digital design system determining element grouping in accordance with one or more embodiments.

FIG. 6 illustrates the digital design system 102 performing document understanding tasks by generating structural representations in accordance with one or more embodiments. For example, FIG. 6 shows the digital design system 102 detecting design element groupings for a digital design document 600 utilizing a machine learning model. In particular, FIG. 6 shows the digital design system 102 considering two elements within a digital design document and scoring the potential grouping utilizing a machine learning model.

In one or more embodiments, the digital design system 102 intelligently groups digital design elements within a digital design document despite the unstructured nature of a digital design document. For instance, the digital design system 102 utilizes a machine learning model for scoring potential groups of digital design elements by assigning a grouping score. Specifically, the digital design system 102 utilizes a machine learning model to determine whether two element should be grouped together. In particular, the digital design system 102 utilizes a machine learning model to consider two elements and returns a score specifying indications such as physical distance and similarity.

For example, the digital design system utilizes a grouping machine learning model. In particular, the digital design system 102 pre-trains the grouping machine learning model on examples of various groupings within digital design documents and learns parameters to predict which elements are likely or less likely to be considered part of the same group. Furthermore, as mentioned, the digital design system 102 utilizes the grouping machine learning model to generate a grouping score based on processing two or more elements.

For instance, in one or more example embodiments, the digital design system 102 generates, utilizing a grouping machine-learning model, a grouping score from a first digital design element and a second digital design element within the digital design document based on the digital design multigraph. In particular, the digital design system 102 determines that the first digital design element and the second digital design element are part of a first group based on the grouping score. To illustrate, FIG. 6 shows the digital design system 102 considering a first grouping 602 and a second grouping 604. In particular, FIG. 6 shows the digital design system 102 determining a grouping score that indicates that the first grouping 602 of digital design elements as valid whereas the digital design system 102 determines the second grouping 604 as invalid.

Figure 7:
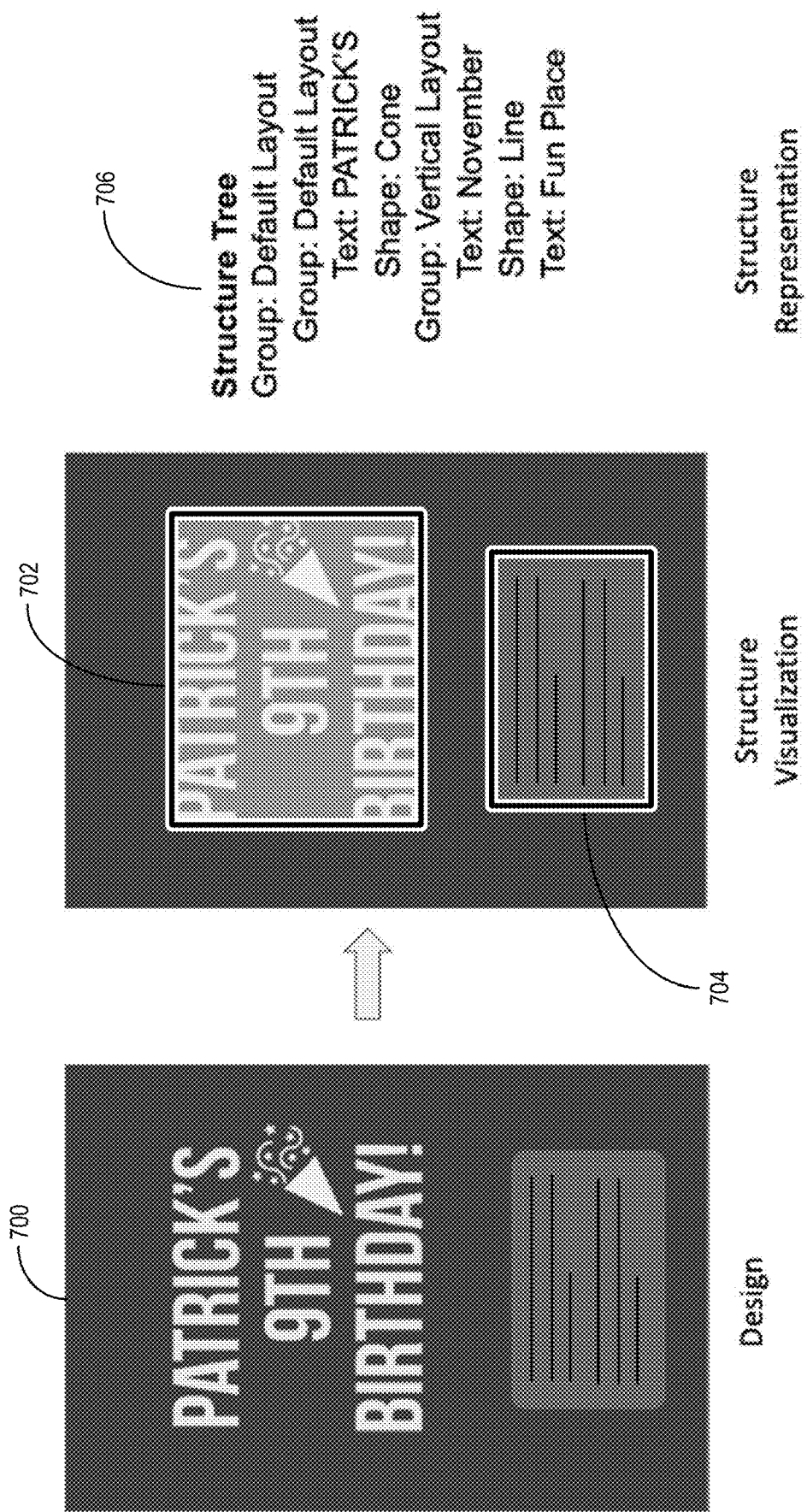
FIG. 7 illustrates an example of the digital design system generating a visual structure inference in accordance with one or more embodiments.

FIG. 7 illustrates an example of the digital design system 102 generating a visual structure inference. For example, the digital design system 102 generates the visual structure inference by determining the visual structure of a digital design document 700. In particular, the digital design system 102 generates a representation of perceived relationships between elements within the digital design document 700 rather than explicit elements specified by a user. For instance, during creation of a digital design document, a designer may place a title and subtitle in close proximity while not explicitly grouping the title and subtitle. Visually, the title and subtitle seem to be part of the same group, thus the digital design system 102 preserves the inferred implicit relationships shown within the digital design document 700.

As just mentioned, the digital design system 102 preserves inferred implicit relationships within the digital design document 700. For example, the digital design system 102 groups elements based on the grouping scores discussed in FIG. 6 and infers positioning information (e.g., utilizing the digital design multigraph). In particular, the digital design system 102 infers positioning information such as whether grouped elements are stacked vertically or horizontally. Accordingly, the digital design system 102 generates the visual structure inference with leaf nodes representing digital design elements in the design and higher-level nodes represent visual groups. To illustrate, the digital design system 102 generates the visual structure inference by utilizing a greedy bottom-up merging algorithm to group elements and infer positioning information.

As an example, the digital design system 102 processes the digital design document 700 that contains a set of digital design elements. In particular, FIG. 7 shows the digital design system 102 utilizing a grouping machine-learning model (e.g., the model described in FIG. 6) to determine a first grouping 702 and a second grouping 704 of the digital design document 700.

Moreover, as an example, FIG. 7 shows the digital design system 102 generating a visual structure inference 706 from the digital design document 700. Namely, the visual structure inference 706 shown in FIG. 7 contains nodes and leaf nodes. Specifically, FIG. 7 shows the nodes as default layout and vertical layout. Thus, the parent node "group: Default Layout" represents the broadest group, e.g., the entire digital design document. The subsequent nodes "group: Default Layout" and "group: Vertical Layout" shows sub-groups of the digital design document 700. Moreover, each node contains leaf nodes such as "Text: Patrick's," "Shape: Cone," "Text: November," "Shape: Line," and "Text: Fun Place".

Figure 8:
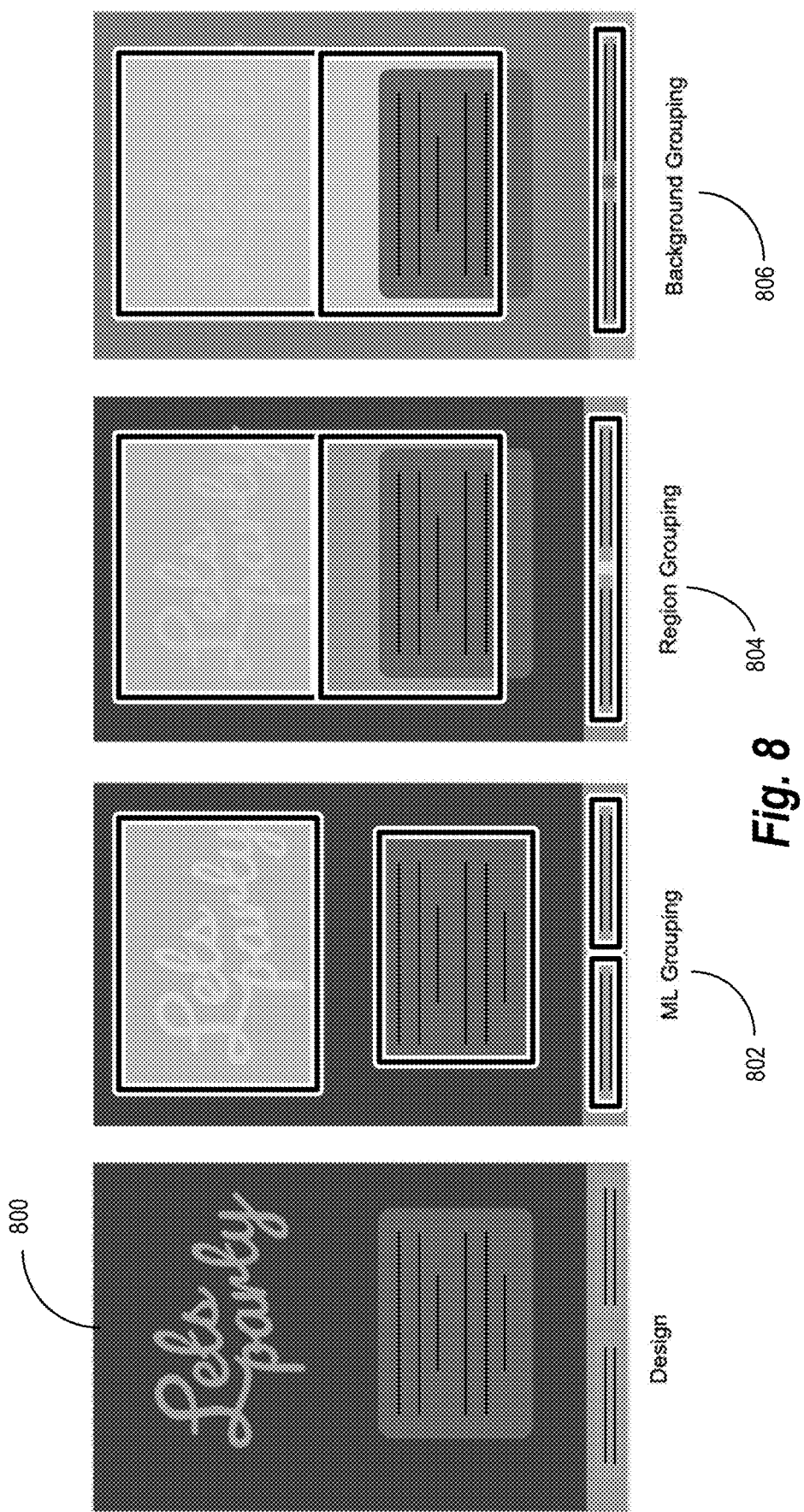
FIG. 8 illustrates an example of the digital design system generating a visual structure inference in accordance with one or more embodiments.

FIG. 8 illustrates a visualization of the steps performed by the digital design system 102 to generate a visual structure inference. For example, to generate the visual structure inference, the digital design system 102 generates foreground leaf nodes and background leaf nodes from the plurality of digital design elements within a digital design document 800. In particular, the digital design system 102 further determines, utilizing a grouping machine-learning model, a first element grouping from the foreground leaf nodes and a second element grouping from the background leaf nodes. Moreover, the digital design system 102 generates a visual structure inference that includes the first element grouping and the second element grouping.

As shown in FIG. 8, the digital design system 102 performs machine-learning based grouping (discussed above), merges elements, and creates background nodes constrained to the underlying grid layout of the digital design document 800. For example, FIG. 8 shows the digital design system utilizing machine learning grouping 802 to determine whether various digital design elements should be grouped together. Further, the digital design system 102 performs region grouping 804 to merge groups based on heuristics (e.g., such as proximity). Moreover, the digital design system 102 generates background nodes to perform background grouping 806. To illustrate, the digital design system 102 utilizes an algorithm to i) create leaf nodes for all digital design elements within the digital design document, ii) split nodes into background and foreground sets, iii) for both background and foreground sets generate groups with the machine learning grouping model, merge groups, and create background nodes, and iv) combine the background and foreground sets (e.g., add root level children together).

Figure 9:
FIG. 9 illustrates an example of the digital design system generating a visual structure inference from a digital design document in accordance with one or more embodiments.

FIG. 9 illustrates another digital design document, and the following description provides details for generating a visual structure inference of the digital design document shown. For example, FIG. 9 shows four foreground elements, a first foreground element 900 "TIME TO," a second foreground element 902 "FUN WILL BE . . . ," a third foreground element 904 "toast," and a fourth foreground element 905 "Register now . . . " Further, FIG. 9 shows a background image 906. For instance, the digital design system 102 utilizing the grouping model discussed above to produce a set of distances between the four foreground elements, as represented by the following matrix:

[0.19, 0.88, 0.06, 0.83]
[0.82, 0.18, 0.95, 0.71]
[0.06, 0.97, 0.20, 0.98]
[0.74, 0.69, 0.97, 0.18]

For instance, the above matrix shows that that the first foreground element 900 has a small distance away from the third foreground element 904 (e.g., a distance of 0.06) whereas all the other text elements have distances of over 0.6. Because of this, the digital design system 102 utilizing the grouping model determines a grouping between the first foreground element 900 and the third foreground element 904. However, the digital design system 102 determines no groupings between the other elements (e.g., due to distance apart).

Furthermore, the digital design system 102 based on the above matrix can generate a visual structure inference tree such as:

---
Group: Default Layout
  Group: Vertical Layout
    Group: Default Layout
      text: "TIME TO"
      text: "toast"
    text: "Register now..."
    text: "FUN WILL BE..."

---

Accordingly, the visual structure inference tree shows the first foreground element 900 "TIME TO" and the third foreground element 904 "toast" merged into a single group with a default layout and further merged into a vertical layout group (e.g., the meta group) with "Register now . . . " and "FUN WILL BE . . . ."

As discussed in the descriptions of FIGS. 6-9, the digital design system 102 generates various structural representations. Moreover, the digital design system 102 further utilizes the structural representations for performing downstream tasks. In one or more embodiments, the digital design system 102 utilizes the structural representations to perform a resizing of the digital design document. In particular, the digital design system 102 utilizes the structural representation to obtain a visual structure of a digital design document for resizing the digital design document to another size (e.g., converting a widescreen banner to a portrait post size). Additional details regarding the resizing of digital design documents are provided below (e.g., starting at FIG. 12).

As mentioned above, in one or more embodiments, the digital design system 102 generates style recommendations. In particular, the digital design system 102 generates a style recommendation based on the feature representation to replace at least one of text, font, color, or shapes within the digital design document. For instance, style recommendations include the digital design system 102 suggesting or providing tailored recommendations regarding text, fonts, colors, or shapes for different portions of the digital design document. To illustrate, the digital design system 102 generates style recommendations for a font by recommending a specific font for a header and a different font for body text. Similarly, the digital design system 102 can generate a first font for a first color scheme or overall document style and a second font for a second color scheme or overall document style.

For example, the digital design system 102 generates the style recommendation by training a recommendation model. In particular, the digital design system 102 processes a digital design document using a style recommendation machine learning model, generates embeddings using the style recommendation machine learning model and compares the embeddings to existing embeddings of text, font, color, or shapes to recommend similar elements. In some embodiments, the digital design system 102 generates the style recommendation model by training the style recommendation machine learning model on ground truth samples. In particular, the digital design system 102 can generate digital design multigraphs and leave out one or more font selections from the digital design multigraphs. The digital design system 102 can process the digital design multigraphs utilizing a machine learning model to predict a font. The digital design system 102 can then compare the predicted font with the actual font utilized in the digital design system to teach the machine learning model to select a realistic font. In this manner, the digital design system 102 can train a machine learning model to select similar fonts, colors, text, or shapes from a digital design multigraph.

Furthermore, in one or more embodiments, the digital design system 102 generates a modified digital design document from a digital design document by generating a layout different than a layout of the digital design document based on a feature representation. In particular, modified digital design documents include the digital design system 102 generating design variations of the digital design document. In particular, the modified digital design document includes variations such as a new layout or style based on the digital design document. For example, as described above, the digital design system 102 can train a machine learning model to predict design variations. For instance, the digital design system 102 can omit a particular design feature (e.g., layout or other features) and utilize the actual features of the digital design document to train the machine learning model to generate realistic design alternatives.

Moreover, in generating design variations or alternatives, an understanding of the overall document structure can be critical. Thus, in utilizing a design variation model to select an alternative design, the digital design system 102 can utilize high-level document features, such as element grouping, element layout, element purposes/labels, document purpose, etc. to suggest design alternatives.

Moreover, in one or more embodiments, the digital design system 102 identifies additional or alternative digital design documents (e.g., performs digital design searches). For example, the digital design system 102 can identify similar digital design documents from a set of digital design documents. To illustrate, the digital design system 102 can generate feature representations for a set of digital design documents from additional digital design multigraphs. The digital design system 102 can compare these feature representations to a feature representation of a particular digital design document to select a similar digital design document (e.g., the closest digital design document). Thus, the digital design system 102 can determine similarity with other digital design document based on layout, colors, and other digital design properties reflected in a digital design multigraph. Additionally, the digital design system 102 provides results to a client device based on the identified additional digital design document(s).

Figure 10:
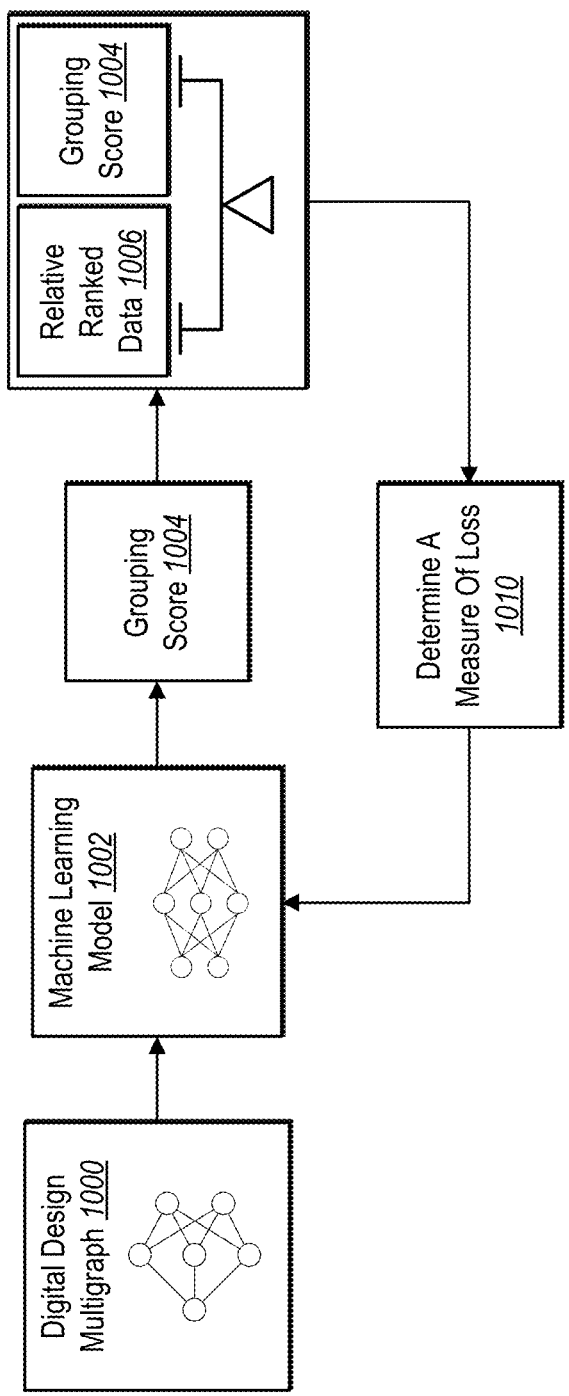
FIG. 10 illustrates an example diagram of the digital design system training a grouping machine learning model in accordance with one or more embodiments.

FIG. 10 illustrates the digital design system 102 training a machine learning model for grouping digital design elements. For example, FIG. 10 shows the digital design system 102 processing a digital design multigraph 1000 via a machine learning model 1002 and generating a grouping score 1004 between two digital design elements within the digital design multigraph (e.g., two nodes). In particular, as previously discussed, the grouping score 1004 represents a confidence or likelihood that two element belong to a same group (e.g., whether the two elements should be grouped together). To illustrate, the digital design system 102 utilizes the machine learning model 1002 to generate a grouping score between a first node and a second node of the digital design multigraph 1000.

Furthermore, as shown, the digital design system 102 compares the grouping score 1004 between the first and second node with relative ranked data 1006. The relative ranked data 1006 acts as a ground truth to train the machine learning model 1002. Additional details of how the digital design system 102 obtains the relative ranked data is given below in the description of FIG. 11.

Moreover, as shown, the digital design system 102 propagates a determined measure of loss 1010 back to the machine learning model 1002. In particular, the digital design system 102 modifies parameters of the machine learning model 1002 to more accurately generate grouping scores between various digital design elements.

Figure 11:
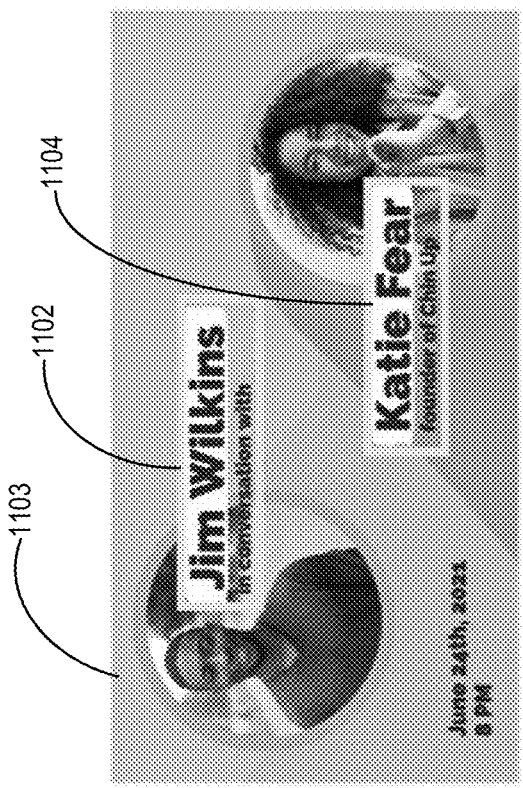
FIG. 11 illustrates the digital design system utilizing digital design documents with designer-created groups for downstream training of grouping machine learning models in accordance with one or more embodiments.
Figure 11:
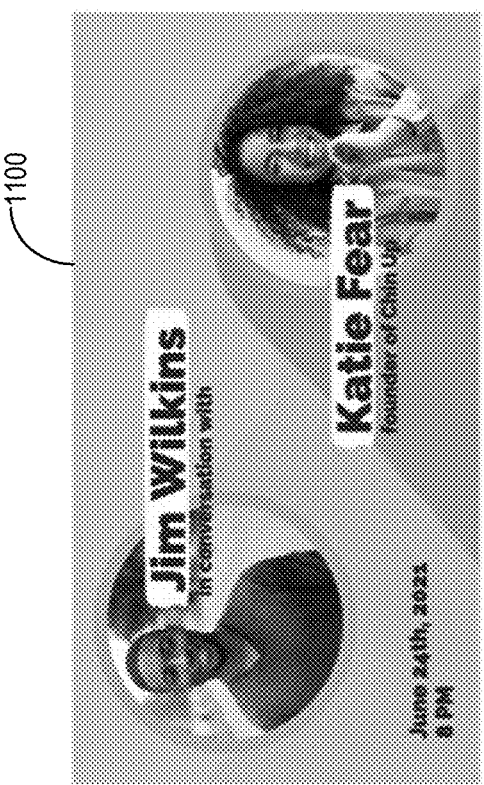

FIG. 11 shows the digital design system 102 training a grouping machine learning model with relative ranked data. For example, the digital design system 102 utilizes manually created groups as part of the training technique. Due to designers rarely grouping elements together, the digital design system 102 has access to imbalanced datasets (e.g., lacking negative examples of what a group is not). In particular, FIG. 11 shows an initial design 1100 and a grouped design 1103. For instance, in the grouped design 1103, the designer indicates two groups i) "Jim Wilkins"+"in conversation with" (e.g., a first group 1102) and ii) "Katie Fear"+"founder of Chin Up" (e.g., a second group 1104). Further, designers did not group the images and the borders around the images shown with the text.

In one or more embodiments, the digital design system 102 determines relative ranked data by ranking the designer grouped "Jim Wilkins"+"in conversation with" higher than "Jim Wilkins"+associated image. Likewise, the digital design system 102 ranks "Katie Fear"+"founder of Chin Up" higher than "Katie Fear"+associated image. For instance, the digital design system 102 samples triplets from a training dataset with one anchor element, an element grouped with the anchor element, and another element not grouped. In particular, the digital design system 102 extracts over 225,000 triplets (e.g., anchor, grouped with anchor, and not grouped) from a dataset for training a grouping machine learning model.

Moreover, the digital design system 102 analyzes, utilizing the grouping machine learning model, a set of vector features derived from a first digital design element and a second digital design element from a digital design multigraph. In particular, the set of features includes the intersection of digital design elements, the difference in area, type, or color, the number of elements between the first digital design element and the second digital design element, and other similar features. Furthermore, the digital design system 102 processes the inputs via the grouping machine learning model to predict a groping score by comparing the grouping score with the relative ranked data (e.g., the triplets). Moreover, the grouping score includes a number between 0 and 1, where 0 indicates a small distance between elements and 1 indicates a large distance between elements.

As mentioned above, FIG. 12 shows an overview diagram of the digital design system 102 resizing a digital design document in accordance with one or more embodiments. For example, as shown, the digital design system 102 processes a digital design document 1200 (e.g., the digital design document 200 discussed in FIG. 2). In particular, the digital design system 102 receives via a client application of a client device a request to perform a resizing of the digital design document 1200. In response, the digital design system 102 selects a resizing model and applies the resizing model to generate a resized digital document.

As shown, the digital design system 102 generates a feature representation 1202 from the digital design document 1200. To reiterate, the feature representation 1202 comprises a set of representative features of the digital design document. The digital design system 102 can the feature representation 1202 for the digital design document 1200 utilizing a variety of computer-implemented algorithms or models. For example, the digital design system 102 can utilize a trained embedding model to generate the feature representation 1202 of the digital design document 1200. In some embodiments, the digital design system 102 generates the feature representation 1202 by constructing a digital design multigraph of the digital design document 1200 (e.g., as discussed above in FIGS. 2 and 4). Indeed, the digital design system 102 can utilize the principles discussed in FIGS. 1-11 to obtain structural representations of the digital design document 1200. Specific details relating to the digital design system 102 utilizing structural representations for resizing is given below in the description of FIG. 15D.

Figure 12:
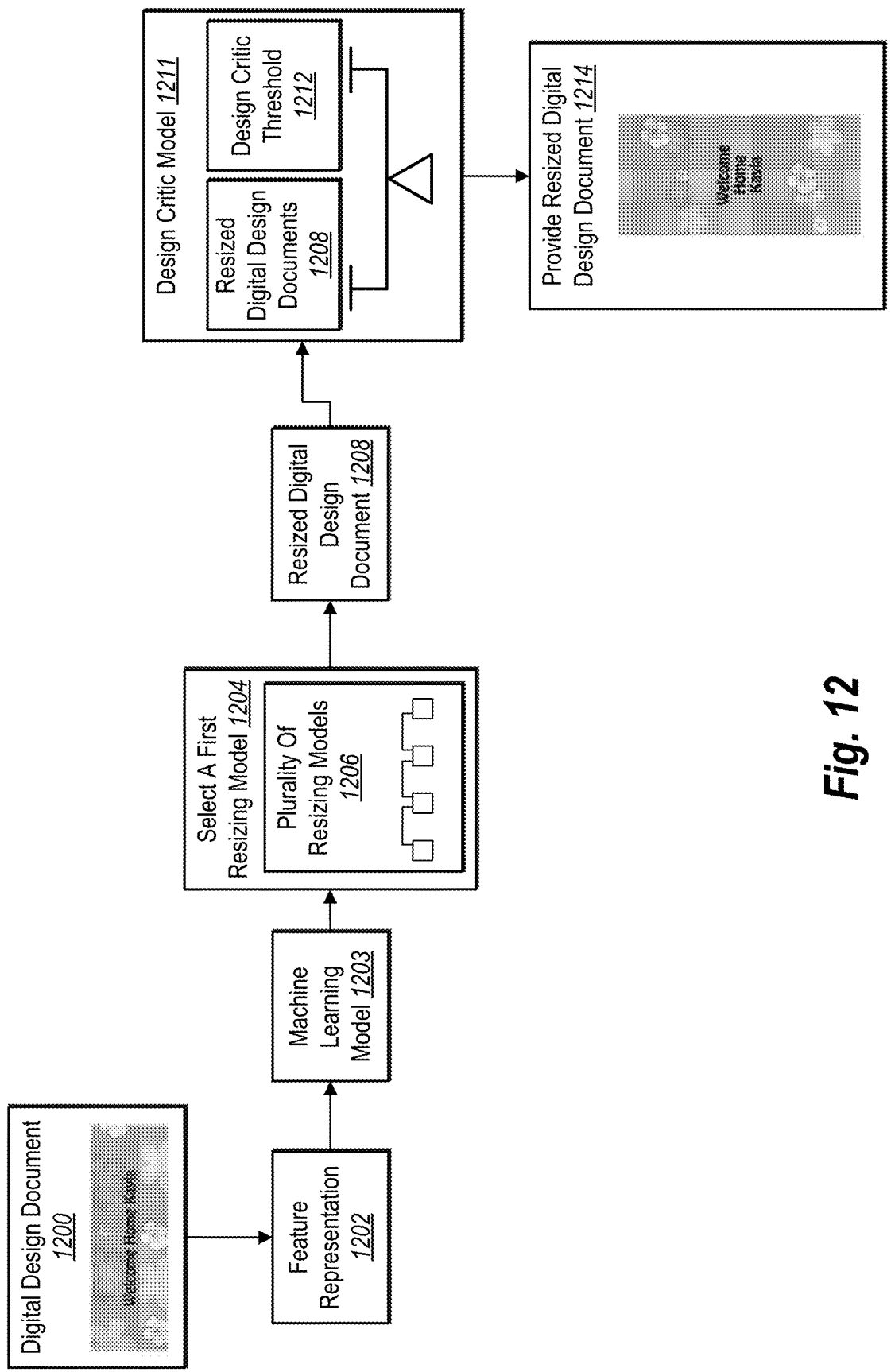
FIG. 12 illustrates an overview diagram of the digital design system generating a resized digital document in accordance with one or more embodiments.

Further, FIG. 12 shows the digital design system 102 processing the feature representation 1202 with a machine learning model 1203. For example, the digital design system 102 utilizes the machine learning model 1203 to generate a selection score. In particular, the selection score determines the most appropriate resizing model for the digital design document 1200. Additional details regarding utilizing the machine learning model 1203 to generate selection scores is given below in the description of FIG. 14.

As shown, FIG. 12 illustrates the digital design system 102 utilizing an output of the machine learning model 1203 (e.g., a selection classifier model) to perform an act 1204 of selecting a first resizing model from a plurality of resizing models 1206 based on the feature representation 1202 of the digital design document 1200. For example, the digital design system 102 selects the first resizing model based on the feature representation 1202 indicating the first resizing model as the most appropriate resizing model for resizing the digital design document 1200.

The digital design system 102 can implement a pipeline of resizing strategy models. For example, the digital design system 102 utilizes various resizing models, including a fit model, a proportional model, a springs-and-struts model, and/or a pin model. For instance, the springs-and-struts model includes inferring document structure to build a spring system and to solve the spring system to produce a new digital design layout. Further, the pin model includes a strategy to pin design elements to either a canvas of the digital design document or to other digital design elements and maintains the digital design elements while matching initial pin constraints. Additional detail regarding various resizing models is provided below (e.g., in relation to FIGS. 15A-15D).

Moreover, FIG. 12 shows the digital design system 102 performing the act 1204 of selecting a first resizing model from the plurality of resizing models 1206. The digital design system 102 can implement various methods of ranking/scoring resizing models. For example, the digital design system scores various resizing methods for a particular circumstance. In particular, the digital design system 102 scores various resizing strategies based on the particular digital design document at hand. In some instances, the digital design system utilizes machine learning and/or heuristic models to score various resizing strategies. Specifically, the digital design system scores a resized digital design document based on global features such as types of elements, white space, and overlapping elements. Thus, the digital design system 102 selects a resizing model from the pipeline to tailor the resizing to the digital design document 1200.

Additionally, as shown, the digital design system 102 generates a resized digital design document 1208. For example, the digital design system 102 generates the resized digital design document 1208 by generating a digital design document having a second dimension different than a first dimension of the digital design document 1200. The digital design system 102 performs resizing by modifying the digital design elements utilizing the first resizing model to fit within a second dimension.

Moreover, to generate the resized digital design document 1208, the digital design system 102 resizes a canvas size corresponding with the digital design document 1200, by adjusting the width and/or height of the canvas. Furthermore, the digital design system 102 considers the aspect ratio, proportional relationships, and other design element relationships within the digital design document 1200 when generating the resized digital design document 1208.

As just mentioned, the resized digital design document 1208 contains dimensions different than the digital design document 1200. For example, a dimension includes a horizontal and a vertical dimension. For instance, the horizontal and vertical dimension of the digital design document 1200 defines the size and shape of a space for the digital design document 1200. Moreover, the digital design system 102 selects a resizing model to alter the dimension of the digital design document 1200 while maintaining various relationships within the digital design document 1200 to fit within the altered dimensions.

In addition, in some implementations the digital design system 102 evaluates resized digital design documents. For example, the digital design system utilizes a design critic model. In particular, the digital design system utilizes the design critic model to evaluate a resize either utilizing heuristic models or machine learning models to determine whether a resized digital document conforms with various thresholds. For instance, if the design critic model determines that a particular resized digital document fails to satisfy a threshold, the digital design system selects a different resizing model from the plurality of resizing model. Further, the digital design system can also select a fallback resizing strategy in a situation where the resized digital document fails to satisfy a threshold established by the design critic model.

For example, FIG. 12 shows the digital design system 102 utilizing a design critic model 1211. For example, the digital design system 102 utilizes the design critic model 1211 to evaluate the resized digital design document 1208. In particular, the digital design system 102 utilizes the design critic model 1211 to analyze various visual relationships within the resized digital design document 1208. For instance, the digital design system 102 trains the design critic model 1211 based on ground truth samples of resized digital design documents conforming with designer standards. As such, the design critic model 1211 evaluates the resized digital design document 1208 based on the training.

For example, FIG. 12 shows the digital design system 102 utilizing the design critic model 1211 to compare the resized digital design document 1208 with a design critic threshold 1212. In particular, the digital design system 102 utilizes the design critic model 1211 to determine whether the resized digital design document 1208 satisfies the design critic threshold 1212. Moreover, the digital design system 102 utilizes the design critic model 1211 to score the resized digital design document 1208 based on factors such as alignment between digital design elements and whether overlapping relationships were maintained within the resized digital design document 1208 (e.g., in reference to an initial digital design document). For example, the design critic threshold 1212 includes a certain score that must be satisfied before the digital design system 102 determines that the resized digital design document 1208 is satisfactory (e.g., satisfies the design critic threshold).

Moreover, as shown, the digital design system 102 determines via the design critic model 1211 that the resized digital design document 1208 satisfies the design critic threshold 1212. For example, the digital design system 102 performs an act 1214 of providing the resized digital design document 1208 to a client device. In particular, the digital design system 102 provides the resized digital design document 1208 to the client application of the client device.

Figure 13:
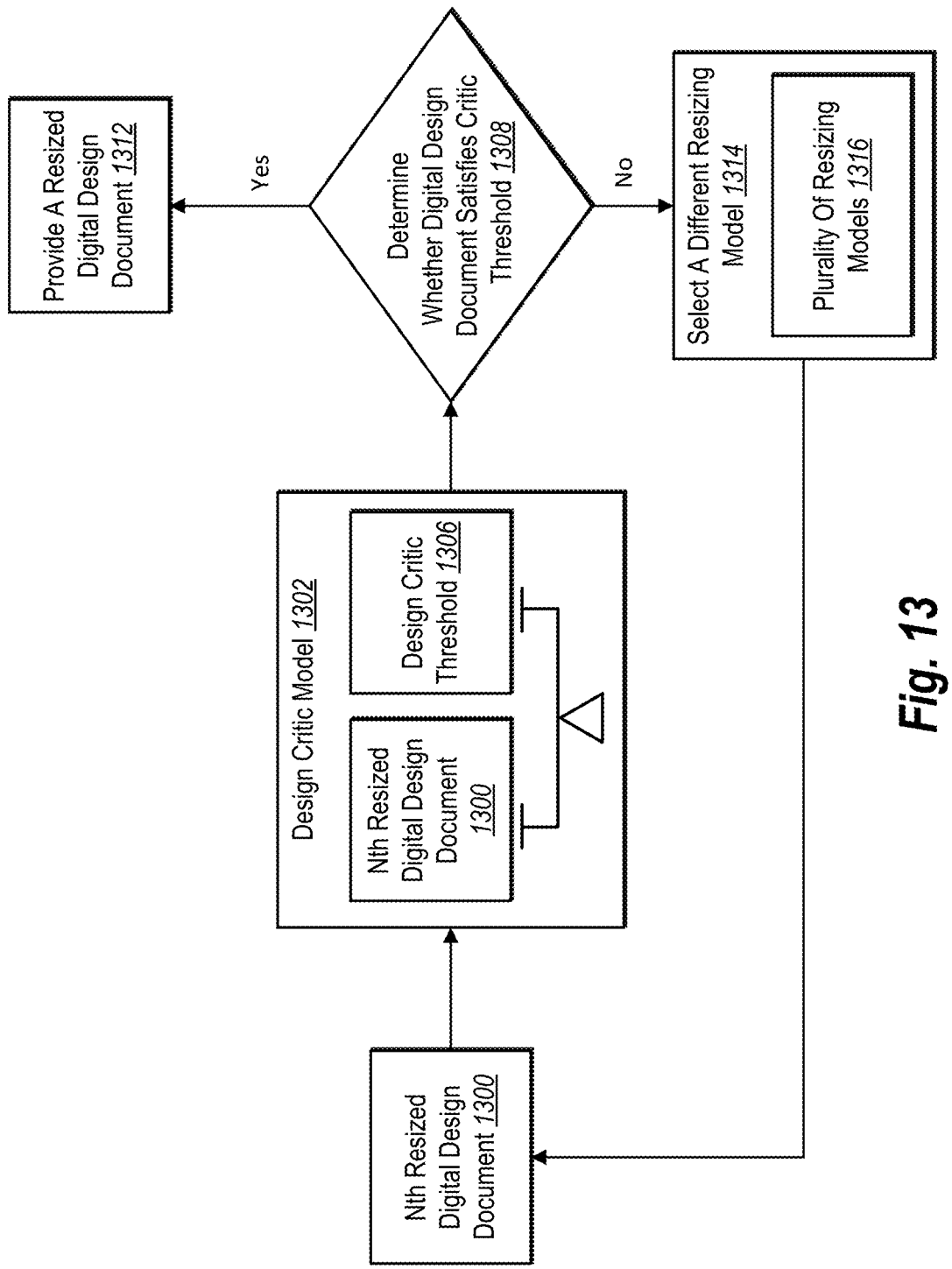
FIG. 13 illustrates the digital design system iteratively selecting a resizing model until a design critic threshold is satisfied in accordance with one or more embodiments.

FIG. 13 shows the digital design system 102 performing an iterative process of selecting resizing models in accordance with one or more embodiments. For example, FIG. 13 shows an Nth resized digital design document 1300. In particular, as discussed previously, the digital design system 102 utilizes the principles discussed in FIG. 12 to generate the resized digital design document. For instance, FIG. 13 shows the Nth resized digital design document 1300, where the 'N' refers to the number of iterations used to generate a resized digital design document.

As shown, the digital design system 102 utilizes a design critic model 1302 to evaluate the Nth resized digital design document 1300 by comparing it to a design critic threshold 1306. For example, the digital design system 102 utilizes the design critic model 1302 to evaluate the overall aesthetics of the Nth resized digital design document 1300. In particular, the digital design system 102 utilizes the design critic model 1302 to record various visual relationships within an initial digital design document and the Nth resized digital design document 1300. For instance, the various relationships recorded include i) the amount a digital design element within the digital design document is out-of-bounds (e.g., outside of the design canvas), ii) the pairwise overlap between digital design elements (e.g., a comparison and analysis of different combinations of two elements or components within the digital design document), and iii) alignment between textual elements within the digital design document. Moreover, the digital design system 102 utilizes the design critic model 1302 to compare initially recorded visual relationships within an initial digital design document versus visual relationships within the Nth resized digital design document 1300.

In one or more embodiments, the digital design system 102 utilizes the design critic model 1302 implemented as a heuristic model to evaluate an initial digital design document versus the Nth resized digital design document 1300. In particular, utilizing the visual relationships mentioned above, the digital design system 102 via the design critic model 1302 integrates a heuristic to reject any resized digital design document that has elements out-of-bounds. In some instances, the digital design system 102 establishes a demerit system to assign demerits for each element out-of-bounds, when a threshold number of demerits is met, the digital design system 102 rejects the resized digital design document.

Further, the heuristic of the design critic model 1302 further determines for a pairwise overlap between digital design elements the violation of any prior relationships between digital design elements. Each violation amounts to a demerit; further the digital design system 102 establishes a threshold for the number of demerits which results in the rejection of a resized digital design document (e.g., two demerits). Likewise, for alignment between textual elements, the digital design system 102 also determines the violation of alignment relationships (e.g., whether elements or unaligned) and similarly establishes a threshold for the number of demerits.

Additionally, in one or more embodiments, the digital design system 102 implements the design critic model 1302 as a machine learning model. In particular, the digital design system 102 trains a machine learning model on datasets containing various digital design documents and corresponding resized digital design documents where a designer ranks various resized digital design documents from best to worst. In doing so, the digital design system 102 utilizes the design critic model 1302 to intelligently evaluate the efficacy of the Nth resized digital design document 1300. To illustrate, the digital design system 102 implements a Siamese convolutional neural network as the design critic model 1302 as described in "Siamese Neural Networks for One-shot Image Recognition" by Gregory Koch, Richard Zemel, and Ruslan Salakhutdinov, available at https://www.cs.cmu.edu/~rsalakhu/papers/oneshot1.pdf, which is incorporated herein by reference in its entirety.

Moreover, as shown, FIG. 13 illustrates a decision 1308 for the digital design system 102 to determine whether the Nth resized digital design document 1300 satisfies the design critic threshold 1306. As shown, if the Nth resized digital design document 1300 satisfies the design critic threshold, the digital design system 102 performs an act 1312 of providing a resized digital design document to a client application of a client device. In contrast, if the Nth resized digital design document 1300 fails to satisfy the design critic threshold 1306 (e.g., determines that certain design relationships are broken), the digital design system 102 performs an act 1314 of selecting a different resizing model from a plurality of resizing models 1316.

As shown, by selecting a different resizing model from the plurality of resizing models 1316, the digital design system 102 generates the Nth resized digital design document 1300. In particular, the digital design system 102 iteratively performs the process of selecting a different resizing model from the plurality of resizing models to generate another resized digital design document that corresponds with the Nth iteration. The digital design system 102 performs this iteration until the Nth resized digital design document satisfies the design critic threshold 1306.

Figure 14:
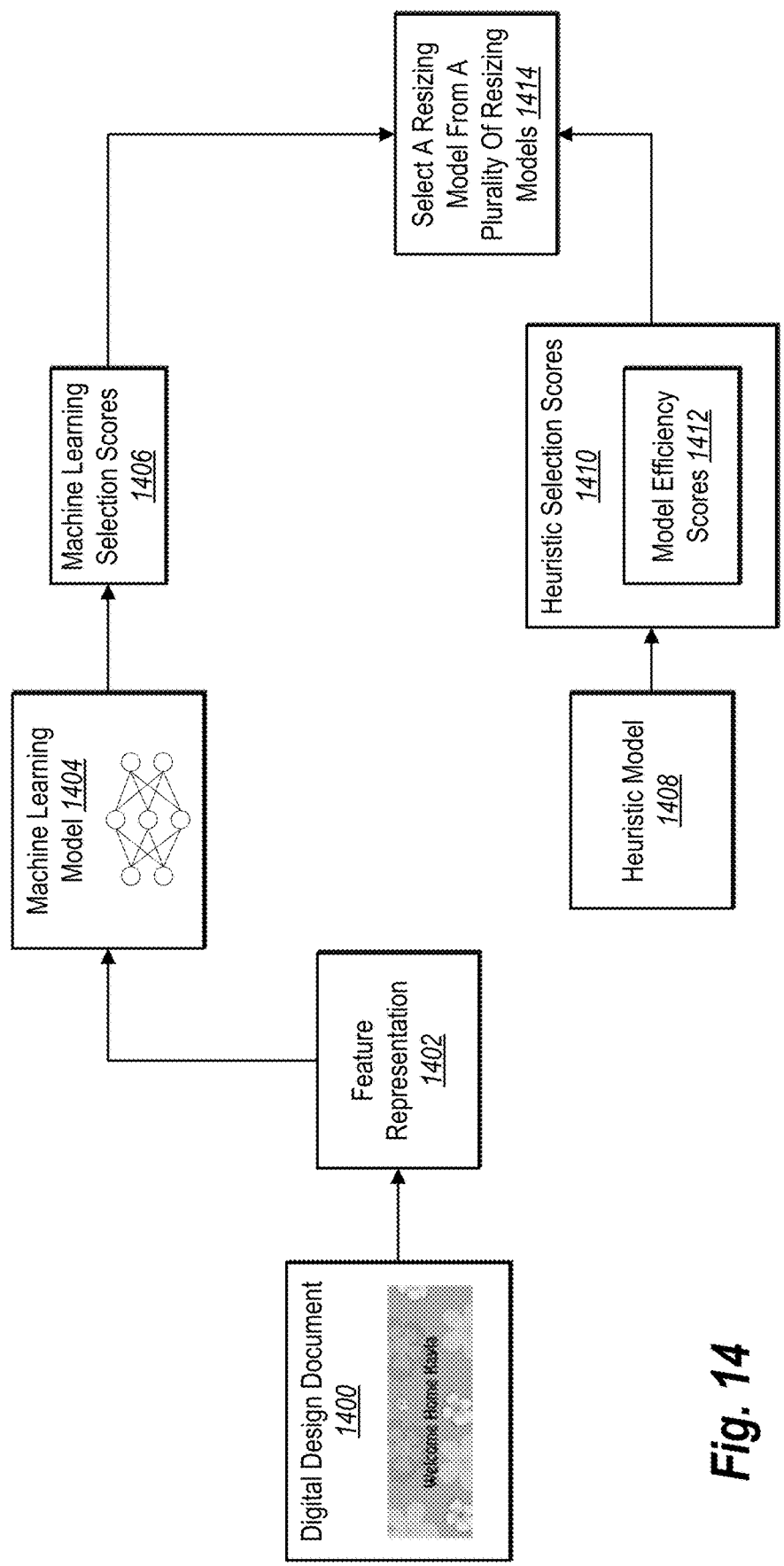
FIG. 14 illustrates the digital design system generating machine learning selection scores and heuristic selection scores in accordance with one or more embodiments.

As mentioned above, the digital design system 102 can utilize a machine learning model to select a resizing model from a plurality of resizing models. For example, FIG. 14 shows the digital design system 102 ranking a plurality of resizing models based on a feature representation in accordance with one or more embodiments. For example, as shown, the digital design system 102 processes a digital design document 1400 to generate a feature representation 1402. In particular, as previously mentioned, the digital design system 102 via a selection classifier model utilizes the feature representation 1402 to rank the plurality of resizing models.

As shown, the digital design system 102 utilizes a machine learning model 1404 (e.g., a selection classifier model) to process the feature representation 1402. In particular, the digital design system 102 processes the feature representation 1402 via the machine learning model 1404 to determine structural relationships within the digital design document 1400. In one or more embodiments the machine learning model 1404 includes a computer algorithm or a collection of computer algorithms that can be trained and/or tuned based on inputs to approximate unknown functions. For example, the machine learning model 1404 can include a computer algorithm with branches, weights, or parameters that changed based on training data to improve for a particular task. Thus, the machine learning model 1404 can utilize one or more learning techniques to improve accuracy and/or effectiveness. Example machine learning models include various types of decision trees, support vector machines, Bayesian networks, random forest models, or neural networks (e.g., deep neural networks).

For example, the digital design system 102 utilizes the machine learning model 1404 to generate machine learning selection scores 1406. In particular, the digital design system 102 utilizes the machine learning selection scores 1406 to classify each resizing model of the plurality of resizing models. For instance, the digital design system utilizes the machine learning model 1404 to generate the machine learning selection scores 1406 based on the aforementioned feature representation of the digital design document 1400. Moreover, the digital design system 102 performs an act 1414 of selecting a resizing model based on the machine learning selection scores 1406.

In addition to the digital design system 102 utilizing the machine learning selection scores 1406, in one or more embodiments the digital design system 102 also utilizes a heuristic model 1408. For example, the digital design system 102 utilizes the heuristic model 1408 to determine which resizing model to select from a plurality of resizing models. In particular, the heuristic model 1408 includes a set of rules for ranking resizing models. For instance, the digital design system 102 utilizes the heuristic model 1408 to pre-rank the plurality of resizing models and selects the highest ranked resizing model.

As just mentioned, the digital design system 102 utilizes the heuristic model 1408, in addition, the digital design system 102 generates heuristic selection scores 1410 from the heuristic model 1408. For example, the digital design system 102 utilizes the heuristic model 1408 to apply a set of rules to each of the plurality of resizing models. Based on the applied rules, the digital design system 102 generates heuristic selection scores 1410 for each of the plurality of resizing models. Moreover, the digital design system 102 determines the highest ranked resizing model.

For example, the heuristic selection scores 1410 further includes model efficiency scores 1412. In particular, the digital design system 102 utilizes the heuristic model 1408 to determine computational efficiency of each of the plurality of resizing models. For instance, the digital design system 102 determines the amount of computational power (e.g., memory, time, or computational resources) each resizing model consumes to resize the digital design document 1400. The digital design system 102 generates the model efficiency scores 1412 for each of the plurality of resizing models and selects a resizing model based on the model efficiency scores 1412.

In one or more embodiments, the digital design system 102 utilizes a combination of the machine learning selection scores 1406 and the heuristic selection scores 1410, which includes the model efficiency scores 1412 to perform the act 1414 of selecting a resizing model form the plurality of resizing models. In particular, in some instances the digital design system 102 weights the heuristic selection scores 1410 differently (e.g., higher or lower) than the machine learning selection scores 1406. For instance, if the machine learning selection scores 1406 indicate a highest ranking for the first resizing model and a second highest ranking for the second resizing model while the heuristic selection scores 1410 indicate a highest ranking for the second resizing model, the digital design system 102 utilizes the second resizing model.

To further illustrate, consider the following situation: the machine learning selection scores indicate a ranked order of i) first resizing model, ii) second resizing model, iii) third resizing model, and iv) fourth resizing model; and the model efficiency scores 1412 indicate a ranked order of i) fourth resizing model, ii) third resizing model, iii) second resizing model, and iv) first resizing model. In some embodiments, the digital design system 102 prioritizes computational efficiency while also factoring in the quality of the resizing technique. Thus, the digital design system 102 can select the third resizing model for computational efficiency considerations. However, if the digital design system 102 prioritizes the quality of the resizing technique and factors in computational efficiency as a secondary factor, the digital design system 102 selects the second resizing model.

Moreover, in one or more embodiments, the digital design system 102 utilizes either the machine learning selection scores 1406 or the heuristic selection scores 1410. In particular, the digital design system 102 provides an option to a user of a client device to select intelligent resizing or to prioritize speed of resizing. For instance, if the user of the client device selects intelligent resizing, then the digital design system 102 only utilizes the machine learning selection scores 1406 to select a resizing model from a plurality of resizing models. On the other hand, if the user of the client device selects speed, the digital design system 102 only utilizes the heuristic selection scores 1410 (e.g., which includes the model efficiency scores 1412) to select a resizing model from the plurality of resizing models.

Figure 15A:
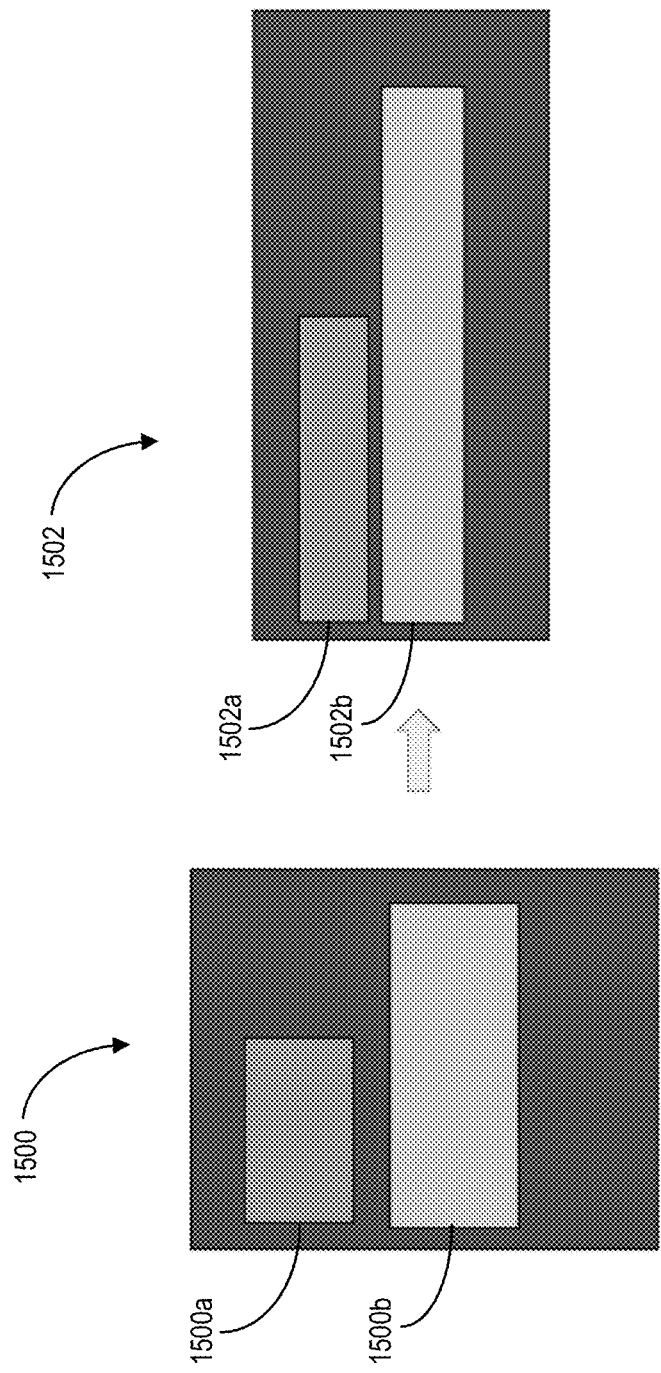
FIGS. 15A-15D illustrates the digital design system utilizing various models for performing resizing of digital design documents in accordance with one or more embodiments.

As mentioned above, the digital design system 102 can utilize a variety of different resizing models for generating a resized digital document. For example, FIGS. 15A-15D illustrate a variety of algorithms and methods utilized by the digital design system 102 to perform a resizing task of a digital design document in accordance with one or more embodiments. FIG. 15A illustrates the digital design system 102 utilizing a proportional scale/resize strategy. For example, the digital design system 102 utilizes the proportional resize strategy to scale a child element to its parent container's size. In particular, changing the aspect ratio of a parent's container in the proportional resizing strategy also causes the aspect ratio of the child element to change. For instance, FIG. 15A shows a parent container 1500 with a first child element 1500*a* and a second child element 1500*b*. Further, FIG. 15A shows a proportionally resized parent container 1502 with a first resized child element 1502*a* and a second resized child element 1502*b*. Thus, a horizontal scaling (e.g., of 0.5) in the parent container 1500 results in a horizontal scaling (e.g., of 0.5) of the child elements. Similarly, a vertical scaling (e.g., of 0.9) in the parent container 1500 results in a vertical scaling (e.g., of 0.9) in the child elements. This approach results in different horizontal and vertical scaling and a modified aspect ratio.

Figure 15B:
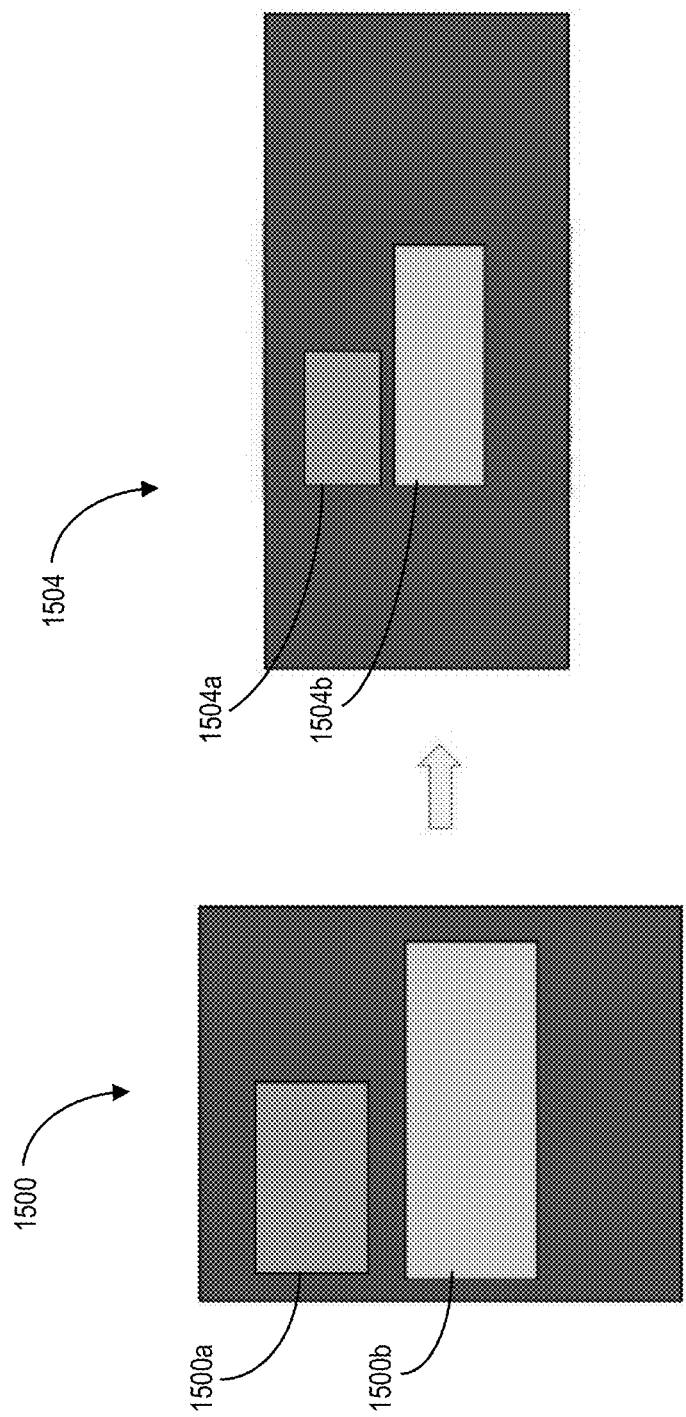

FIG. 15B shows the digital design system 102 utilizing a fit resizing strategy. For example, the fit resizing strategy includes a variation of the proportional resizing strategy. In particular, the fit resizing strategy scales elements within a parent container without changing the aspect ratio of the elements. For instance, the fit resizing strategy repositions child elements in the center of the parent's new container. Further, the fit resizing strategy preserves the visual relationships between elements such as for alignment or relative sizing. Moreover, in some instances the fit resizing strategy causes text to become illegible and can also have white space with a significantly different aspect ratio from the initial digital design document.

FIG. 15B shows the parent container 1500 with the first child element 1500*a* and the second child element 1500*b*. As further shown, FIG. 15B illustrates a fit modified parent container 1504 with a first resized child element 1504*a* and a second resized child element 1504*b*. Moreover, as shown, the digital design system 102 utilizing the fit resizing strategy shrinks child elements, such that there is no alteration in the aspect ratio of the first resized child element 1504*a* and the second resized child element 1504*b*. In particular, the digital design system 102 scales the first resized child element 1504*a* and the second resized child element 1504*b* in both vertical and horizontal directions (even if only the vertical dimensions of the parent container change). To illustrate, a horizontal scaling (e.g., of 0.5) in the parent container 1500 results in a horizontal and vertical scaling (e.g., of 0.5) of the child elements. Thus, the digital design system 102 utilizes both horizontal and vertical scaling to preserve the initial aspect ratio.

Figure 15C:
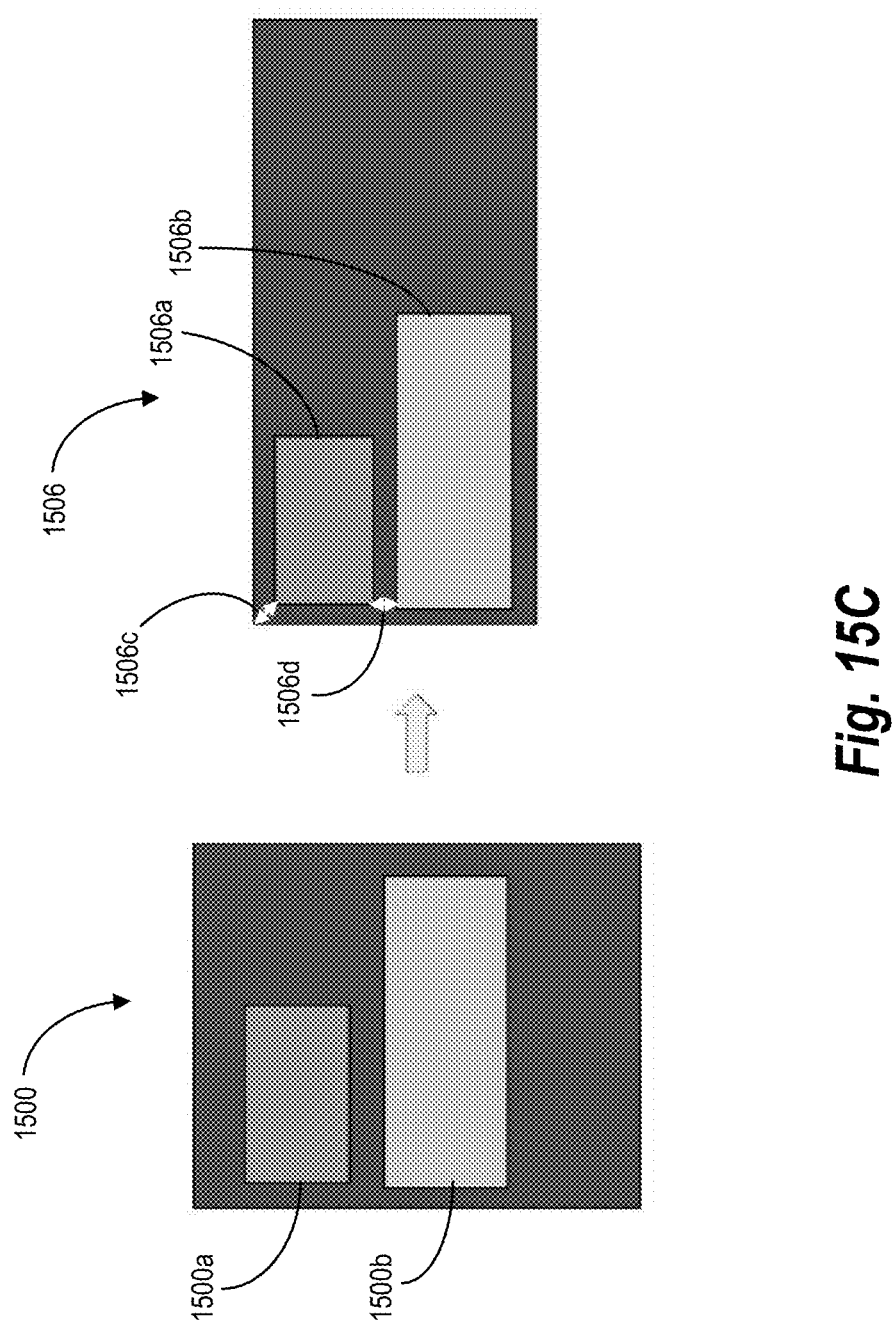

FIG. 15C shows the digital design system 102 utilizing a pin resizing strategy. For example, the pin resizing strategy maintains pin positions while resizing a digital design document. In particular, the digital design system 102 pins the child elements to a parent container or another element and shifts the position and/or size of the child elements to maintain the pin position. For instance, the pin resizing strategy includes using pins as constraints which pins a relative position on a digital design element to another element or globally to the design canvas (e.g., the digital design document as a whole). To illustrate, the pin resizing strategy utilizes a global pin to the top-left corner of a digital design element at position (0.1, 0.3) on the design canvas. During resizing, the pin resizing strategy keeps the top-left of the digital design element to the position of (0.1, 0.3). Further, in addition to keeping the digital design element at the desired position, the pin resizing strategy also employs methods of maintaining a text line height or an element height for graphical elements.

As shown, FIG. 15C illustrates the resizing of the parent container 1500 with the first child element 1500*a* and the second child element 1500*b*. In particular, FIG. 15C shows a first pin 1506*c* and a second pin 1506*d* as constraints to keep a first resized child element 1506*a* in the same position as the first child element 1500*a*. For instance, FIG. 15C shows the first pin 1506*c* constraining the first child element 1500*a* to the parent container 1500 and the second pin 1506*d* constrains the first child element 1500*a* to the second child element 1500*b*. The digital design system 102 can resize the digital design elements to maintain the pin constraint. Accordingly, a pin resized parent container 1506 illustrates the first resized child element 1506*a* and a second resized child element 1506*b* in the same relative position, albeit at different sizes in a resized parent container.

In one or more embodiments, the digital design system 102 performs the pin resizing strategy by utilizing a pin model. In particular, the pin model generates the resized digital design document. For instance, the digital design system 102 generates the resized digital design document by i) determining a relative pin position of a digital design element within the digital design document, ii) generating a resized digital design element by scaling the digital design element based on changed dimensions of the digital design document, and iii) positioning the resized digital design element within the resized digital design document according to the relative pin position.

In some embodiments, the pinning model does not relatively pin the child elements. Rather, the pinning model defaults to globally pinning the child elements to the design canvas. Further, the digital design system 102 utilizes the pinning model to record the original desired height(s) of the child element(s). Moreover, the digital design system 102 utilizes the pinning model to scale elements proportionally based on the indicated new dimensional size. To illustrate, if the design size converts from (1000,500) to (500,1000), the digital design system 102 utilizes the pinning model to scale the elements by (0.5,2). In instances where the child element contains a fixed aspect ratio (e.g., a digital image) the digital design system 102 utilizes the pinning model to scale the child element utilizing the minimum scaling magnitude.

Moreover, in one or more embodiments, the pinning model prioritizes globally pinned elements followed by the relatively pinned elements within a digital design document. Specifically, to match the pin position and the desired height, the digital design system 102 utilizes the pinning model to consider the expansion bounds, and the region of the design an element can expand to without overlapping other elements. The digital design system 102 utilizes the pinning model to expand within the expansion bounds to match the desired height while keeping with the original fixed pin position. For instance, for elements with a top-left position as the pin, the digital design system 102 utilizes the pinning model to cause the element to expand to the right and bottom to attempt to match its original size, but without overlapping or violating pinned relationships between other elements. Indeed, the digital design system utilize the pinning model to position the elements relatively to match the relatively pinned elements prior to resizing.

Figure 15D:
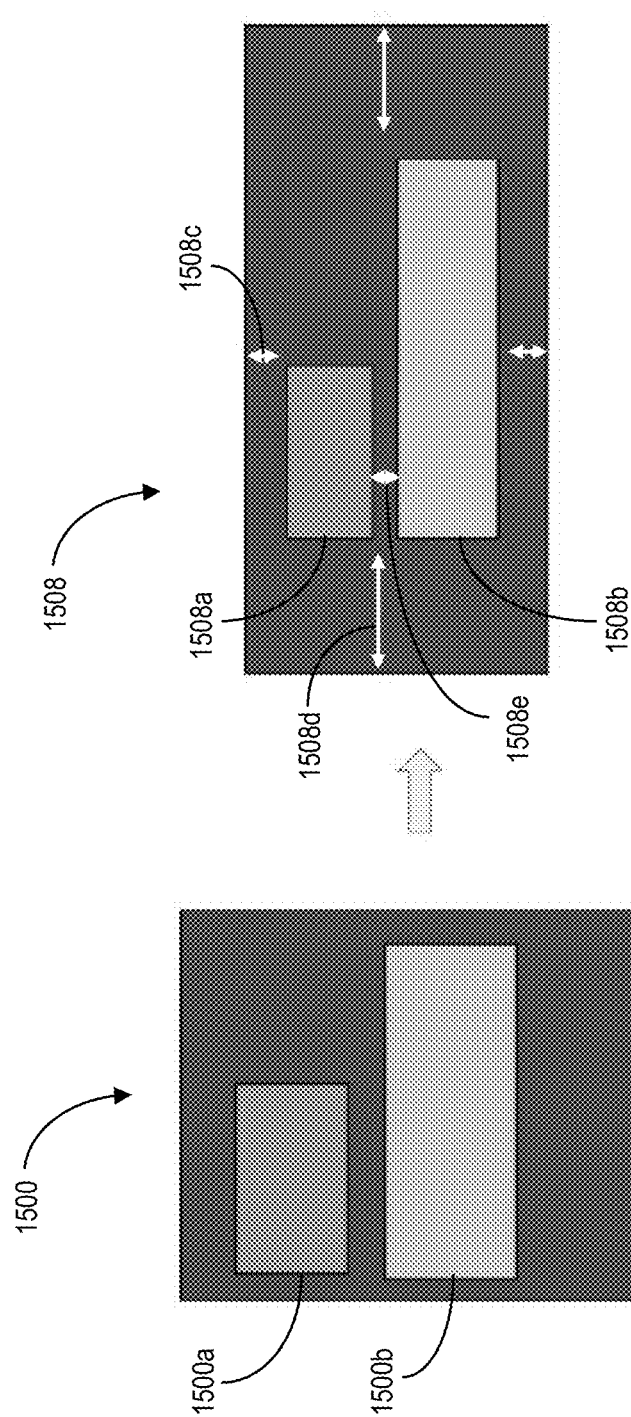

FIG. 15D illustrates the digital design system 102 utilizing a springs-and-struts model. For example, the digital design system 102 via the spring-and-struts model utilizes an inferred visual structure of the digital design document to automatically build and solve a spring-based constraint system. In particular, solving the spring-based constraint system generates a resized digital design document.

For example, the digital design system 102 can determine a variety of relationships between digital design elements and then build a spring-based constraint system based on these relationships. To illustrate, the digital design system 102 can determine element groups, spacing between element groups, spacing relative to edges of the digital document, or other visual relationships.

In some implementations, the digital design system 102 utilizes the visual structure inference discussed above in FIGS. 7-9. Specifically, the digital design system 102 utilizes principles discussed above in FIGS. 1-11 to construct a digital design multigraph from the digital design document and generate a structural representation such as a visual structure inference (e.g., flow relationships and structure in an inferred structure tree). Moreover, the digital design system 102 utilizes the visual structure inference to build the spring-based constraint system.

As shown, FIG. 15D illustrates the parent container 1500 with the first child element 1500a and the second child element 1500b resized according to the spring-and-struts model. In particular, FIG. 15D shows a series of spring constraints added to a spring-and-struts resized parent container 1508. For instance, the spring-and-struts model adds spring constraints 1508c and 1508d between the child elements and the design border as well as spring constraints 1508e between a first child element 1508a and a second child element 1508b.

A spring model determines a spring constraint (e.g., a spring force) based on a spring constant and a spring compression distance (i.e., F=kx). Thus, the digital design system 102 models the size of digital design elements as springs and/or the spacing between digital design elements as springs. To illustrate, a vertical dimension of a digital design element can be modeled as a first spring with a first spring constant. Similarly, the horizontal dimension of the digital design element can be modeled as a second spring with a second spring constant. In addition, spaces between digital design elements can be modeled as additional springs with additional spring constants. Furthermore, spaces between the edges of a digital design document and digital design elements can be modeled as additional springs with additional spring constants.

In one or more embodiments, the strength of the spring constraints depends on their length. Because of this, the digital design system 102 utilizes the spring-and-struts model to scale digital design documents in a non-proportional manner while maintaining the original size and visual relationships. As mentioned above, the digital design system 102 utilizes a visual structure inference to generate the spring-based constraint system. For example, the digital design system 102 utilizes the spring-and-struts model to create spring constraints between parents and child elements within the visual structure inference. Further, the digital design system 102 via the spring-and-struts model utilizes spring constraints between sibling elements in a vertical or horizontal flow. For instance, the digital design system 102 via the spring-and-struts model represents all elements within the visual structure inference as axis-aligned boxes and all constraints, axis-aligned as either vertical or horizontal. Moreover, solving the spring-based constraint system includes an iterative process. Specifically, the digital design system 102 iteratively determines new positions and/or sizes of all the digital design elements to satisfy the spring constraints.

In one or more embodiments, the digital design system 102 via the spring-and-struts model utilizes an algorithm to solve the spring-based constraint system. In particular the algorithm includes: i) utilizing the visual structure inference to generate spring constraints between elements and the artboard for a default layout and generating spring constraints between elements for a vertical or horizontal flow layout, ii) detecting initial spring stiffness utilizing spring stiffness heuristic models, iv) iteratively resizing the artboard at 10% increments of the final resizing by: a) updating the spring distances and the element frames (if the element frames are not locked) b) updating the spring stiffness c) scaling nodes in the visual structure inference to match the original area (e.g., trying to match the original area acts as an opposing force to the de-coupled horizontal/vertical constraints), v) once the desired artboard size has been reached, updating each of the elements to fit inside the resized box, and vi) updating alignments to match those detected in the original size (e.g., if the original design contained two elements left-aligned, align them after the previous fitting step).

The digital design system 102 can utilize a variety of approaches in implementing a stiffness heuristic model to determine spring stiffness. For example, the digital design system 102 can select spring stiffness based on size of a digital design element, significance of a digital design element, proximity to a digital document boundary, location within the digital design document (e.g., increase the spring stiffness for an element in the center of the document).

FIGS. 15A-15D describe a variety of resizing strategies. In one or more embodiments, the digital design system 102 evaluates a first resized digital design document with the design critic model and for a subsequent iteration, the digital design system 102 employs a fallback strategy. In particular, the digital design system 102 selects a resizing model designated as a fallback strategy for the first resized digital design document.

Furthermore, in context of FIGS. 15A-15D, the digital design system 102 may employ a complex resizing strategy initially and fallback to a simple resizing strategy if the complex resizing strategy fails. To illustrate, in some instances the digital design system 102 may initially select the springs-and-struts model for performing a resizing task. If the resized digital document fails a design critic threshold, the digital design system 102 selects a simpler resizing strategy such as the fit model.

Figure 16:
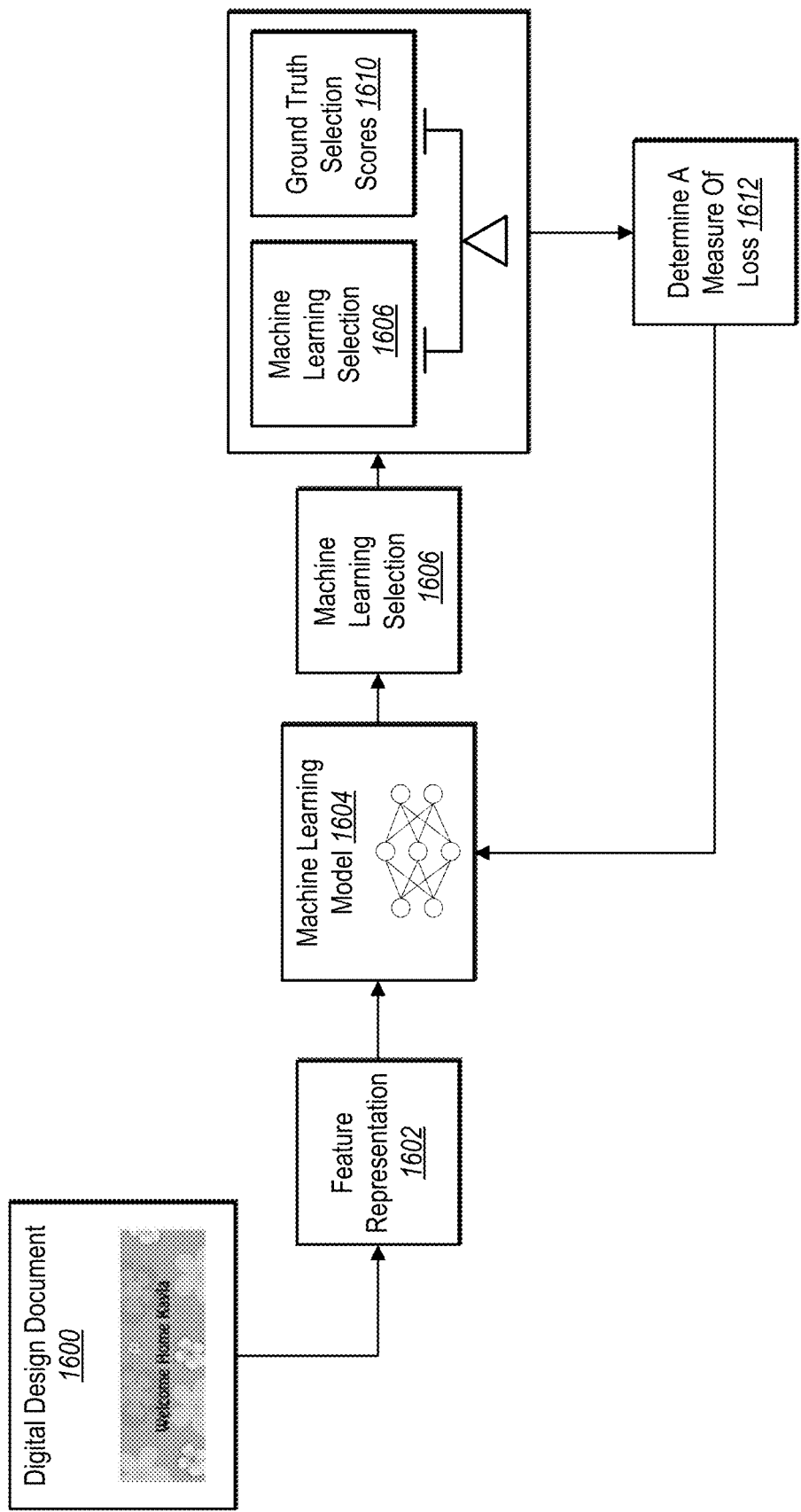
FIG. 16 illustrates the digital design system training a machine learning model in accordance with one or more embodiments.

In one or more embodiments, the digital design system 102 trains a machine learning model to generate machine learning selection scores. For example, FIG. 16 illustrates the digital design system 102 training a machine learning model in accordance with one or more embodiments. In particular, FIG. 16 shows the digital design system 102 processing a digital design document 1600 to generate a feature representation 1602 (e.g., as discussed above in relation to FIG. 14). In addition, the digital design system 102 utilizes a machine learning model 1604 to analyze a feature representation 1602 to generate a machine learning selection score 1606.

As shown in FIG. 16, the digital design system 102 processes the digital design document 1600 for training. In one or more embodiments, for training purposes, the digital design system 102 utilizes corresponding data that indicates selections by human designers given multiple resized versions of the digital design document 1600. In particular, the digital design system 102 compares the machine learning selection score 1606 with ground truth selection scores 1610 by human designers. Moreover, the digital design system 102 determines a measure of loss 1612 from the comparison and modifies parameters of the machine learning model 1604 based on the determined measure of loss 1612.

To elaborate, in one or more embodiments, the digital design system 102 trains the machine learning model 1604 to predict labels generated by human designers using a collection of global document features. For instance, the digital design system 102 trains the machine learning model to correlate certain global document features with certain resizing strategies. In particular, the global document features include a number of shape elements, a number of text elements, a number of image elements, a number of background elements, canvas area, canvas aspect ratio, a number of icons, a number of grid-cells, a number of floating images, a number of user-defined groups, a total number of characters across all text elements, absolute area in pixels covered by text elements, proportion of document covered by text elements, absolute area in pixels covered by image elements, proportion of document covered by image elements, absolute area in pixels covered by shape elements, and proportion of document covered by shape elements. Accordingly, during inference, the machine learning model 1604 converts the digital design document 1600 into the corresponding set of global features and predicts which resize strategy generates the best document resize.

Specifically, the machine learning model 1604 processes the input features and generates the machine learning selection score 1606. The digital design system 102 compares the machine learning selection score 1606 with a ground truth (e.g., the ground truth selection scores 1610). For instance, the ground truth selection scores 1610 can include rankings, scores, or selections by a trusted source (e.g., a graphic artist or another trained model). In particular, the ground truth selection scores 1610 can reflect selected designs after a graphic artist was presented with the results (e.g., resized digital documents) generated utilizing multiple different resizing models. Thus, if a graphic artist selected the results from a first model, but the machine learning model 1604 selected a second model, the digital design system 102 can train the machine learning model to select a more appropriate model in the future. Specifically, the digital design system 102 can determine the measure of loss 1612 based on the comparison. For instance, the digital design system 102 can apply a loss function (e.g., a mean square error loss function, a cross entropy loss function or some other loss function) to determine the measure of loss 1612. Moreover, the digital design system 102 modifies parameters of the machine learning model 1604 based on the measure of loss 1612 (e.g., via backpropagation and/or gradient descent).

The digital design system 102 can iteratively train the machine learning model 1604 (e.g., through a threshold number of training iterations or until satisfying a convergence measure). In this manner, the digital design system 102 can teach the machine learning model 1604 to accurately select an appropriate resizing model.

Figure 17:
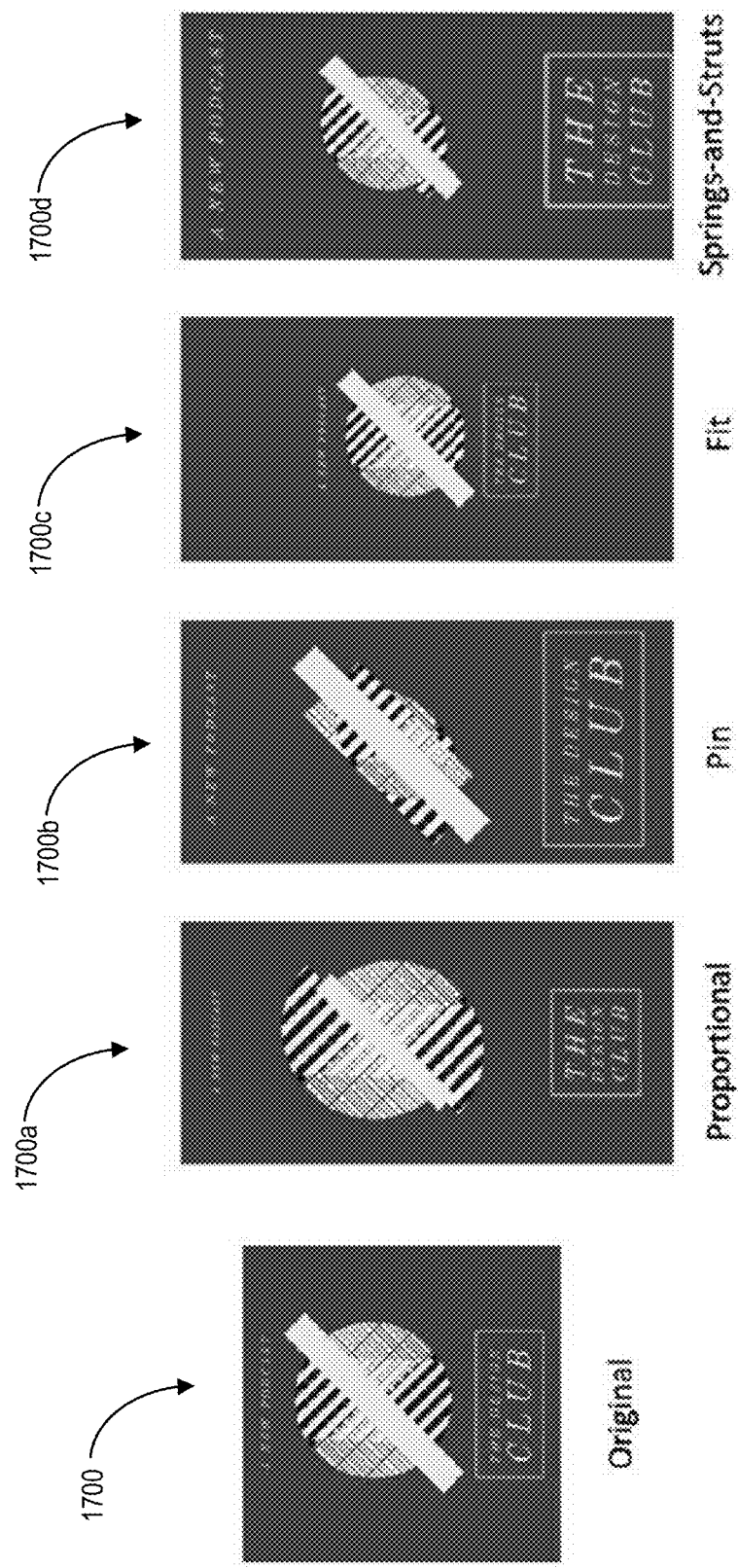
FIG. 17 illustrates example results of the digital design system resizing a digital design document in accordance with one or more embodiments.

FIG. 17 shows example results of the digital design system 102 generating various resized digital design documents in accordance with one or more embodiments. For example, based on an original digital design document 1700, the digital design system 102 generates a resized digital design document 1700a utilizing a proportional model, a resized digital design document 1700b utilizing a pin model, a resized digital design document 1700c utilizing a fit model, and a resized digital design document 1700d utilizing a springs-and-struts model. Thus, the digital design system 102 can utilize and consider a variety of resizing strategies in selecting a resizing model and generating a resized digital document.

Figure 18:
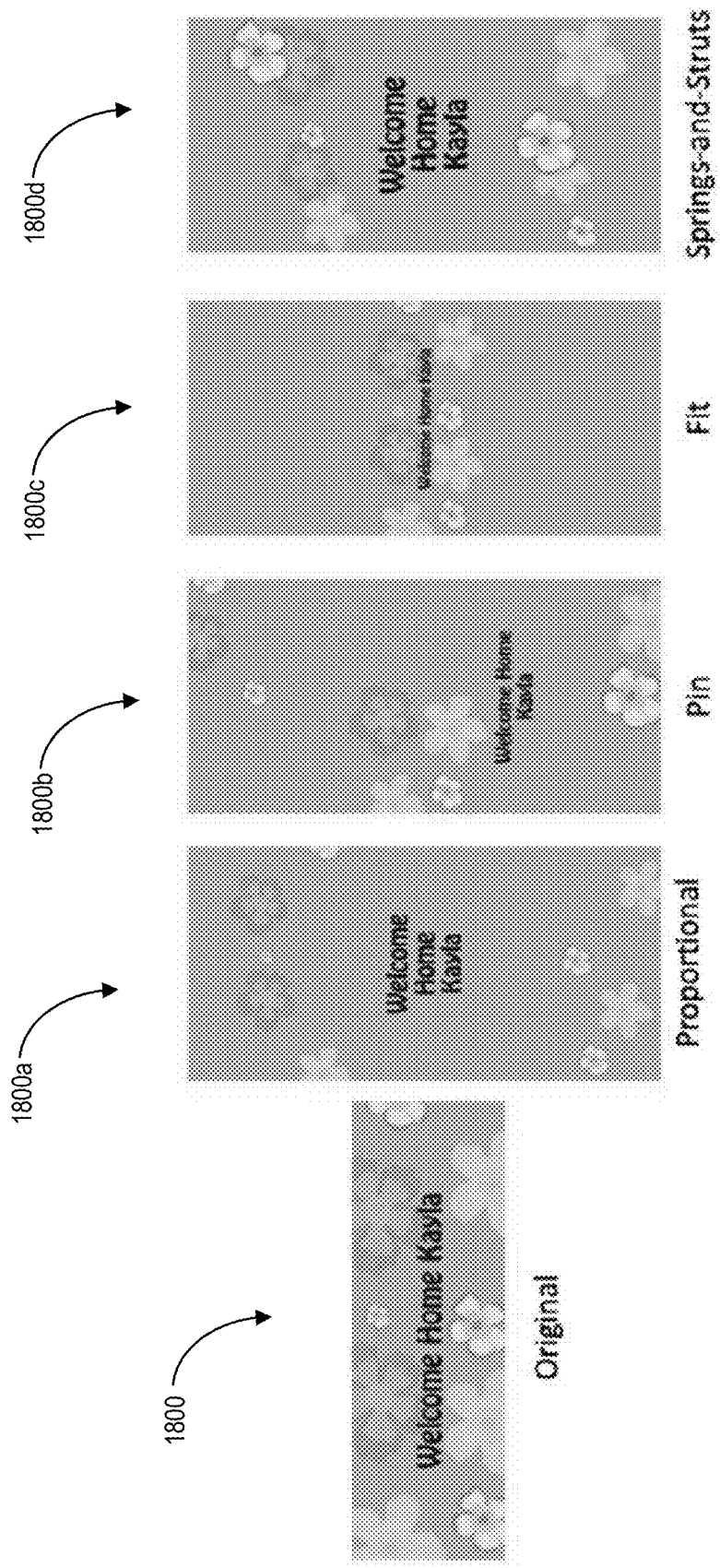
FIG. 18 illustrates additional example results of the digital design system resizing a digital design document in accordance with one or more embodiments.

FIG. 18 also shows example results of the digital design system 102 generating various resized digital design documents. For example, FIG. 18 shows an original digital design document 1800 and corresponding resized digital design documents 1800a-1800d resized with the methods discussed in FIGS. 15A-15D. As illustrated in FIG. 18, in this example, the springs-and-struts model generates the most visually appealing result of the various resizing models. Moreover, the digital design system 102 can accurately select this model in generating a resized digital document.

Figure 19A:
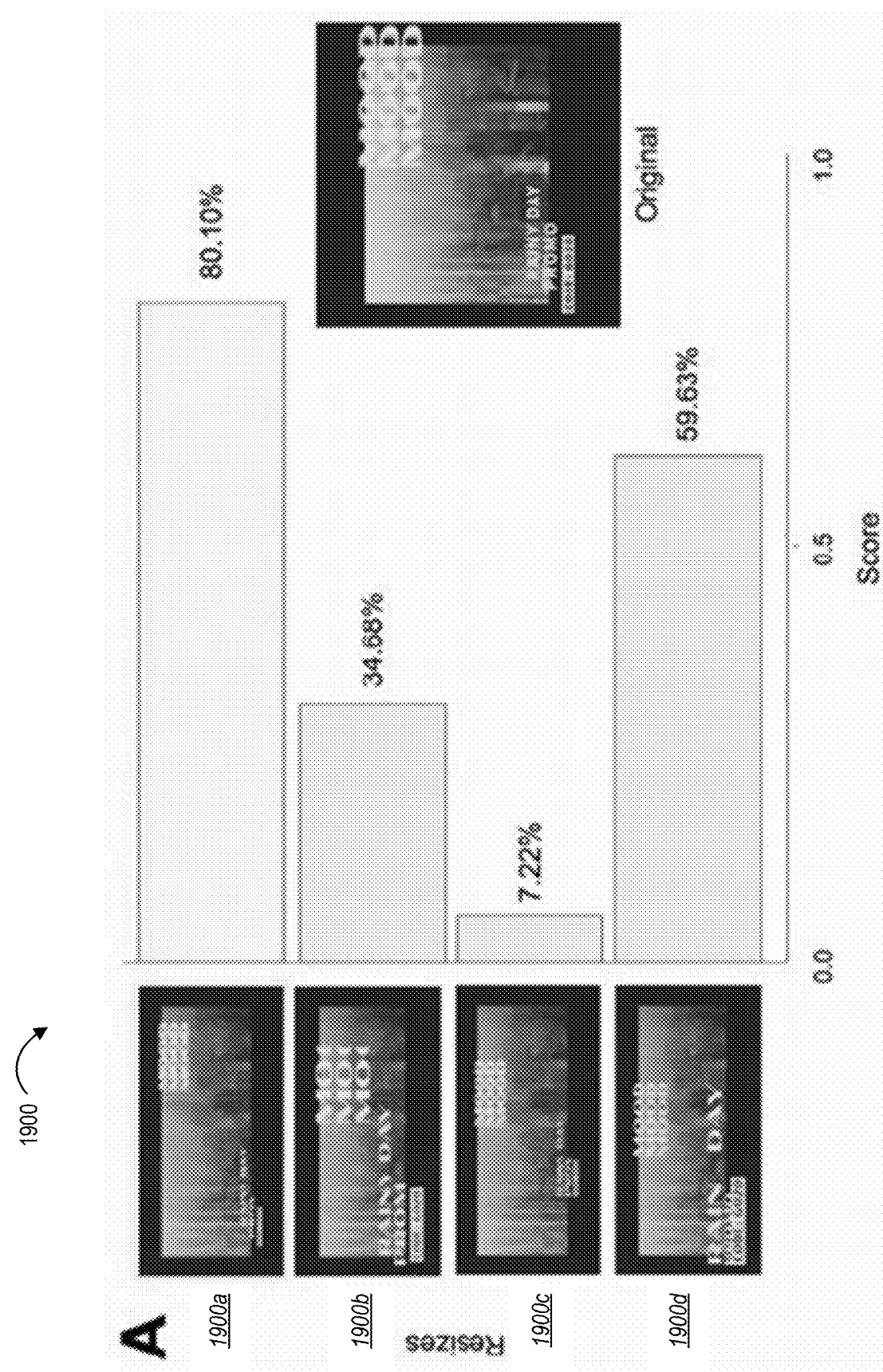
FIGS. 19A-19D illustrates example results of the digital design system selecting various resizing models to resize a digital design document in accordance with one or more embodiments.

FIGS. 19A-19D show examples of various resizing models generating various resized digital design documents from an original digital design document. In addition, FIGS. 19A-19D illustrate the digital design system 102 generating rankings for the resized models in accordance with one or more embodiments. For example, FIG. 19A shows a first resizing result 1900 and further, FIG. 19A shows resizing strategies such as proportional 1900a, springs-and-struts 1900b, fit 1900c, and pin 1900d. For the first resizing result 1900, FIG. 19 shows the digital design system 102 ranking the proportional 1900a as the best resizing strategy.

Figure 19B:
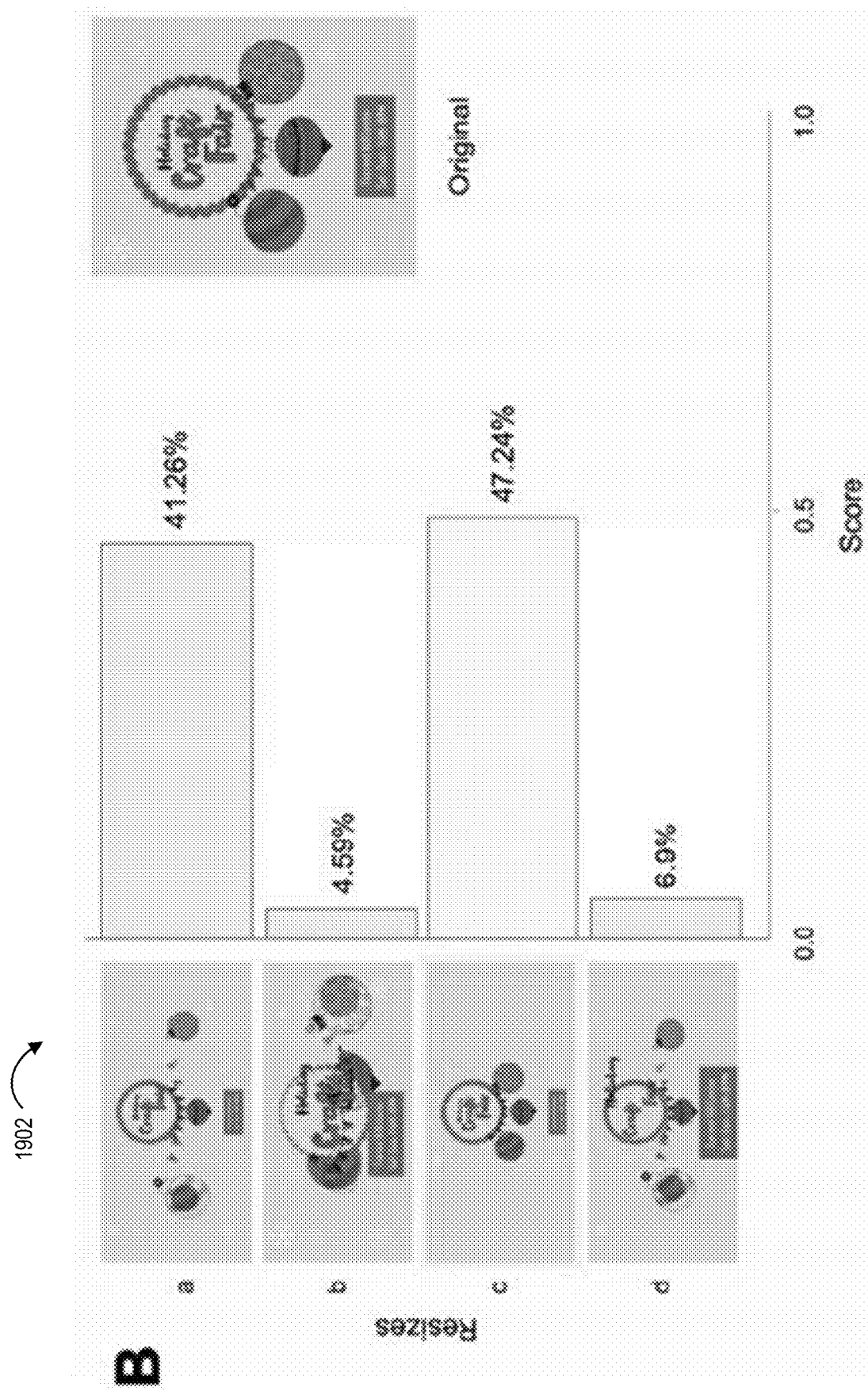
Figure 19C:
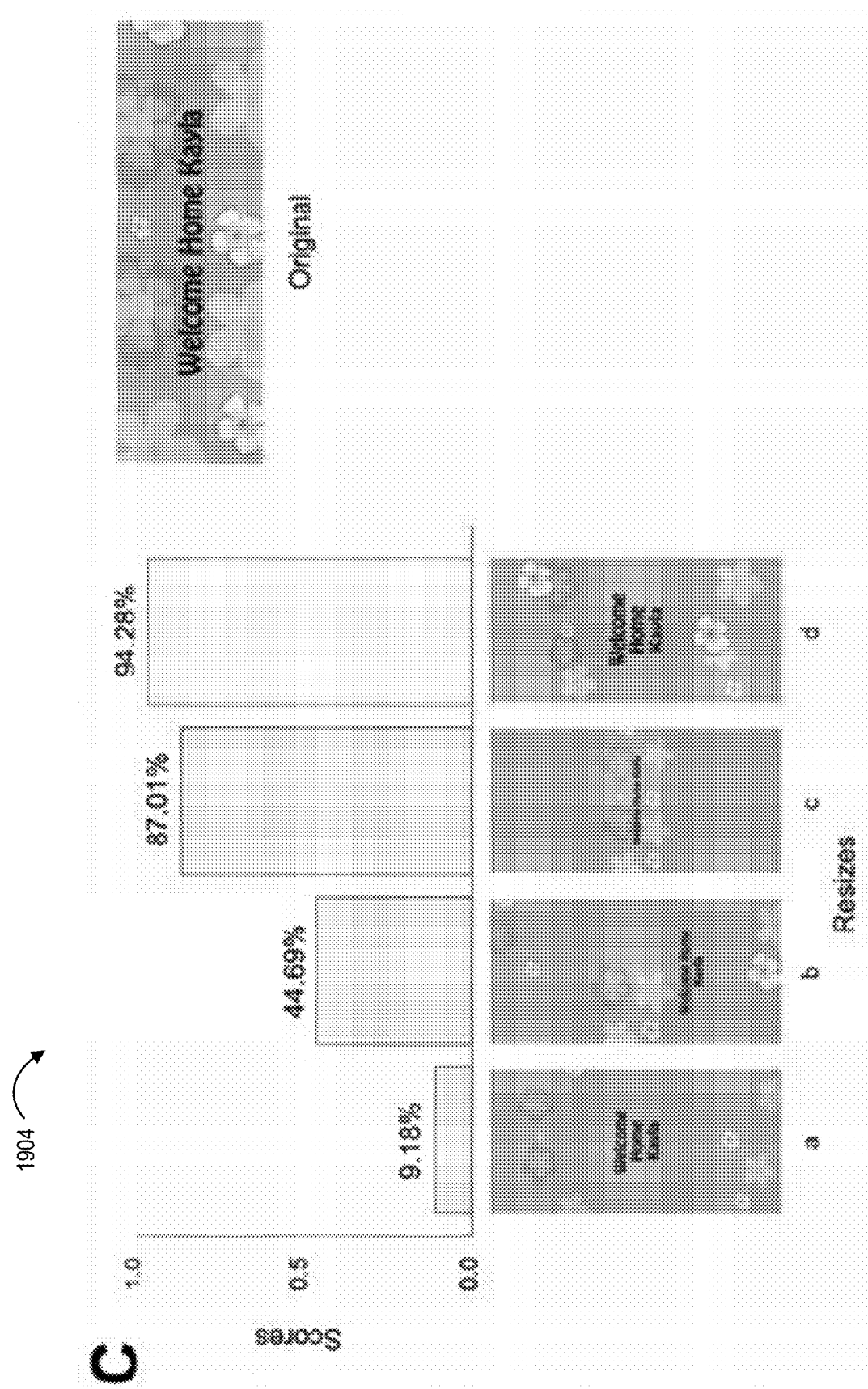
Figure 19D:
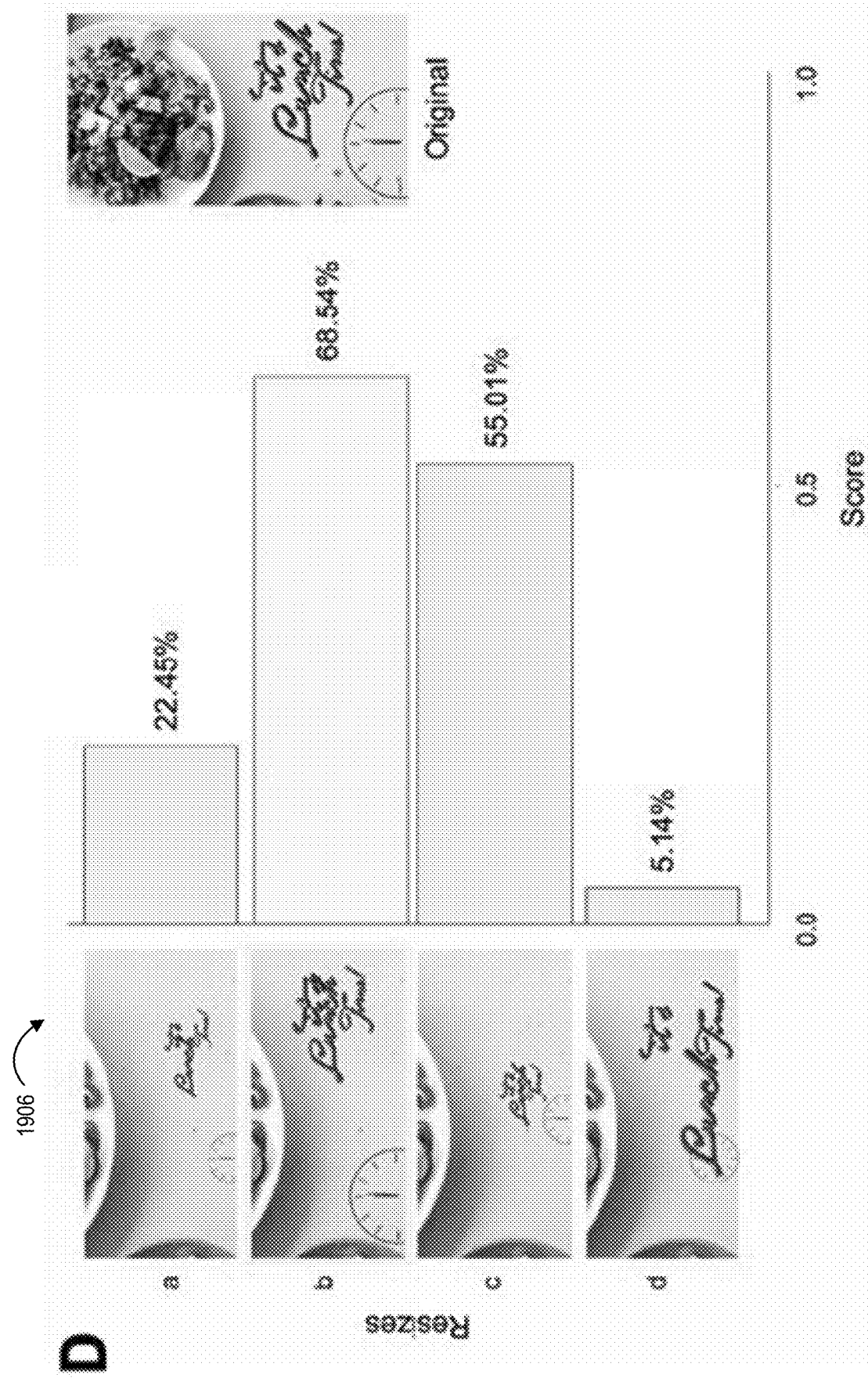

FIG. 19B shows a second resizing result 1902, FIG. 19B also shows the same resizing strategies as shown in FIG. 19A. In particular, FIG. 19B shows the digital design system 102 ranking fit 1900c as the best resizing strategy. For a third resizing result 1904, FIG. 19C shows the pin model as the best resizing strategy. For a fourth resizing result 1906, FIG. 19D shows springs-and-struts 1900b as the best resizing strategy.

As mentioned above, the digital design system 102 can accurately and flexibly select resizing models for particular digital design documents. For example, FIG. 20A illustrates various performance results of a machine learning model generating machine learning selection scores from a feature representation to select a resizing model in accordance with one or more embodiments. For example, FIG. 20 shows a panel 2000 which indicates a summary of the performance of the digital design system 102 utilizing a machine learning model to generate machine learning selection scores for each resizing model. In particular, the panel 2000 shows the performance of the machine learning model to generate machine learning selection scores based on a test dataset. The panel 2000 illustrates the accuracy, precision, recall, and weight in which the digital design system 102 utilizes the trained machine learning model for selecting a resizing model. As shown, the digital design system 102 can select a resizing model with accuracy above 85% (and even above 94% for some models).

Figure 20B:
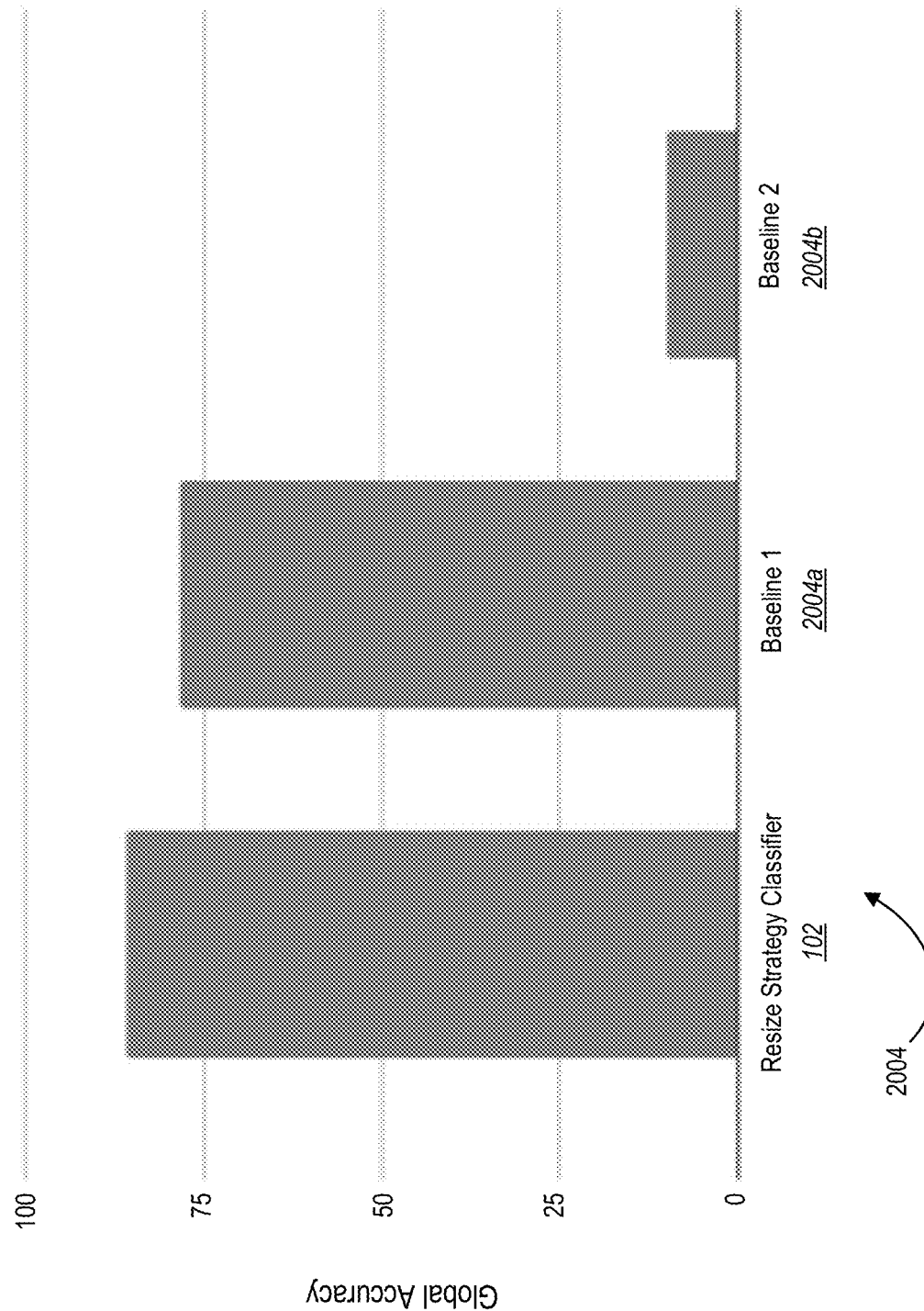

Moreover, FIG. 20B shows panel 2004 indicating an overall single-label accuracy of the machine learning model as compared to two baseline options. For example, for single-label accuracy, each instance in a dataset is associated with a single label, and the goal of the machine learning model is to predict the correct label for each instance. Thus, single label accuracy measures the percentage of instances for which the classifier correctly predicted the label. Accordingly, as shown, FIG. 20B illustrates that the digital design system 102 outperforms a first baseline 2004a (i.e., a baseline machine learning classifier) and a second baseline 2004b (e.g., a heuristic/rule based approach) in terms of global accuracy.

Figure 21:
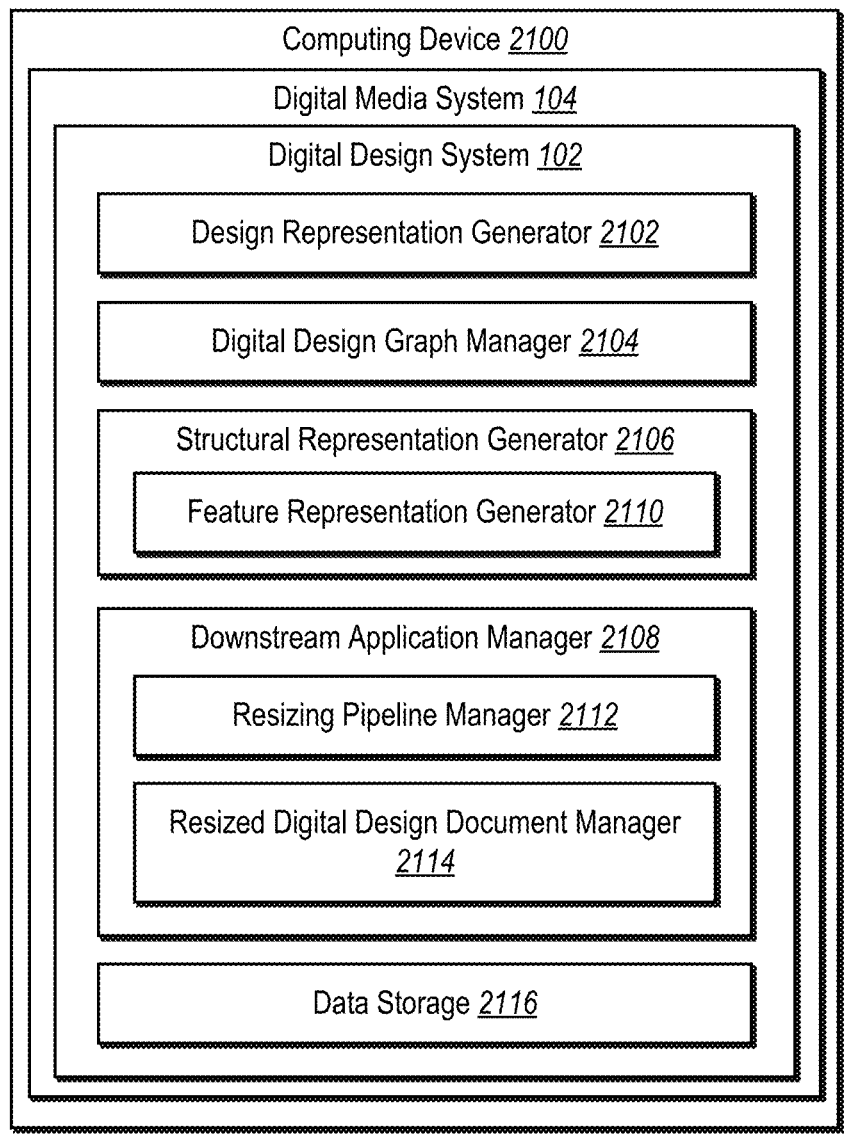
FIG. 21 illustrates example components of the digital design system in accordance with one or more embodiments.

Turning to FIG. 21, additional detail will now be provided regarding various components and capabilities of the digital design system 102. In particular, FIG. 21 illustrates an example schematic diagram of a computing device 2100 (e.g., the server(s) 106 and/or the client device 110) implementing the digital design system 102 in accordance with one or more embodiments of the present disclosure for components 2102-2114. As illustrated in FIG. 21, the digital design system 102 includes a design representation generator 2102, a digital design multigraph manager 2104, a structural representation generator 2106 with a subcomponent of a feature representation generator 2110, a downstream application manager 2108, a resizing pipeline manager 2112, a resized digital design document manager 2114, and data storage 2116.

The design representation generator 2102 receives a digital design document for processing design properties and the digital design elements within the digital design document. For example, the design representation generator 2102 processes a digital design document and generates a design representation. In particular, the design representation generator 2102 generates design representations to pass it along to other components and applications for downstream application or for machine learning chaining.

The digital design multigraph manager 2104 constructs a digital design multigraph. For example, the digital design multigraph manager 2104 receives the design representation from the design representation generator 2102 and constructs a digital design multigraph. In particular, the digital design multigraph manager 2104 constructs a digital design multigraph by generating nodes that represent the digital design elements and generates edges between the nodes based on the design properties. For instance, the digital design multigraph manager 2104 further interacts with various components to provide structural information via the digital design multigraph.

The structural representation generator 2106 generates structural representations of the digital design document. For example, the structural representation generator 2106 receives digital design multigraphs from the digital design multigraph manager 2104 and generates a structural representation based on the digital design multigraph. In particular, the structural representation generator 2106 generates visual structure inferences, embedding vectors, and/or feature representations. Moreover, the structural representation generator 2106 interacts with various components for providing the structural representation for performing downstream tasks.

The downstream application manager 2108 performs various mapping or machine learning tasks. For example, the downstream application manager 2108 generates a recommended revision to the digital design document, generates a modified digital design document from the digital design document, or identifies an additional digital design document corresponding to the digital design document. In particular, the downstream application manager 2108 utilizes structural representations to perform the aforementioned actions.

The feature representation generator 2110 generates feature representations of a digital design document. For example, the feature representation generator 2110 can generate feature representations utilizing a variety of computer-implemented algorithms, such as embedding models. In some implementations the feature representation generator 2110 generates a feature representation from a digital design multigraph of the digital design multigraph manager 2104. Thus, in some implementations, the feature representation generator 2110 generates a feature representation that contains generic structural information with user identifiable information anonymized.

The resizing pipeline manager 2112 manages the selection of resizing models. For example, the resizing pipeline manager 2112 selects a resizing model from a plurality of resizing models based on the feature representation received from the feature representation generator 2110. In particular, the resizing pipeline manager 2112 manages the selection and operation of various resizing models such as fit, proportional, springs-and-struts, and pin.

The resized digital design document manager 2114 generates a resized digital design document. For example, the resized digital design document manager 2114 interacts with the resizing pipeline manager 2112 to receive a selection of a specific resizing model and resizes a digital design document. In particular, the resized digital design document manager 2114 generates a resized digital design document by modifying digital design elements utilizing the selected resizing model.

Further, the digital design system 102 also includes data storage 2116. In particular, data storage 2116 (implemented by one or more memory devices) can include digital design documents, resized digital design documents, structural representations, and digital design multigraphs.

Each of the components 2102-2116 of the digital design system 102 can include software, hardware, or both. For example, the components 2102-2116 can include one or more instructions stored on a computer-readable storage medium and executable by processors of one or more computing devices, such as a client device or server device. When executed by the one or more processors, the computer-executable instructions of the digital design system 102 can cause the computing device(s) to perform the methods described herein. Alternatively, the components 2102-2114 can include hardware, such as a special-purpose processing device to perform a certain function or group of functions. Alternatively, the components 2102-2116 of the digital design system 102 can include a combination of computer-executable instructions and hardware.

Furthermore, the components 2102-2116 of the digital design system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 2102-2116 of the digital design system 102 may be implemented as a stand-alone application, such as a desktop or mobile application. Furthermore, the components 2102-2116 of the digital design system 102 may be implemented as one or more web-based applications hosted on a remote server. Alternatively, or additionally, the components 2102-2116 of the digital design system 102 may be implemented in a suite of mobile device applications or "apps." For example, in one or more embodiments, the digital design system 102 can comprise or operate in connection with digital software applications such as ADOBE® CREATIVE CLOUD EXPRESS, ADOBE® PHOTOSHOP®, ADOBE® INDESIGN®, or ADOBE® ILLUSTRATOR®. "ADOBE," "PHOTOSHOP," "INDESIGN," and "ILLUSTRATOR". The foregoing are either registered trademarks or trademarks of Adobe Inc. in the United States and/or other countries.

Figure 22:
FIG. 22 illustrates a flowchart of a series of acts for generating a structural representation in accordance with one or more embodiments.

FIGS. 1-21, the corresponding text, and the examples provide a number of different methods, systems, devices, and non-transitory computer-readable media of the digital design system 102. In addition to the foregoing, one or more embodiments can also be described in terms of flowcharts comprising acts for accomplishing the particular result, as shown in FIG. 22. FIG. 22 may be performed with more or fewer acts. Further, the acts may be performed in different orders. Additionally, the acts described herein may be repeated or performed in parallel with one another or in parallel with different instances of the same or similar acts.

FIG. 22 illustrates a flowchart of a series of acts 2200, including an act 2202 of generating a design representation comprising design properties of a digital design document, an act 2204 of constructing a digital design multigraph from the design representation, and an act 2206 of generating a structural representation based on the digital design multigraph. In particular, the act 2202 includes generating a design representation comprising design properties of a digital design document having a plurality of digital design elements, the act 2204 includes constructing a digital design multigraph from the design representation by generating nodes based on the plurality of digital design elements and generating edges between the nodes based on the design properties, and the act 2206 includes generating a structural representation for the digital design document based on the digital design multigraph.

Further, in one or more embodiments, the series of acts 2200 includes extracting element properties and geometric properties from the digital design document. Moreover, in one or more embodiments the series of acts 2200 includes extracting, from the digital design document, at least one of style properties or inferred tags. Additionally, in one or more embodiments the series of acts 2200 includes anonymizing the digital design document by encoding user-identifiable information from text strings within the digital design document. Further, in one or more embodiments the series of acts 2200 generating the nodes, by encoding digital design element types for the plurality of digital design elements and generating the edges between the nodes, by encoding relationships between nodes based on the design properties.

Additionally, in one or more embodiments, the series of acts 2200 includes determining weights associated with the edges based on intensity measures of the relationships between the nodes. Further, in one or more embodiments, the series of acts 2200 includes generating, utilizing a grouping machine-learning model, a grouping score from a first digital design element and a second digital design element within the digital design document based on the digital design multigraph and determining that the first digital design element and the second digital design element are part of a first group based on the grouping score.

Moreover, in one or more embodiments, the series of acts 2200 includes generating foreground leaf nodes and background leaf nodes from the plurality of digital design elements within the digital design document, determining, utilizing a grouping machine-learning model, a first element grouping from the foreground leaf nodes and a second element grouping from the background leaf nodes, and generating a visual structure inference comprising the first element grouping and the second element grouping.

Further, in one or more embodiments, the series of acts 2200 includes utilizing the structural representation to generate at least one of a recommended revision to the digital design document, generate a modified digital design document from the digital design document, or identify an additional digital design document corresponding to the digital design document.

In addition, in one or more embodiments, the series of acts 2200 includes generating a digital design multigraph from a digital design document, wherein the digital design multigraph comprises nodes reflecting digital design elements of the digital design multigraph and further comprises edges between the nodes reflecting design properties of the digital design elements, generating a structural representation of the digital design document from the digital design multigraph, and utilizing the structural representation of the digital design document to perform at least one of: generating a recommended revision to the digital design document, generating a modified digital design document from the digital design document, or identifying an additional digital design document corresponding to the digital design document.

Moreover, in one or more embodiments, the series of acts 2200 includes extracting from the digital design document, element properties and geometric properties, generating a design representation from the element properties and the geometric properties, and generating the digital design multigraph based on the design representation. Further, in one or more embodiments, the series of acts 2200 includes generating, utilizing a machine learning model, embedding vectors representing the digital design elements from the digital design multigraph. Additionally, in one or more embodiments, the series of acts 2200 includes generating adjacency matrices representing pairwise relations between the digital design elements from the digital design multigraph. Further, in one or more embodiments, the series of acts 2200 includes generating a style recommendation based on the structural representation to modify a style within the digital design document.

Moreover, in one or more embodiments, the series of acts 2200 includes generating a layout different than a layout of the digital design document based on the structural representation. In addition, in one or more embodiments, the series of acts 2200 includes generating additional structural representations for a set of digital design documents from additional digital design multigraphs and selecting the additional digital design document from the set of digital design documents by comparing the structural representation and the additional structural representations.

Furthermore, in one or more embodiments, the series of acts 2200 includes extracting from the digital design document at least one of style properties or inferred tags and anonymizing the digital design document by encoding user-identifiable information from text strings within the digital design document. Additionally, in one or more embodiments, the series of acts 2200 includes generating the nodes, by encoding digital design element types for the plurality of digital design elements and generating the edges between the nodes, by encoding relationships between nodes based on the design properties. Further, in one or more embodiments, the series of acts 2200 includes utilizing a machine learning model to generate a feature representation from the digital design multigraph.

Figure 23:
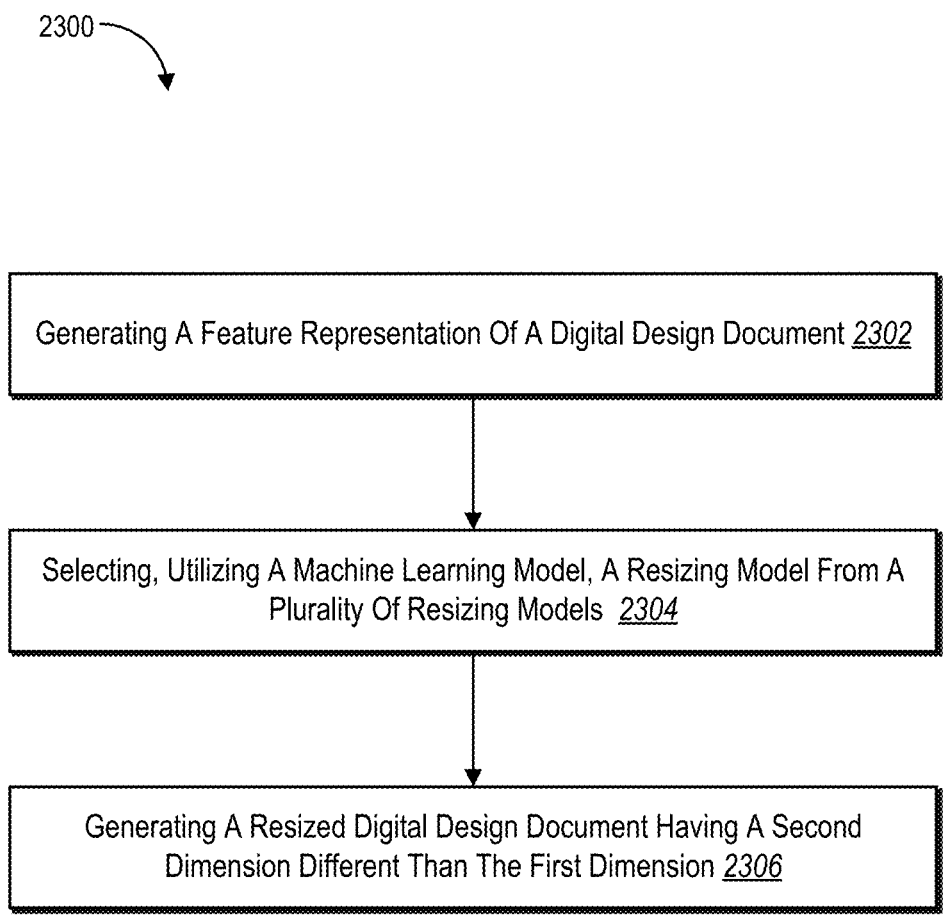
FIG. 23 illustrates a flowchart of a series of acts for generating a resized digital design document in accordance with one or more embodiments.

FIG. 23 may be performed with more or fewer acts. Further, the acts may be performed in different orders. Additionally, the acts described herein may be repeated or performed in parallel with one another or in parallel with different instances of the same or similar acts. FIG. 23 illustrates a flowchart of a series of acts 2300 for generating a resized digital design document in accordance with one or more embodiments. FIG. 23 illustrates acts according to one embodiment, alternative embodiments may omit, add to, reorder, and/or modify any of the acts shown in FIG. 23. In some implementations, the acts of FIG. 23 are performed as part of a method. For example, in some embodiments, the acts of FIG. 23 are performed as part of a computer-implemented method. Alternatively, a non-transitory computer-readable medium can store instructions thereon that, when executed by at least one processor, cause a computing device to perform the acts of FIG. 23. In some embodiments, a system performs the acts of FIG. 23. The system further includes at least one server device configured to cause the system to perform the acts of FIG. 23.

The series of acts 2300 includes an act 2302 of generating a feature representation of a digital design document, an act 2304 of selecting, utilizing a machine learning model, a resizing model from a plurality of resizing models, and an act 2306 of generating a resized digital design document having a second dimension different than the first dimension. In particular, the act 2302 includes generating a feature representation of a digital design document comprising a first dimension and digital design elements that fit within the first dimension, the act 2304 includes selecting, utilizing a machine learning model, a resizing model from a plurality of resizing models based on the feature representation of the digital design document, and the act 2306 includes generating a resized digital design document having a second dimension different than the first dimension by modifying the digital design elements utilizing the resizing model to fit within the second dimension.

Further, in one or more embodiments the series of acts 2300 includes constructing a digital design multigraph comprising nodes representing the digital design elements and further comprising edges representing relationships between the digital design elements and extracting the feature representation of the digital design document from the digital design multigraph. Moreover, in one or more embodiments the series of acts 2300 includes selecting the resizing model from a proportional scale model, a fit model, and at least one of a pin model or a spring-and-struts model.

Further, in one or more embodiments the series of acts 2300 includes selecting the resizing model further comprises selecting, utilizing the machine learning model, a spring-and-struts model and generating the resized digital design document comprises utilizing the spring-and-struts model to generate the resized digital design document by generating spring constraints for the digital design elements and generating the resized digital design document by modifying the digital design elements according to the spring constraints.

Moreover, in one or more embodiments the series of acts 2300 includes selecting the resizing model further comprises selecting, utilizing the machine learning model, a pin model, generating the resized digital design document comprises utilizing the pin model to generate the resized digital design document by: determining a relative pin position of a digital design element within the digital design document, generating a resized digital design element by scaling the digital design element based on the first dimension and the second dimension, and positioning the resized digital design element within the resized digital design document according the relative pin position.

Further, in one or more embodiments the series of acts 2300 includes determining, utilizing a design critic model, that the resized digital design document fails to satisfy a design critic threshold. Additionally, in one or more embodiments the series of acts 2300 includes in response to determining that the resized digital design document fails to satisfy the design critic threshold, selecting a different resizing model from the plurality of resizing models. Moreover, in one or more embodiments the series of acts 2300 includes generating a second resized digital design document having the second dimension different than the first dimension by modifying the digital design elements utilizing the different resizing model to fit within the second, dimension Additionally, in one or more embodiments the series of acts 2300 includes selecting, utilizing a machine learning model, a first resizing model from a plurality of resizing models based on digital design elements of a digital design document, generating a resized digital design document from the digital design document utilizing the first resizing model, determining, utilizing a design critic model, that the resized digital design document fails to satisfy a design critic threshold, and selecting, utilizing the machine learning model, a second resizing model from the plurality of resizing models to generate a second resized digital document from the digital design document.

Moreover, in one or more embodiments the series of acts 2300 includes generating a feature representation of the digital design document, the digital design document comprising a first dimension and digital design elements that fit within the first dimension and the resized digital design document has a second dimension different than the first dimension. Further, in one or more embodiments the series of acts 2300 includes generating, utilizing the machine learning model, machine learning selection scores for the plurality of resizing models based on a feature representation of the digital design document and selecting the first resizing model based on the machine learning selection scores.

In addition, in one or more embodiments the series of acts 2300 includes determining, utilizing a heuristic model, heuristic selection scores for the plurality of resizing models, and selecting the first resizing model based on the machine learning selection scores and the heuristic selection scores. Further, in one or more embodiments the series of acts 2300 includes determining the heuristic selection scores comprises determining model efficiency scores for the plurality of resizing models and selecting the first resizing model based on heuristic selection scores comprises selecting the first resizing model based on the model efficiency scores.

Moreover, in one or more embodiments the series of acts 2300 includes selecting a spring-and-struts model as the first resizing model and generating the resized digital design document comprises utilizing the spring-and-struts model to generate the resized digital design document. Further, in one or more embodiments the series of acts 2300 includes selecting a pin model as the second resizing model and generating the resized digital design document comprises utilizing the pin model to generate the resized digital design document.

Additionally, in one or more embodiments the series of acts 2300 includes constructing a digital design multigraph comprising nodes representing the digital design elements and further comprising edges representing relationships between the digital design elements. Further, in one or more embodiments the series of acts 2300 includes extracting the feature representation of the digital design document from the digital design multigraph. Moreover, in one or more embodiments the series of acts 2300 includes generating, utilizing the machine learning model, machine learning selection scores for the plurality of resizing models based on the feature representation of the digital design document, generating, utilizing a heuristic model, heuristic selection scores for the plurality of resizing models, and selecting the resizing model based on the machine learning selection scores and the heuristic selection scores. Further, in one or more embodiments the series of acts 2300 includes determining, utilizing a design critic model, that the resized digital design document fails to satisfy a design critic threshold, selecting a different resizing model from the plurality of resizing models, and generating a second resized digital design document having the second dimension different than the first dimension by modifying the digital design elements utilizing the different resizing model to fit within the second dimension.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 24:
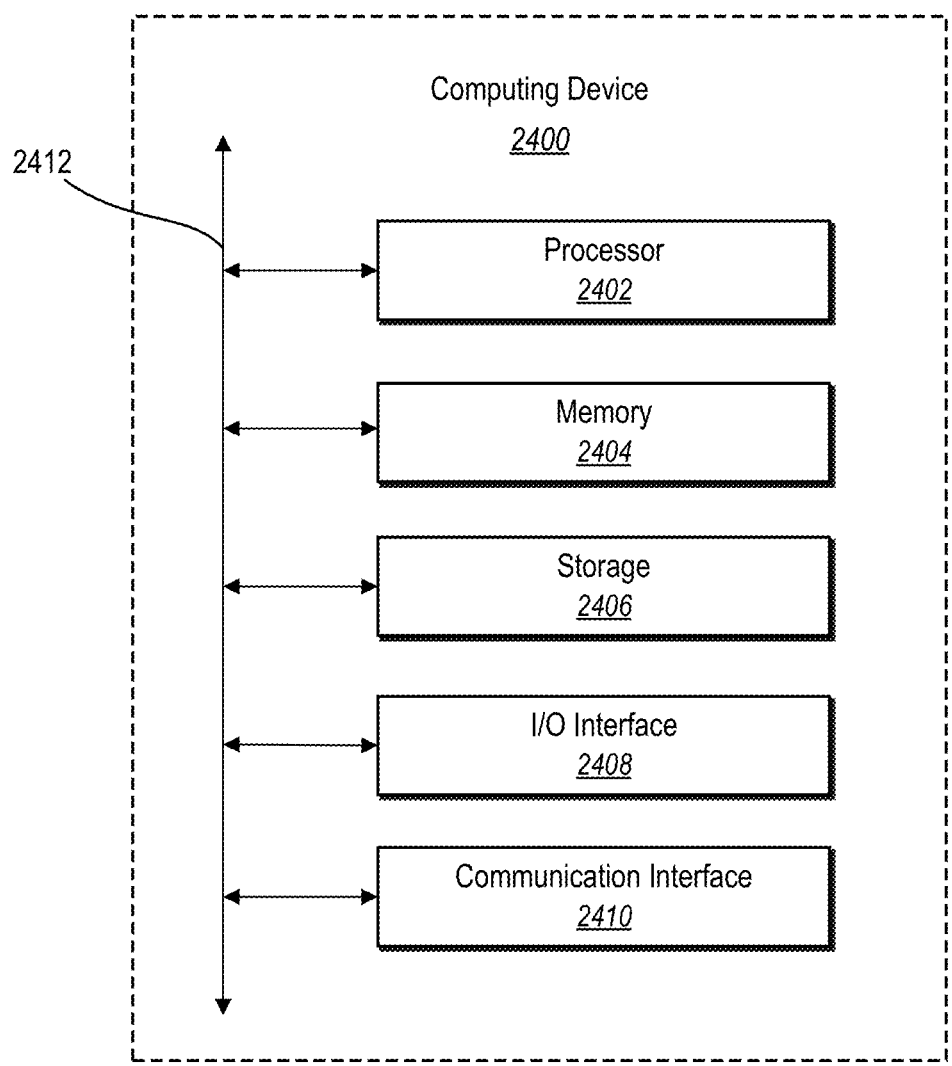
FIG. 24 illustrates a block diagram of an exemplary computing device in accordance with one or more embodiments.

FIG. 24 illustrates a block diagram of an example computing device 2400 that may be configured to perform one or more of the processes described above. One will appreciate that one or more computing devices, such as the computing device 2400 may represent the computing devices described above (e.g., the server(s) 106 and/or the client device 110). In one or more embodiments, the computing device 2400 may be a mobile device (e.g., a mobile telephone, a smartphone, a PDA, a tablet, a laptop, a camera, a tracker, a watch, a wearable device). In some embodiments, the computing device 2400 may be a non-mobile device (e.g., a desktop computer or another type of client device). Further, the computing device 2400 may be a server device that includes cloud-based processing and storage capabilities.

As shown in FIG. 24, the computing device 2400 can include one or more processor(s) 2402, memory 2404, a storage device 2406, input/output interfaces 2408 (or "I/O interfaces 2408"), and a communication interface 2410, which may be communicatively coupled by way of a communication infrastructure (e.g., bus 2412). While the computing device 2400 is shown in FIG. 24, the components illustrated in FIG. 24 are not intended to be limiting. Additional or alternative components may be used in other embodiments. Furthermore, in certain embodiments, the computing device 2400 includes fewer components than those shown in FIG. 24. Components of the computing device 2400 shown in FIG. 24 will now be described in additional detail.

In particular embodiments, the processor(s) 2402 includes hardware for executing instructions, such as those making up a computer program. As an example, and not by way of limitation, to execute instructions, the processor(s) 2402 may retrieve (or fetch) the instructions from an internal register, an internal cache, memory 2404, or a storage device 2406 and decode and execute them.

The computing device 2400 includes memory 2404, which is coupled to the processor(s) 2402. The memory 2404 may be used for storing data, metadata, and programs for execution by the processor(s). The memory 2404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2404 may be internal or distributed memory.

The computing device 2400 includes a storage device 2406 including storage for storing data or instructions. As an example, and not by way of limitation, the storage device 2406 can include a non-transitory storage medium described above. The storage device 2406 may include a hard disk drive (HDD), flash memory, a Universal Serial Bus (USB) drive or a combination these or other storage devices.

As shown, the computing device 2400 includes one or more I/O interfaces 2408, which are provided to allow a user to provide input to (such as user strokes), receive output from, and otherwise transfer data to and from the computing device 2400. These I/O interfaces 2408 may include a mouse, keypad or a keyboard, a touch screen, camera, optical scanner, network interface, modem, other known I/O devices or a combination of such I/O interfaces 2408. The touch screen may be activated with a stylus or a finger.

The I/O interfaces 2408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2408 are configured to provide graphical data to a display for presentation to a user. The graphical data may be representative of one or more graphical user interfaces and/or any other graphical content as may serve a particular implementation.

The computing device 2400 can further include a communication interface 2410. The communication interface 2410 can include hardware, software, or both. The communication interface 2410 provides one or more interfaces for communication (such as, for example, packet-based communication) between the computing device and one or more other computing devices or one or more networks. As an example, and not by way of limitation, communication interface 2410 may include a network interface controller (NIC) or network adapter for communicating with an Ethernet or other wire-based network or a wireless NIC (WNIC) or wireless adapter for communicating with a wireless network, such as a WI-FI. The computing device 2400 can further include a bus 2412. The bus 2412 can include hardware, software, or both that connects components of computing device 2400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   generating a feature representation of a digital design document comprising a first dimension and digital design elements that fit within the first dimension;
   selecting, utilizing a machine learning model, a resizing model from a plurality of resizing models based on the feature representation of the digital design document; and
   generating a resized digital design document having a second dimension different than the first dimension by modifying the digital design elements utilizing the resizing model to fit within the second dimension.

2. The method of claim 1, wherein generating the feature representation of the digital design document comprises:
   constructing a digital design graph comprising nodes representing the digital design elements and further comprising edges representing relationships between the digital design elements; and
   extracting the feature representation of the digital design document from the digital design graph.

3. The method of claim 1, further comprising selecting the resizing model from a set of resizing models comprising a proportional scale model, a fit model, a pin model, or a spring-and-struts model.

4. The method of claim 1, wherein:
selecting the resizing model further comprises selecting, utilizing the machine learning model, a spring-and-struts model; and
generating the resized digital design document comprises utilizing the spring-and-struts model to generate the resized digital design document by:
generating spring constraints for the digital design elements; and
generating the resized digital design document by modifying the digital design elements according to the spring constraints.

5. The method of claim 1, wherein:
selecting the resizing model further comprises selecting, utilizing the machine learning model, a pin model; and
generating the resized digital design document comprises utilizing the pin model to generate the resized digital design document by:
determining a relative pin position of a digital design element within the digital design document;
generating a resized digital design element by scaling the digital design element based on the first dimension and the second dimension; and
positioning the resized digital design element within the resized digital design document according to the relative pin position.

6. The method of claim 1, further comprising determining, utilizing a design critic model, that the resized digital design document fails to satisfy a design critic threshold.

7. The method of claim 6, further comprising in response to determining that the resized digital design document fails to satisfy the design critic threshold, selecting a different resizing model from the plurality of resizing models.

8. The method of claim 7, further comprising generating a second resized digital design document having the second dimension different than the first dimension by modifying the digital design elements utilizing the different resizing model to fit within the second dimension.

9. A system comprising:
one or more memory components; and
one or more processing devices coupled to the one or more memory components, the one or more processing devices to perform operations comprising:
selecting, utilizing a machine learning model, a first resizing model from a plurality of resizing models based on digital design elements of a digital design document;
generating a resized digital design document from the digital design document utilizing the first resizing model;
determining, utilizing a design critic model, that the resized digital design document fails to satisfy a design critic threshold; and
selecting, utilizing the machine learning model, a second resizing model from the plurality of resizing models to generate a second resized digital document from the digital design document.

10. The system of claim 9, wherein the operations further comprise generating a feature representation of the digital design document, the digital design document comprising a first dimension and digital design elements that fit within the first dimension and the resized digital design document has a second dimension different than the first dimension.

11. The system of claim 9, wherein selecting the first resizing model from the plurality of resizing models further comprises:
generating, utilizing the machine learning model, machine learning selection scores for the plurality of resizing models based on a feature representation of the digital design document; and
selecting the first resizing model based on the machine learning selection scores.

12. The system of claim 11, wherein selecting the first resizing model from the plurality of resizing models further comprises:
determining, utilizing a heuristic model, heuristic selection scores for the plurality of resizing models; and
selecting the first resizing model based on the machine learning selection scores and the heuristic selection scores.

13. The system of claim 12, wherein:
determining the heuristic selection scores comprises determining model efficiency scores for the plurality of resizing models; and
selecting the first resizing model based on heuristic selection scores comprises selecting the first resizing model based on the model efficiency scores.

14. The system of claim 9, wherein the operations further comprise:
selecting a spring-and-struts model as the first resizing model; and
generating the resized digital design document comprises utilizing the spring-and-struts model to generate the resized digital design document.

15. The system of claim 9, wherein the operations further comprise:
selecting a pin model as the second resizing model; and
generating the resized digital design document comprises utilizing the pin model to generate the resized digital design document.

16. A non-transitory computer-readable medium storing executable instructions which, when executed by at least one processing device, cause the at least one processing device to perform operations comprising:
generating a feature representation of a digital design document comprising a first dimension and digital design elements that fit within the first dimension;
selecting, utilizing a machine learning model, a resizing model from a plurality of resizing models based on the feature representation of the digital design document; and
generating a resized digital design document having a second dimension different than the first dimension by modifying the digital design elements utilizing the resizing model to fit within the second dimension.

17. The non-transitory computer-readable medium of claim 16, wherein the operations further comprise constructing a digital design graph comprising nodes representing the digital design elements and further comprising edges representing relationships between the digital design elements.

18. The non-transitory computer-readable medium of claim 17, wherein generating the feature representation further comprises extracting the feature representation of the digital design document from the digital design graph.

19. The non-transitory computer-readable medium of claim 16, wherein the operations further comprise:
generating, utilizing the machine learning model, machine learning selection scores for the plurality of resizing models based on the feature representation of the digital design document;

generating, utilizing a heuristic model, heuristic selection scores for the plurality of resizing models; and selecting the resizing model based on the machine learning selection scores and the heuristic selection scores.

20. The non-transitory computer-readable medium of claim 16, wherein the operations further comprise:

determining, utilizing a design critic model, that the resized digital design document fails to satisfy a design critic threshold;

selecting a different resizing model from the plurality of resizing models; and generating a second resized digital design document having the second dimension different than the first dimension by modifying the digital design elements utilizing the different resizing model to fit within the second dimension.

* * * * *